United States Patent [19]
Udagawa et al.

[11] Patent Number: 5,956,052
[45] Date of Patent: Sep. 21, 1999

[54] IMAGE FORMING APPARATUS WITH MEANS FOR CORRECTING IMAGE DENSITY NON-UNIFORMITY

[75] Inventors: Yutaka Udagawa, Kawasaki; Yoshiaki Takayanagi, Yokohama; Katsuyoshi Maeshima, Yokohama; Yasuhiro Numata, Yokohama; Takayuki Matsuo, Kawasaki; Miyuki Matsubara, Tokyo, all of Japan

[73] Assignee: Canon Kabushiki Kaisha, Tokyo, Japan

[21] Appl. No.: 07/985,467

[22] Filed: Dec. 3, 1992

Related U.S. Application Data

[63] Continuation of application No. 07/593,765, Oct. 4, 1990, abandoned.

[30] Foreign Application Priority Data

| Oct. 5, 1989 | [JP] | Japan | 1-261878 |
| Oct. 12, 1989 | [JP] | Japan | 1-266952 |
| Oct. 27, 1989 | [JP] | Japan | 1-280168 |
| Sep. 27, 1990 | [JP] | Japan | 2-259581 |

[51] Int. Cl.$^6$ .......................................................... B41J 2/05
[52] U.S. Cl. ................................................. 347/19; 347/14
[58] Field of Search ................................ 346/139 C, 140; 400/175; 358/296; 347/19, 14, 211, 197, 188

[56] References Cited

U.S. PATENT DOCUMENTS

| 4,313,124 | 1/1982 | Hara . | |
| 4,345,262 | 8/1982 | Shirato et al. . | |
| 4,396,923 | 8/1983 | Noda | 346/76 PH |
| 4,459,600 | 7/1984 | Sato et al. . | |
| 4,463,359 | 7/1984 | Ayata et al. . | |
| 4,558,333 | 12/1985 | Sugitani et al. . | |
| 4,723,129 | 2/1988 | Endo et al. . | |
| 4,740,796 | 4/1988 | Endo et al. . | |
| 4,741,636 | 5/1988 | Takahashi et al. . | |
| 4,794,413 | 12/1988 | Yamazaki et al. . | |
| 4,801,948 | 1/1989 | Kato et al. | 347/184 |
| 4,827,279 | 5/1989 | Lubinsky | 346/76 PH X |
| 4,872,027 | 10/1989 | Buskirk | 347/19 |
| 4,908,635 | 3/1990 | Iwasawa | 347/14 |
| 4,930,915 | 6/1990 | Kikuchi | 400/175 |
| 4,985,760 | 1/1991 | Maeshima et al. | 358/75 X |

(List continued on next page.)

FOREIGN PATENT DOCUMENTS

| 0 294 288 | 12/1988 | European Pat. Off. . | |
| 0315417 | 5/1989 | European Pat. Off. . | |
| 0317268 | 5/1989 | European Pat. Off. . | |
| 0346647 | 12/1989 | European Pat. Off. . | |
| 54-56847 | 5/1979 | Japan . | |
| 54-59936 | 5/1979 | Japan . | |
| 59-123670 | 7/1984 | Japan . | |
| 59-138461 | 8/1984 | Japan . | |
| 59-190873 | 10/1984 | Japan . | |
| 60-71260 | 4/1985 | Japan . | |
| 363276563 | 11/1988 | Japan | B41J 3/20 |
| 63-302060 | 12/1988 | Japan . | |
| 64-75257 | 3/1989 | Japan . | |
| 64866 | 3/1989 | Japan | B41J 3/20 |

OTHER PUBLICATIONS

Lonis, Robert A.; Storage of Operating Parameters in Memory Integral with Printhead; Xerox Disc. Journal, V8 N6 Nov./Dec. 1983, p. 503.

*Primary Examiner*—Joseph Hartary
*Attorney, Agent, or Firm*—Fitzpatrick, Cella, Harper & Scinto

[57] ABSTRACT

An image recording apparatus includes a recording unit integrally having an image forming recording head and a memory for storing a correction datum for correcting non-uniform image formation property; a reader for reading the correction datum from the memory; and a device for changing image forming conditions in accordance with the correction datum read by the reader. The apparatus also can alter the image forming conditions changed by the changing device when the non-uniformity of the recording unit changes.

15 Claims, 42 Drawing Sheets

U.S. PATENT DOCUMENTS

| | | | |
|---|---|---|---|
| 5,023,728 | 6/1991 | Nimura | 358/296 X |
| 5,024,544 | 6/1991 | Taketani | 400/175 X |
| 5,033,887 | 7/1991 | Bauerle | 400/175 |
| 5,038,208 | 8/1991 | Ichikawa et al. | 358/75 |
| 5,038,225 | 8/1991 | Maeshima et al. | |
| 5,039,237 | 8/1991 | Tanuma | 400/175 X |
| 5,049,898 | 9/1991 | Arthur | 347/19 |
| 5,053,866 | 10/1991 | Johnson | |
| 5,107,332 | 4/1992 | Chan | 347/19 X |
| 5,235,351 | 8/1993 | Koizumi | 347/19 X |

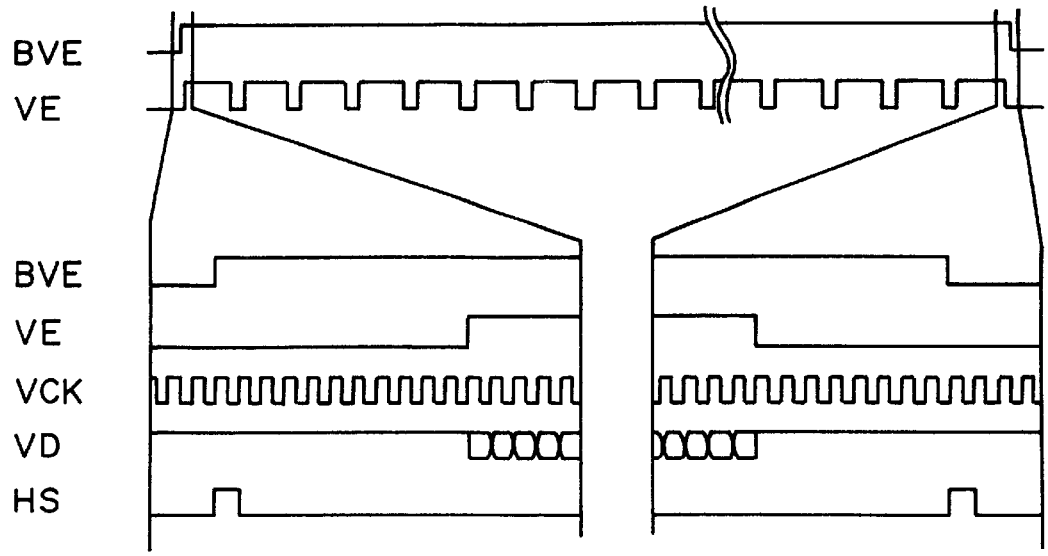
F I G. 10
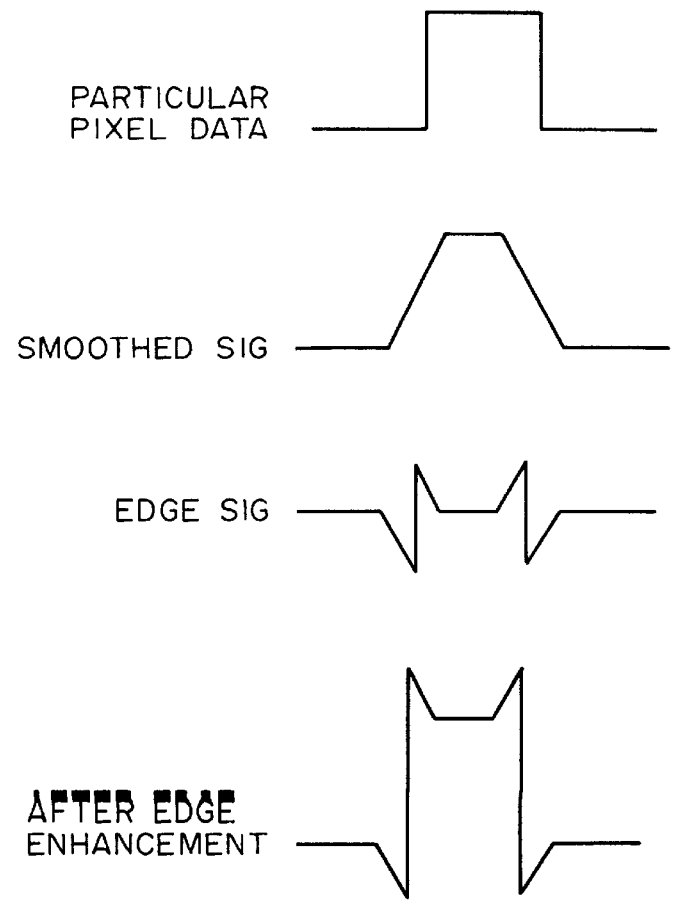
F I G. 12

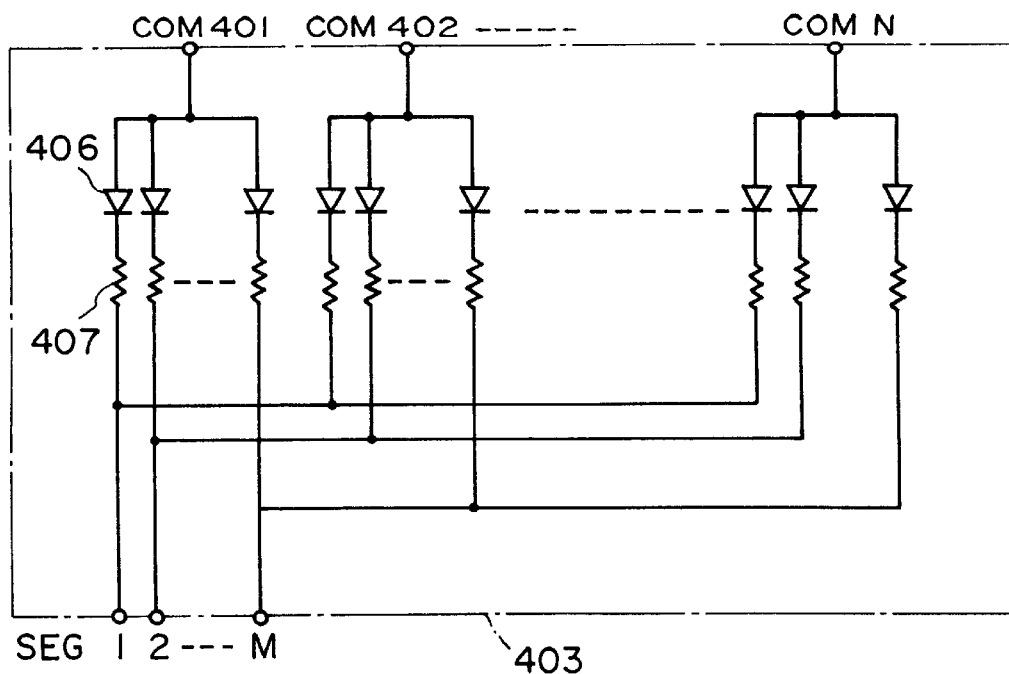
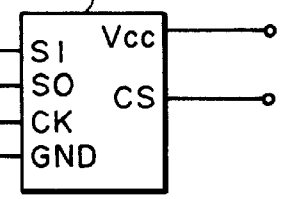
FIG. 19
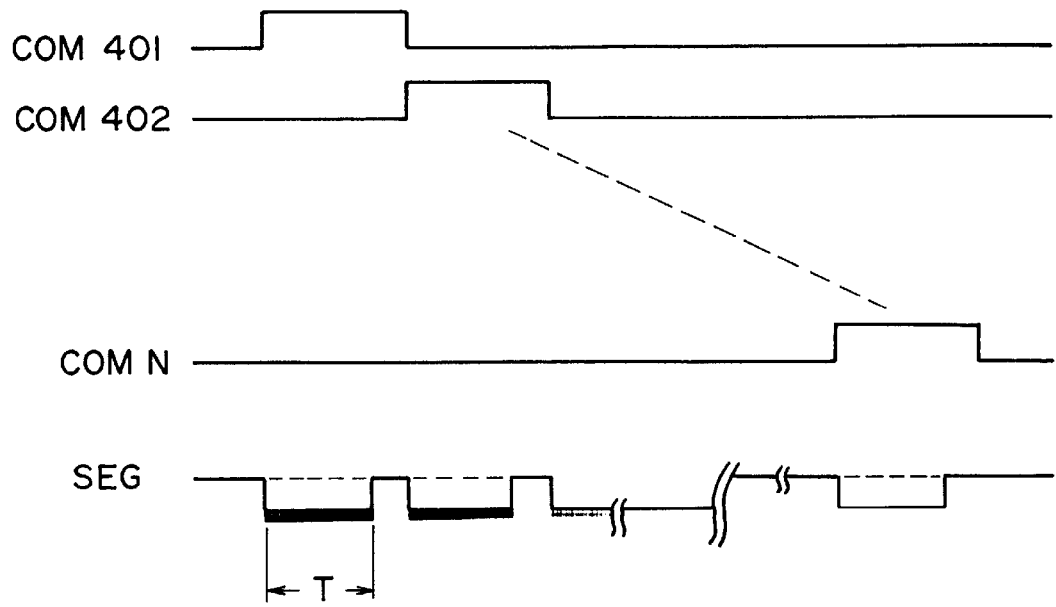
FIG. 20

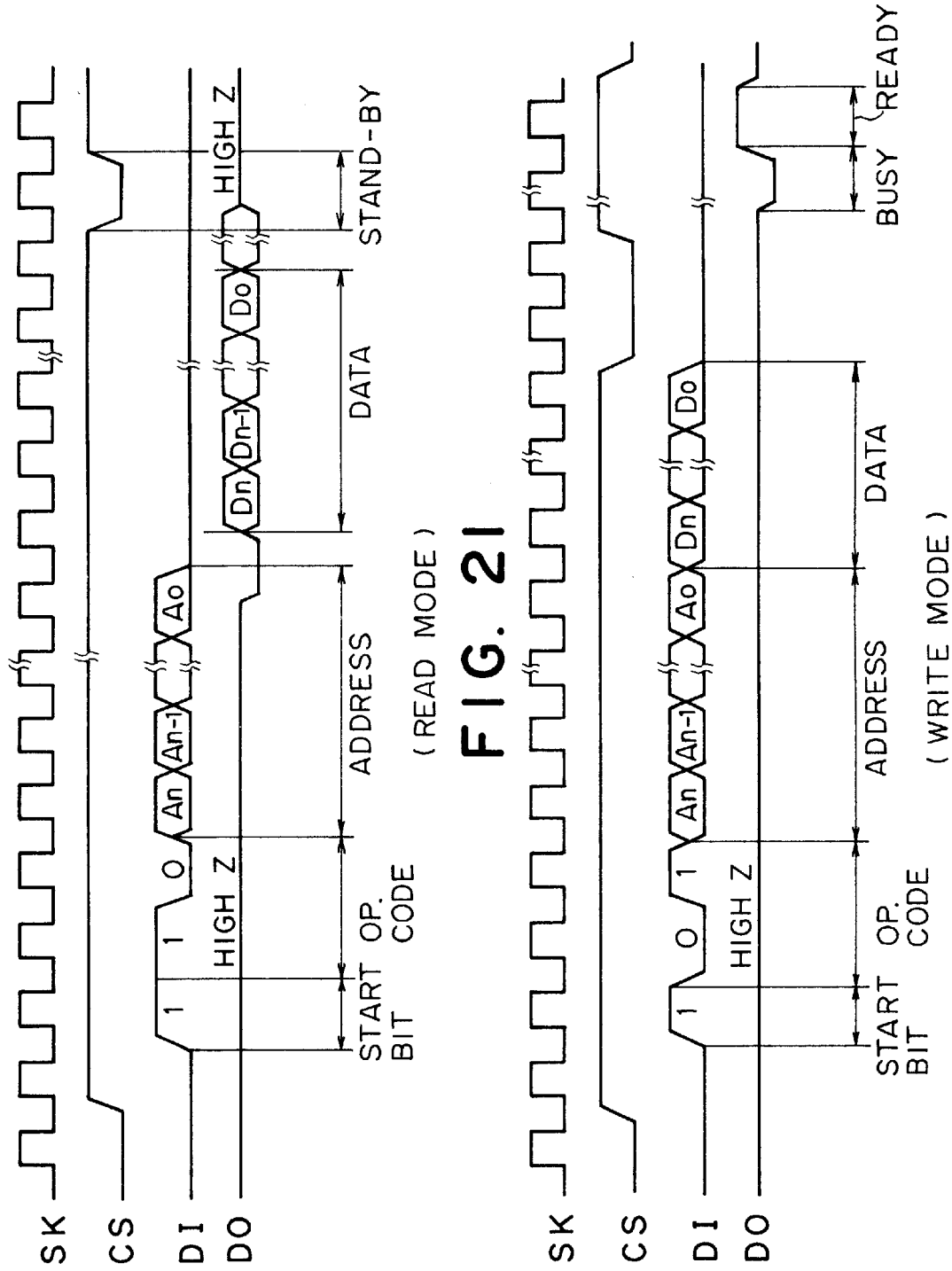

EEPROM MAPPING

| (ADRESS) | (BIT NO.) | DATA | HS DATA (6BIT)×128 | (BIT NO.) |
|---|---|---|---|---|
| 0 | 7 | SENS / (BIT1)(BIT0) | NOZZLE 0 | 0 |
| 1 | 15 | (BIT3)(BIT2) | NOZZLE 1 | 8 |
| 2 | 23 | T1 / (BIT1)(BIT0) | NOZZLE 2 | 16 |
| 3 | 31 | (BIT3)(BIT2) | NOZZLE 3 | 24 |
| 4 | 39 | T2 / (BIT1)(BIT0) | NOZZLE 4 | 32 |
| 5 | 47 | (BIT3)(BIT2) | NOZZLE 5 | 40 |
| 6 | 55 | BIT1  BIT0 | NOZZLE 6 | 48 |
| 7 | 63 | BIT3  BIT2 | | 56 |
|   | 71 | ID | | 64 |
|   | 79 | | | |
|   | 191 | | | 184 |
| 24 | 199 | BIT17 BIT16 | | 192 |
| 25 | 207 | BIT19 BIT18 | NOZZLE 25 | 200 |
|   | | COLR | NOZZLE 26 | |
| 122 | 983 | | NOZZLE 122 | 976 |
| 123 | 991 | | NOZZLE 123 | 984 |
| 124 | 999 | | NOZZLE 124 | 992 |
| 125 | 1007 | | NOZZLE 125 | 1000 |
| 126 | 1015 | | NOZZLE 126 | 1008 |
| 127 | 1023 | | NOZZLE 127 | 1016 |

FIG. 41

| (DATA) | BIT NO. | |
|---|---|---|
| SENS | 4 | SENSOR CHARCTERISTICS |
| T1 | 4 | DRIVE PULSE P1 |
| T2 | 4 | DRIVE PULSE P3 |
| ID | 20 | HEAD NO. |
| COLR | 2 | INK COLOR |

FIG. 42

FIG. 52(a)
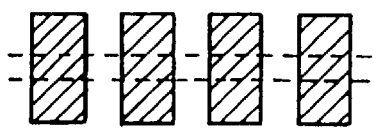
FIG. 52(b)
DATA
FIG. 52(c)
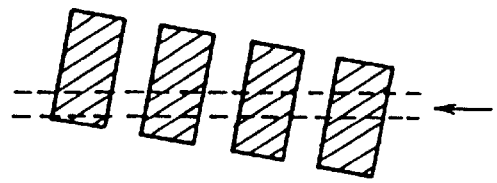
FIG. 52(d)
DENSITY DATA
FIG. 52(e)
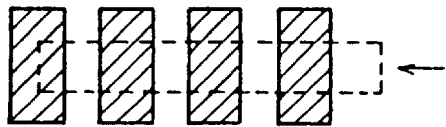
FIG. 52(f)
FIG. 52(g)
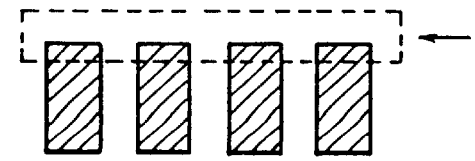
FIG. 52(h)
DENSITY DATA

IMAGE FORMING APPARATUS WITH MEANS FOR CORRECTING IMAGE DENSITY NON-UNIFORMITY

This application is a continuation of application Ser. No. 07/593,765 filed Oct. 4, 1990, abandoned.

FIELD OF THE INVENTION AND RELATED ART

The present invention relates to a recording head and an image recording apparatus using the recording head.

In an example of an apparatus using a recording head having multi-nozzles, image data obtained by reading an original is converted to a digital signal, which is, in turn, processed and then supplied to a multi-nozzle head. The multi-nozzle head effects the recording operation. However, such an apparatus is not completely free from the non-uniformity of the output image, depending on the variation in the characteristics of the material of constituent parts or the variation in the manufacturing process of the multi-nozzle head.

In order to avoid these problems, proposals have been made in U.S. Ser. Nos. 271,299, now U.S. Pat. No. 5,038, 208, and 480,041 filed Nov. 15, 1988 and Feb. 14, 1990, respectively and assigned to the assignee of this application, that memory means for storing correction data in accordance with the output characteristics of the individual recording head and means for correcting input image data in accordance with the stored data, are provided, so that the density non-uniformity are corrected thereby.

However, the correction data are stored in a ROM or the like which is separate from the recording head. The correction data themselves are peculiar to the associated recording heads, and therefore, they are provided only for the associated recording head, but, in the above proposals, an incorrect combination of the ROM and the recording head is liable to occur.

In addition, it is required that the recording head is supplied to the user necessarily together with the ROM exclusively therefor. In addition, this results in cumbersome work and handling in the manufacturing of the recording heads and in the exchange of the recording heads. This increases the manufacturing and operation cost.

Conventionally, an ink jet apparatus (ink jet recording apparatus) is widely used with a word processor or personal computer, in which the apparatus is used as a monochromatic (black) printer, and in which no halftone image is recorded, the halftone image being easily subjected to the influence of the density non-uniformity. Recently, however, a color ink jet recording apparatus is desired to be used with a color image reading apparatus, a color video floppy disk apparatus to reproduce a color photograph or a color copy.

In such a color ink jet recording apparatus capable of recording in plural colors, the improvement in the density uniformity is highly desired, because it is decisive for the image quality, since a half tone image reproduction is inevitable. However, the density non-uniformity can occur due to the variation in the dot diameter or the like because of the structure and/or the manufacturing process of the ink jet head (ink jet recording head). In addition, the nature of the non-uniformity is different for the individual recording head. From the position of assuring the reliability of the recording head, the recording head may be of a disposable cartridge type, in which the recording head is detachably mountable to a carriage of the recording apparatus. In this case, the recording head is relatively frequently exchanged.

Since the corrections for the density non-uniformities are different for the individual recording heads, the adjusting operations are cumbersome.

SUMMARY OF THE INVENTION

Accordingly, it is a principal object of the present invention to provide a recording head and an image recording apparatus having the recording head, wherein even if the recording head is exchanged, the printing non-uniformity of the recording head can be reduced or corrected.

It is another object of the present invention to provide an ink jet recording apparatus which is capable of recording color images in good order.

It is a further object of the present invention to provide a recording head and an image recording apparatus having the recording head wherein the necessity of a complicated adjusting mechanism for correction of the non-uniformity in the recorded image is eliminated.

According to an embodiment of the present invention, there is provided an ink jet head having an ink jet ejector comprising plural ejection outputs that is provided with a non-volatile memory element for storing data representing characteristics peculiar to the ink ejector or data for correcting the characteristics.

It is a further object of the present invention to provide an image recording apparatus having a simple structure, and therefore, which can be produced at low cost.

It is a further object of the present invention to provide an image recording apparatus capable of recording images stably for a long period of time.

It is a further object of the present invention to provide a recording head and/or an image recording apparatus using the recording head having a novel function.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 10 is a timing chart for illustrating image formation timing.

FIG. 12 illustrates an edge processing for images.

FIG. 19 is a circuit diagram of a major part of the circuit formed on a print board shown in FIG. 18.

FIG. 20 is a timing chart illustrating the timing of input signals to the circuit of FIG. 19.

FIG. 21 is a timing chart illustrating the timing of the signals in a read mode of EEPROM 4 of FIG. 19.

FIG. 22 is a timing chart illustrating the timing of the signals in the writing mode of EEPROM 4 of FIG. 19.

FIGS. 23A and 23B show the relation between the ejection outlet of the recording head and the recorded dot, wherein FIG. 23A represents the ideal condition, and FIG. 23B represents the actual condition.

FIG. 41 shows allocation of the data in EEPROM of the recording head of FIG. 40 embodiment.

FIG. 42 illustrates data shown in FIG. 41.

FIG. 45-1 illustrates a relation between a print sample and a reading region of a line sensor.

FIG. 45-2 shows an internal structure of a density non-uniformity measuring means shown in FIG. 43.

FIG. 52 shows a relation between the state of reading the print sample and the image data obtained.

DESCRIPTION OF THE PREFERRED EMBODIMENTS

The preferred embodiments of the present invention will be described. In the following embodiments, an ink jet recording apparatus is taken as an exemplary image forming apparatus. In such an ink jet recording apparatus, a multi-nozzle head having plural recording nozzles for ejecting droplets of ink is used, as an example.

General Description

Figure 1:
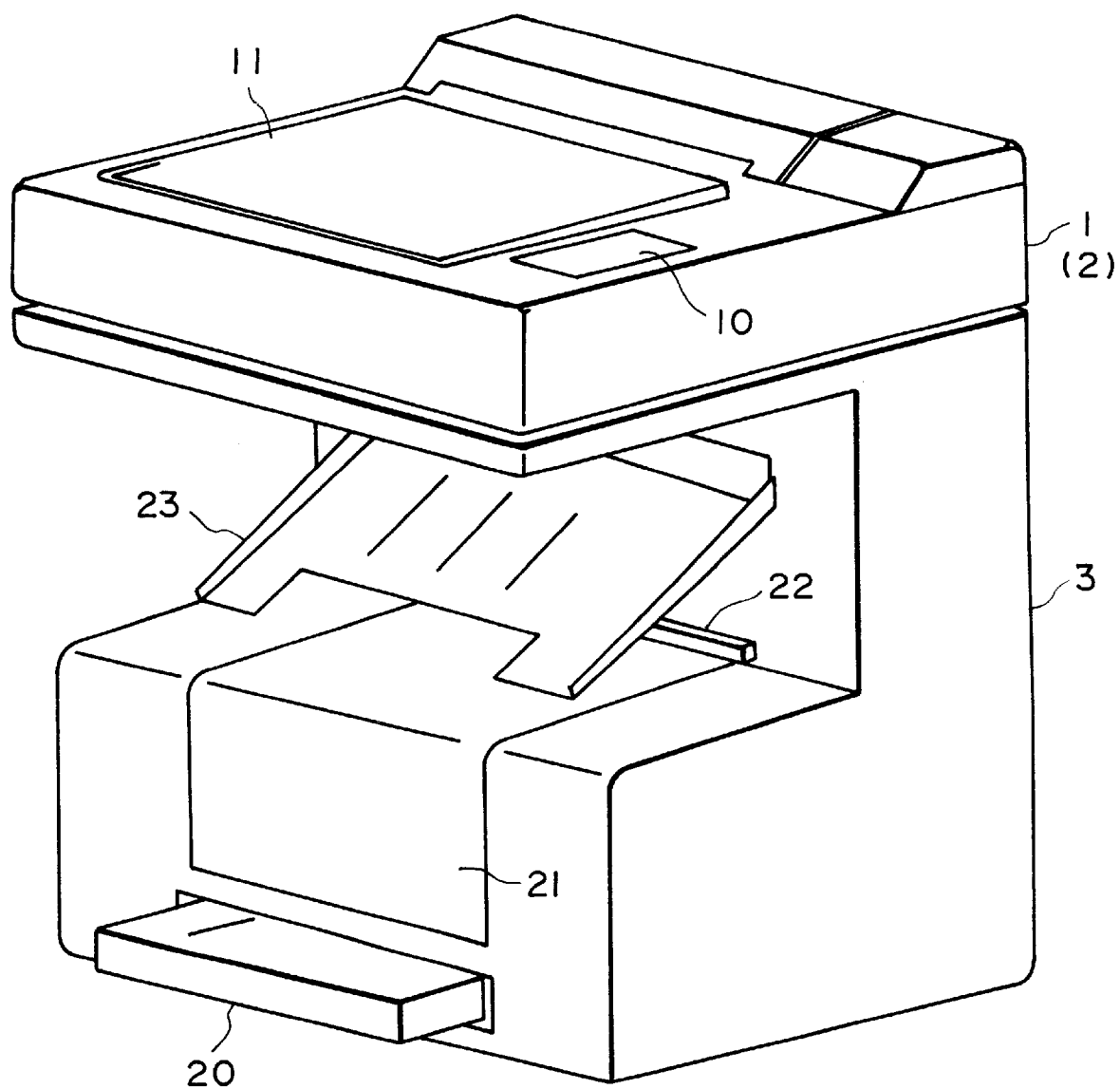
FIG. 1 is a perspective view of a digital full-color copying apparatus according to an embodiment of the present invention.

FIG. 1 shows an outer appearance of a digital color copying machine according to an embodiment of the present invention.

The color copying machine is generally divided into two parts, i.e., top and bottom parts.

The top part shown in FIG. 1 comprises a color image scanner 1 (scanner 1) for reading an original image and producing digital color image data, a controller 2, built in the scanner 1, for effecting various image processing operations for the digital color image data and for effecting interface operations or the like relative to an external apparatus.

The scanner 1 has functions to read a three dimensional or sheet original placed face down on the original supporting platen 11, and to read a large size sheet original.

An operation panel 10 is connected with the controller 2, for the operator to input various information to the copying machine. The controller 2 is responsive to the input information to instruct various operations to the scanner 1 and a printer 3. For a complicated editing process, the original cover 11 is replaced with a digitizer or the like, which is connected with the controller 2, by which more sophisticated processing is enabled.

The second part (the bottom part of FIG. 1) constitutes a printer for recording on the recording paper the color digital image signals produced by the controller 2. In this embodiment, the printer 3 is of a full-color ink jet printer using an ink jet type recording head disclosed in Japanese Laid-Open Patent Application No. 59936/1979.

The two parts are mechanically separable from each other, and with the use of connecting cable, they can be placed at respective positions remote from each other.

Printer

Figure 2:
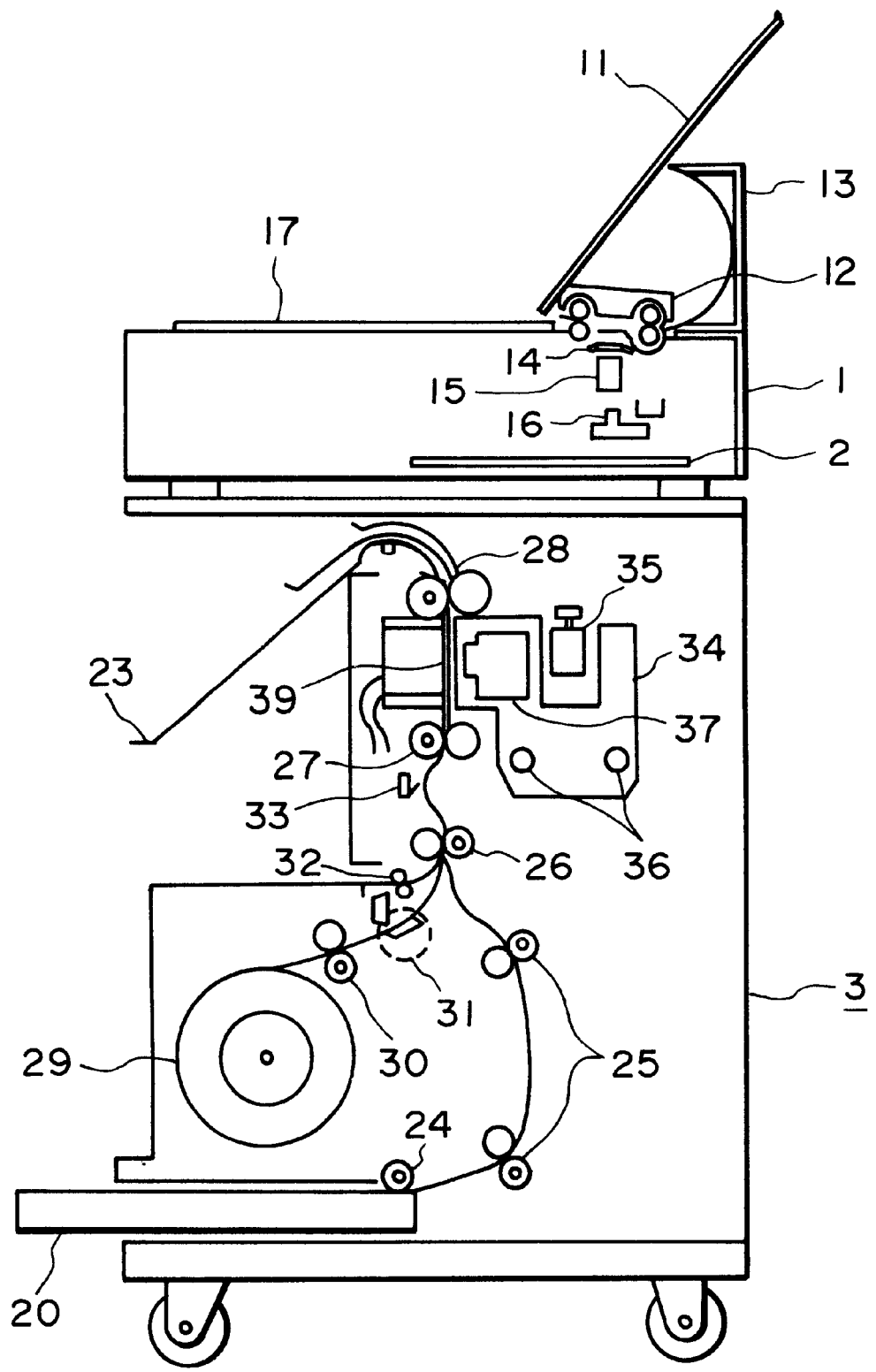
FIG. 2 is a side sectional view of the apparatus of FIG. 1.

FIG. 2 is a side sectional view of the digital color copying machine of FIG. 1.

An image sensor 16 (CCD, in this embodiment) is capable of reading a line image in full-color in cooperation with an exposure lamp 14 and a lens 15 to read an original image, then, various image processing operations are carried out by the scanner 1 and the controller 2, and then, the printer 3 effects the recording on a recording material.

Referring to FIG. 2, the recording material or paper is supplied from a sheet feed cassette 20 containing cut-sheets of a small regular size (A4–A3, in this embodiment) and from a roll of paper 29 of a large size (A2–A1, in this embodiment).

Additional sheet supply is permitted one-by-one through a manual supply opening 22 shown in FIG. 1. The recording sheet is supplied along the sheet feed cover 21, thus permitting external sheet feed.

A pick-up roller 24 is effective to feed one by one cut-sheets from the sheet feed cassette 20. The cut-sheet thus fed out is conveyed to a first sheet feed roller 26 by a cut-sheet feeding roller 25.

The rolled sheet 29 is fed out by a rolled sheet feeding roller 30, and is cut by a cutter 31 into a required length, and the cut-sheet is conveyed to the first sheet feed roller 26.

Similarly, the recording sheet supplied through the manual feed opening 22 is conveyed to the first sheet feed roller 26 by manual feed rollers 32.

The pick-up roller 24, the cut-sheet feeding roller 25, the rolled sheet feeding roller 30, the first sheet feed roller 26 and the manual feed roller 32 are driven by an unshown sheet feed motor in the form of a DC servo motor in this embodiment, and are actuated or deactuated properly by an electromagnetic clutch connected with each of the rollers.

When the printing operation is started in response to instructions from the controller 2, the recording sheet selectively supplied from one of the above-described sheet supply paths is conveyed to the first sheet feeding roller 26. In order to correct the oblique conveyance of the recording sheet, a predetermined amount of loop of the recording sheet is formed, and then, the first sheet feed roller 26 is actuated to feed the recording sheet to the second sheet feeding roller 27.

Between the first sheet feed roller 26 and the second sheet feed roller 27, in order to correctly feed the sheet between the sheet feed roller 28 and the second sheet feed roller 27, the recording sheet is slacked in a predetermined degree to provide a buffer. A buffer detecting sensor 33 is effective to detect the degree of the buffer. By keeping the buffer during the sheet conveyance, the load imparted to the sheet feeding roller 28 and the second sheet feed roller 27 can be reduced particularly when the large size recording sheet is conveyed, so that correct sheet feeding operation is accomplished.

Upon the printing operation of the recording head 37, a scanning carriage 34 on which the recording head 37 or the like is mounted, scanningly reciprocates on a carriage rail 36 by a scanning motor 35. In the forward stroke of the reciprocation, an image is printed on the recording sheet, whereas during the returning stroke, the sheet feeding roller 28 feeds the recording sheet by a predetermined amount. At this time, the sheet feed motor controls the above-driving system to provide the predetermined degree of the buffer, at all times, on the basis of the detection by the buffer degree detecting sensor 33.

The recording sheet on which the printing is effected is discharged to a sheet discharge tray 23, then, the printing operation is completed.

Figure 3:
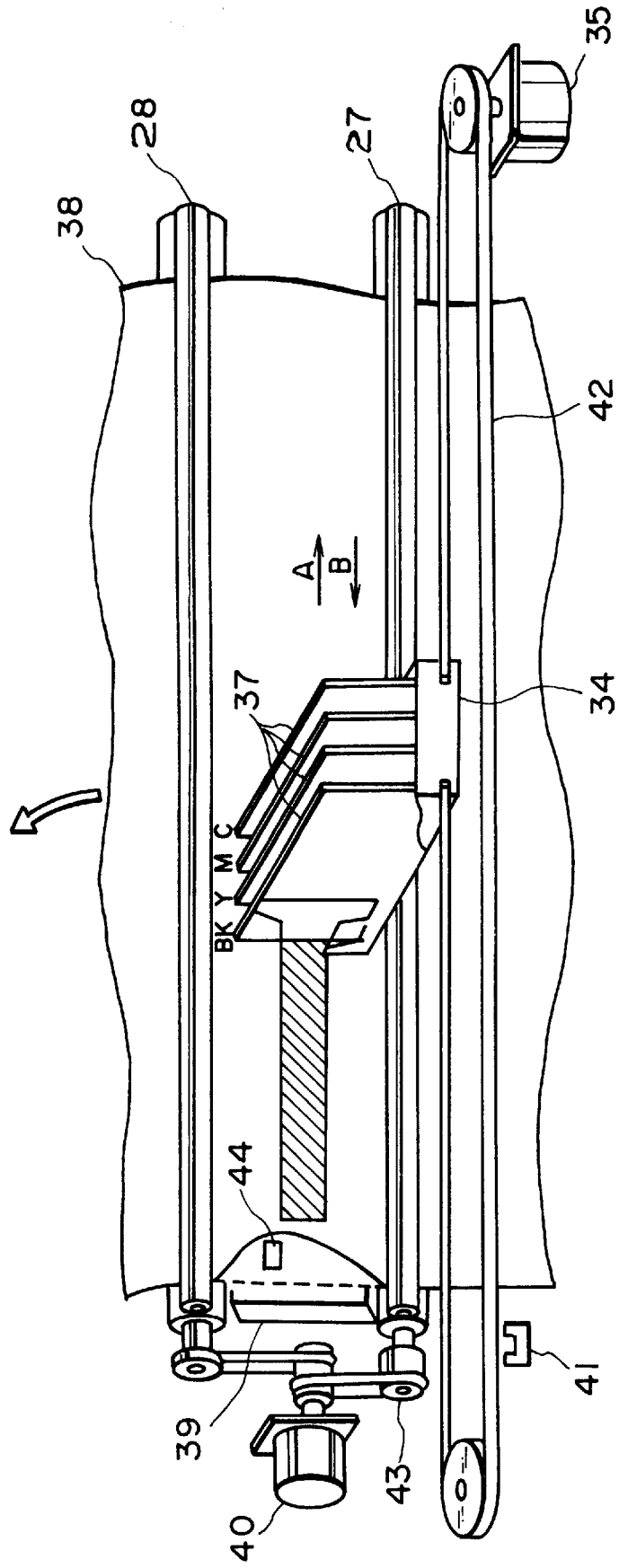
FIG. 3 illustrates a printing process.

Referring to FIG. 3, the detailed description will be made about the structure around the scanning carriage 34.

In FIG. 3, a sheet feed roller 40 functions as a driving source for intermittently feeding the recording sheet and drives the second sheet feed roller 27 through the sheet feed roller 28, and a second sheet feed roller clutch 43.

The scanning motor 35 is a driving source for scanningly moving the scanning carriage 34 through a scanner belt 34 in the directions A and B indicated by arrows. In this embodiment, in order to assure the correct sheet feed control, a pulse motor is used for the sheet feed motor 40 and the scanning motor 35.

When the recording sheet reaches the second sheet feed roller 27, the second sheet feed roller clutch 43 and the sheet feed motor 40 are actuated to convey the recording sheet to the sheet feed roller 28 on the platen 39.

The recording sheet is detected by a sheet detecting sensor 44 provided on the platen 39, and the output thereof is used for position control and jam clearance control.

When the recording sheet reaches the sheet feed roller 28, the second sheet feed roller clutch 43 and the sheet feed motor 40 are deactuated, and a sucking operation is actuated from an inside of the platen 39 by an unshown sucking motor, by which the recording sheet is closely contacted to the platen 39.

Prior to the image recording operation on the recording sheet, a scanning carriage 34 is moved to the position of a home position sensor 41, and then, the scanning operation is started in the direction A. From a predetermined position, the cyan, magenta, yellow and black ink materials are ejected from the recording heads 37 to effect the image recording. Upon completion of the image recording over a predetermined length, the scanning carriage 34 is stopped, and is moved in the backward direction (arrow B) to return the scanning carriage 34 to the position of the home position sensor 41. During the backward movement, the sheet feed motor 40 drives the sheet feed roller 28 to feed the sheet through a distance corresponding to the record by the recording head 37, in the direction C.

In this embodiment, the recording head 37 is in the form of an ink jet nozzle pipe wherein a bubble is produced by heat, and a pressure resulting therefrom is used to eject a droplet of ink. Each of the four recording heads has an array of 256 nozzles.

When the scanning carriage 34 is stopped at the home position where the home position sensor 41 detects the carriage 34, the recovery operation for the recording head 37 is effected. The recovery operation is carried out to stabilize the recording operation. More particularly, in order to prevent the non-uniformity of the image attributable to the variation of the ink viscosity in the nozzles of the recording head 37, a pressurizing operation or ink idle ejecting operation of the recording head 34 is carried out in accordance with programmed conditions on the basis of sheet feed period, ambient temperature and ejection period or the like.

By repeating the above-operations, the recording operation is effected on the entire surface of the recording sheet.

Scanner

Figure 4:
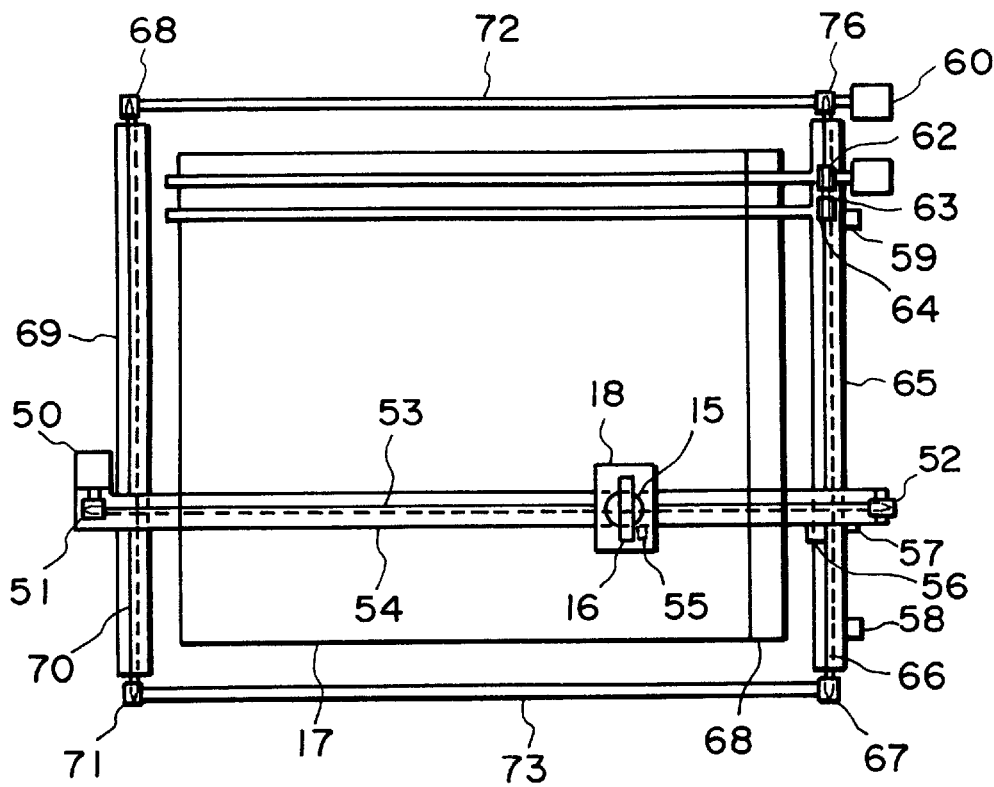
FIG. 4 illustrates a scanning operation.
Figure 5:
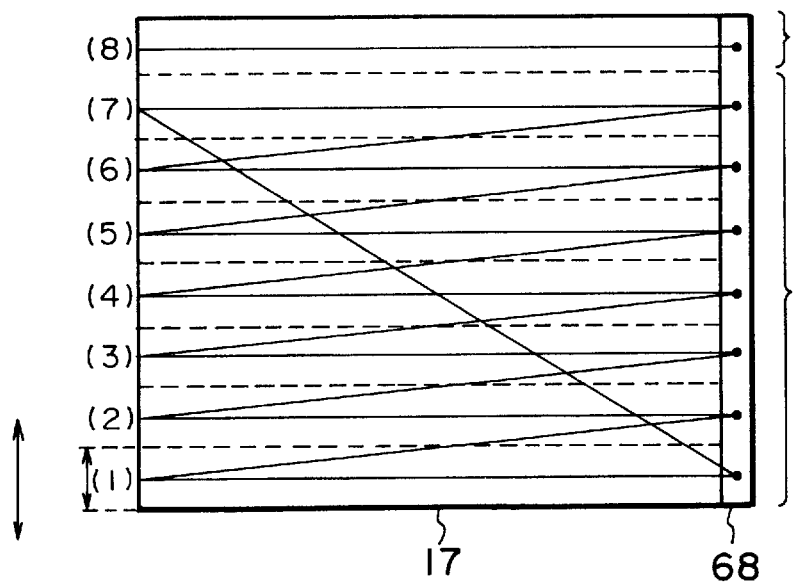
FIG. 5 illustrates a scanning process of a scanner.

Referring to FIGS. 4 and 5, the description will be made as to the operation of the scanner 1.

FIG. 4 illustrates the internal mechanical structure of the scanner 1.

A CCD unit 18 comprises CCD elements 16 and a lens 15 or the like and is movable on a rail 54 by a main scan direction driving system including a main scan motor 50 fixed on the rail 54, pulleys 51 and 52 and a wire 53. With the movement, it reads the image of the original on the original supporting platen glass 17 in the main scan direction. The light blocking plate 55 and the home position sensor 50 are used for the position control upon movement of the CCD unit 18 to the main scan home position in a correction area 68 shown in the Figure.

The rail 54 is mounted on rails 65 and 69 and is driven by a sub-scan direction driving system including a sub-scan motor 60, pulleys 67, 68, 71 and 76, shafts 72 and 73 and wires 66 and 70. The light blocking plate 57 and the home position sensors 58 and 59 is used for the position control upon movement of the rail 54 to the sub-scan home positions upon a book mode operation in which thick originals such as a book placed on the original supporting platen glass 17 and upon a sheet mode operation in which a sheet original is read, respectively.

A sheet feed motor 61, sheet feed rollers 74 and 75, pulleys 62 and 64 and wire 63 constitute a mechanism for feeding the sheet original. The mechanism functions to feed the sheet original placed down on the original supporting platen glass 17 with predetermined increments by the sheet feed rollers 74 and 75.

FIG. 5 illustrates the reading operation in the book mode and the sheet mode.

In the book mode, the CCD unit 18 is moved to the book mode home position (book mode HP) in the correction area 68 shown in FIG. 5, and the reading operation for reading the entire surface of the original placed on the platen glass 17 is started here.

Prior to the scanning of the original, a data setting operation is effected for the shading correction, the black level correction, a color correction or the like, in the correction area 68. Thereafter, the scanning operation in the main scan direction is started by the main scan motor 50 in the direction indicated by an arrow. Upon completion of reading of an area (1), the main scan motor 50 is reversed, and simultaneously, the sub-scan motor 60 is actuated to effect the sub-scan movement to the correction area 68 (2). Subsequently, similar to the main scan of the area (1), the shading correction, the black level correction, the color correction or the like are effected, as desired, and the area (2) is read.

By repeating the above scanning operation, all areas (1)–(7) are read. After reading the area (7), the CCD unit 18 is returned to the book mode home position.

In this embodiment, the original supporting platen glass 17 actually has a larger number of scanning operations to read A2 size originals (maximum), but, the description is made simple for the purpose of easy understanding.

In the sheet mode, the CCD unit 18 is moved to a sheet mode home position (sheet mode HP). The area (8) is repeatedly read while the sheet original is being intermittently fed by the sheet feed motor 61, so as to read the entire area of the sheet original.

Prior to the scanning of the original, the shading correction, the black level correction, the color correction or the like are effected in the correction area 68. Subsequently, the main scan movement is started by the main scan motor 50 in the direction indicated. After reading the area (8) in the forward stroke, the main scan motor 50 is reversed, and during the reversed scanning movement, the sheet feed motor 61 is driven to feed the sheet original in the sub-scan direction through a predetermined distance. Subsequently, the same operation is repeated to read the entire surface of the sheet original.

In the foregoing, the original reading operation has been described as a one-to-one reading operation. Since however, the digital color copying machine of this embodiment has enlarging and reduction functions, the area which the CCD unit 18 is capable of reading is actually larger, as shown in FIG. 5. The area recordable by the recording head 37 per one scan is fixed to be 256 bits, and therefore, when 50% reduction recording is effected, for example, the image information covering twice the area (512 bits) at minimum is required. Therefore, the scanner 1 has a function of reading and outputting image information of a desired image area in accordance with one main scan reading operation.

Film Projection System

The scanner 1 in this embodiment is usable with projection exposure means for film projection.

Figure 6:
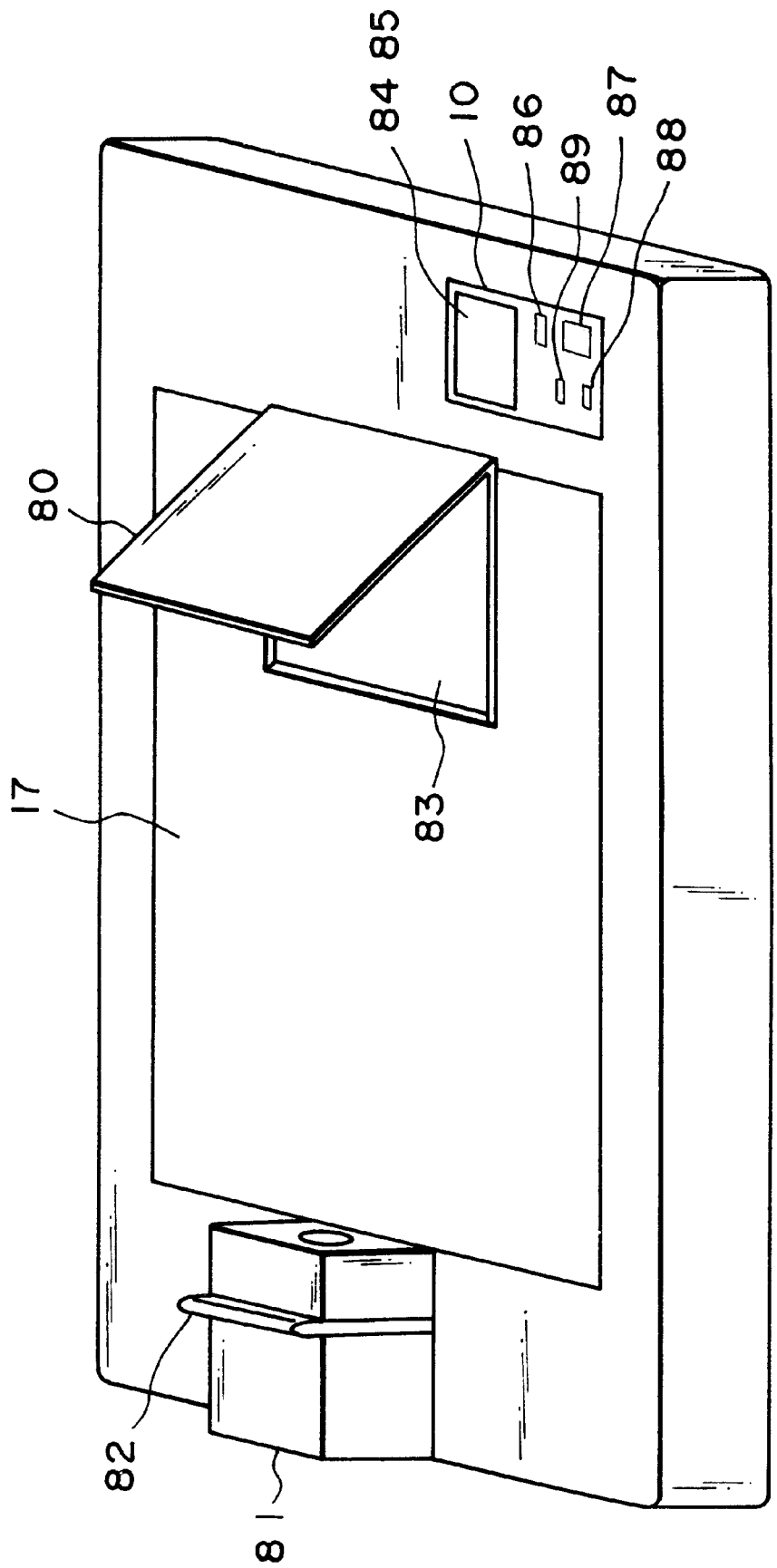
FIGS. 6–8 illustrate a film projector.

FIG. 6 is a perspective view in which a projection exposure means is mounted on the scanner 1, the exposure means comprising a projector unit 31 and a reflection mirror 80.

The projector unit 81 functions to project an image of a negative or positive film. The film is retained on a film holder 82, and it is mounted on the projector unit 81. The image projected by the projector unit 81 is reflected by a reflection mirror 80 to reach a Fresnel lens 83. The lens 83 converts the image to parallel light and forms the image on the original supporting platen glass 17.

In this manner, the image of the negative or positive film is imaged on the original supporting glass 17 by the projector unit 81, the reflection mirror 80 and the lens 83, and therefore, the CCD unit 18 can read the image, similarly to the original read on the basis of the reflected light.

Figure 7:
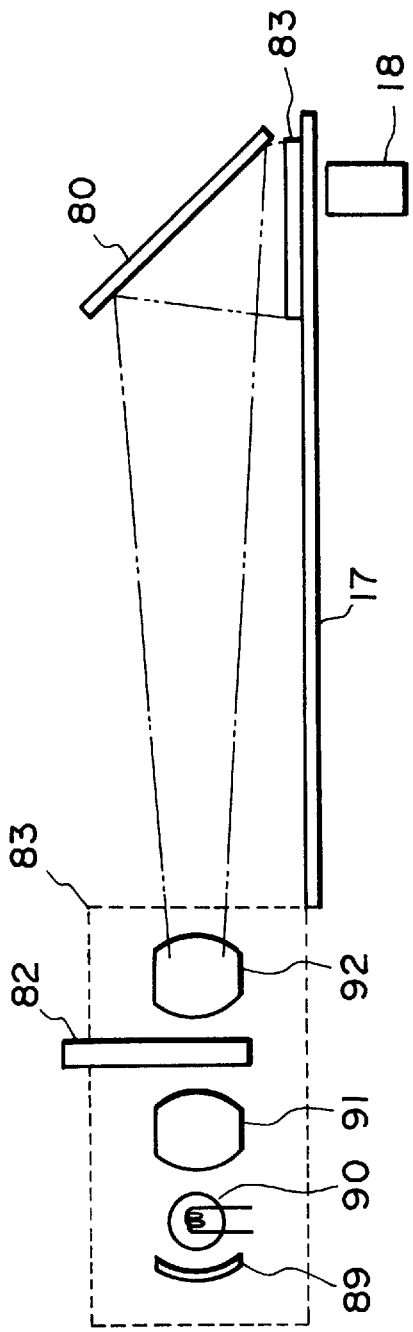

FIG. 7 illustrates the film projection system in further detail. The projector unit 81 includes a halogen lamp 90, a reflection plate 89, a condenser lens 91, a film holder 82 and a projection lens 92. The direct light from the halogen lamp 90 and the reflected light reflected by the reflecting plate 89 are condensed by the condenser lens 91 and reach a window of the film holder 82. The size of the window of the film holder 82 is slightly larger than one frame of the negative or positive film, and therefore, the film can be mounted thereon with sufficient margins.

The projection bite reaching the window of the film holder 82 transmits through the film mounted thereon, by which a projection image of the film can be provided. The projected image thus provided is optically enlarged by the projection lens 92 and is folded by a reflection mirror 80, and then, is converted to parallel image light by the Fresnel lens 83.

The image is read by the CCD unit 18 in the scanner 1 in the book mode, and the CCD unit 18 produces video signals.

Figure 8:
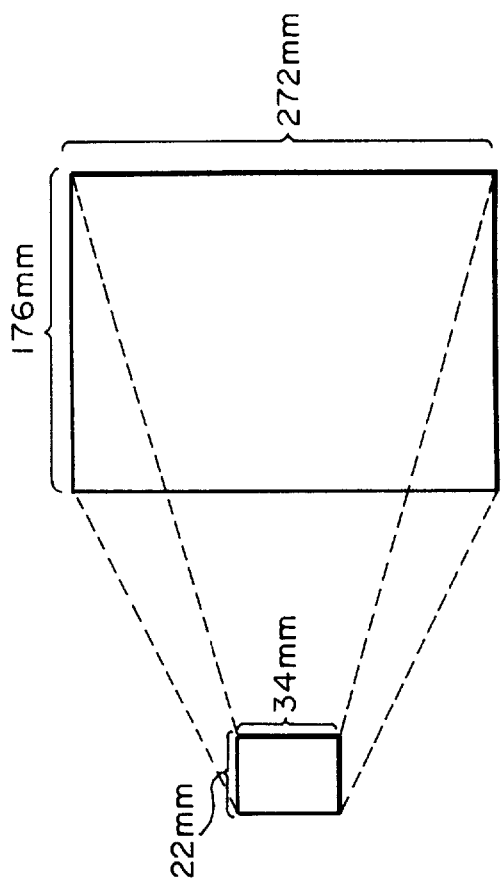

FIG. 8 shows an example of a relation between the film and an image projected on the original supporting platen glass.

The image of the film having a size of 22×34 mm is enlarged to eight times on the original supporting platen glass 17.

General Function Blocks

Figure 9:
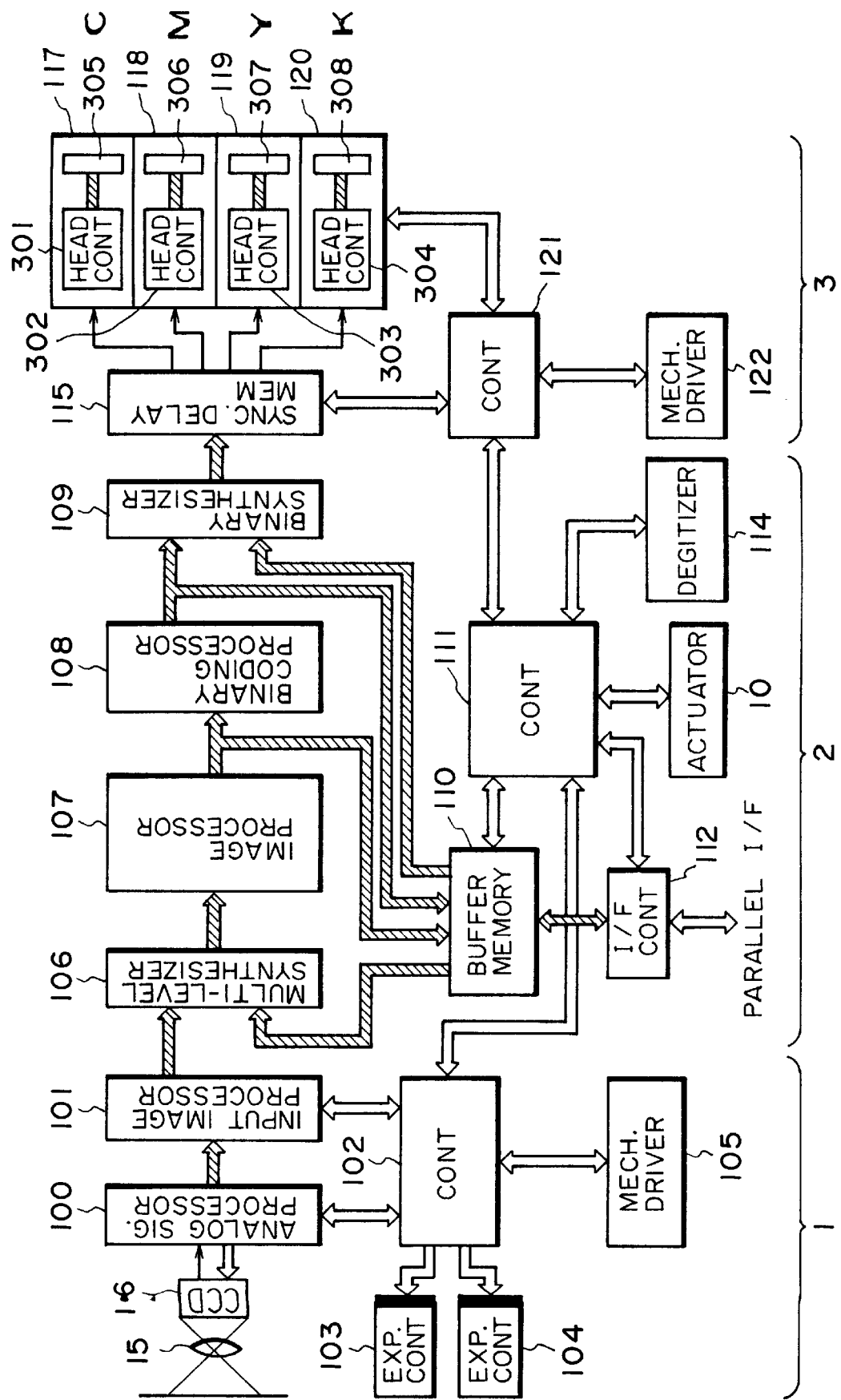
FIG. 9 is a block diagram illustrating the entire control system.

Referring to FIG. 9, the description will be made as to the function blocks of the digital color copying machines. The control circuits 102, 111 and 121 control the scanner 1, the controller 2 and the printer 3. They are constituted by microcomputers, program ROMs, data memory and communication circuits or the like. Between the control circuits 102–111 and the control circuits 111–121, there is communication wiring to connect them to each other. The control system is in the form of a master-slave system in which the control circuits 102 and 121 operate in accordance with the instructions from the control circuit 111.

The control circuit 111, when the apparatus functions as a color copying machine, performs its operation in accordance with the input instructions in the operation panel 10 and in the digitizer 114.

As shown in FIG. 6, the operation panel 10 is provided with a touch panel 85, for example, which comprises liquid crystal (LCD) display 84 and a transparent electrode thereon. Therefore, the selective instructions can be given in the color or in the editing operation. Frequently used keys are provided separately therefrom, the frequently used keys include operational keys such as a start key 87 for instructing a start of the copy operation, a stop key 88 for stopping the copy operation, a resetting key 89 for resetting the operational mode to a standard state or a projector key 86 for selecting a projector.

The digitizer 114 is provided to input positional information necessary for the trimming or masking treatment, and is used optionally when a complicated editing treatment is required.

The control circuit 111 controls a versatile parallel interface control circuit (I/F controller) 112 for controlling IEEE-488 or so-called GP-IP interface or the like. Through the interface, the inputting and outputting of the image data relative to an external apparatus, and a remote control by an external apparatus, are accomplished.

The control circuit 111 controls a multi-level synthesizer 106 for performing various processing of the image, the image processor 107, a binary coding processor 108, a binary synthesizer 109 and a buffer memory 110.

The controller 102 controls a mechanical driver 105 for controlling the mechanical driver of the scanner 1. There are provided an exposure controller 103 for controlling exposure of the lamp upon reading the reflected original and an exposure controller 104 for controlling the exposure by the halogen lamp 90 when the projector is used. The controlling circuit 102 controls an analog signal processor 100 for effecting various processing relating to the image and also controls the input image processor 101.

The control circuit 121 controls the mechanical driver 105 for controlling the mechanical drive of the printer 3 and a synchronizing and delaying memory 115 for accommodating time variation in the mechanical operation of the printer 3 and for correcting delay attributable to the arrangements of the recording heads 117–120.

Referring to FIG. 9, the image processing block will be described along with the image processing operation.

The image formed on the CCD 16 is converted to analog electric signals by the CCD 16. The image information thus converted is processed serially in the order of red, green and blue, or the like, and is transmitted to the analog signal processor 100, which performs, for the respective colors, sampling and holding operations, dark level correcting operations, dynamic range control operations, and which, thereafter, effects analog/digital (A/D) conversion to produce digital image signals of serial multi-level type (8 bit length for each color in this embodiment). The digital image signals are outputted to the input image processor 101.

The input image processor 101 effects the correcting operations such as CCD correction, and γ-correction which is required in the reading system to the digital image signal of the serial multilevel type.

The multilevel synthesizer 106 of the controller 2 effects selection and synthesization of the digital image signal of the serial multilevel type sent from the scanner 1 and the digital image signal of the serial multilevel type transmitted through the parallel I/F circuit. The selected and synthesized image data is transmitted to the image processor 107 in the form of a digital image signal is serial multi-level type.

The image processor 107 performs a smoothing treatment, the edge enhancing treatment, a black extraction treatment, a masking treatment for the color correction of the recording ink used by the recording heads 117–120, or the like. The digital image signal output of the serial multi-level type is supplied to a binary coding processor 108, and the buffer memory 110.

The binary coding processor 108 functions to convert the serial multi-level digital image signal to binary coded signals. It can use simple binary levels with a fixed slice level, or a plausible halftone treatment (dither method), selectively. Here, the serial multilevel digital image signal is converted to a binary coded parallel image signals of four colors. The binary level synthesizer 109 receives four color image data, and the buffer memory 110 receives three color image data. The synthesizer 109 effects selection and synthesization of the binary coded parallel image signal of three colors transmitted from the buffer memory 110 and the binary coded parallel image signal of four colors transmitted from the binary coding processor 108, so as to provide binary parallel image signals of four colors.

The buffer memory 110 is for input and output of the multi-level image and the binary level image through the parallel I/F. It comprises the memory enough to cover the three colors.

The synchronizing and delay memory 115 of the printer 3 is effective to accommodate the time variation in the mechanical operation of the printer 3 and to correct the delay attributable to the mechanical arrangement of the recording head units 117–120. In the memory 115, the timing required for driving the recording head units 117–120 is produced.

The head controllers 301–304 are in the form of analog driving circuits for driving the recording heads 305–308. They produce signals therein to directly drive the recording heads 305–308.

The recording head units 117–120 in this embodiment, as described in the foregoing, are each constituted by head controllers 301–304 and recording heads 305–308. In the head controllers 301–304, EEPROM (not shown) and a head driver circuit are provided. In addition, they store the image density non-uniformity correction data which will be described hereinafter. The image density correction data therein are read out of them by the controller 309 and are written by the same. Normally, the controller 309 does not write.

The recording head units 117–120 function to record images in the cyan color, the magenta color, the yellow color and the black color with the respective ink materials.

FIG. 10 illustrates the timing of the image among the circuit blocks of FIG. 9.

A signal BVE is indicative of the image effective interval per one scan of the main scan reading operation described in conjunction with FIG. 5. By producing plural times the signal BVE, the image signals covering the entire surface are outputted.

A signal VE is indicative of the effective interval of the image per one line read by the CCD 16. The signals VE are effective only when the signal BVE is on.

A signal VCK is a clock signal for the supply of the image data VD. The signals BVE and VE change in synchronism with the signal VCK.

A signal HS is a signal used when the signal VE repeats the effective and ineffective intervals non-continuously during one line output. The signal HS is not necessary when the signal VE is continuously effective during one line scan. The HS signal represents the start of the one line image output.

Figure 11:
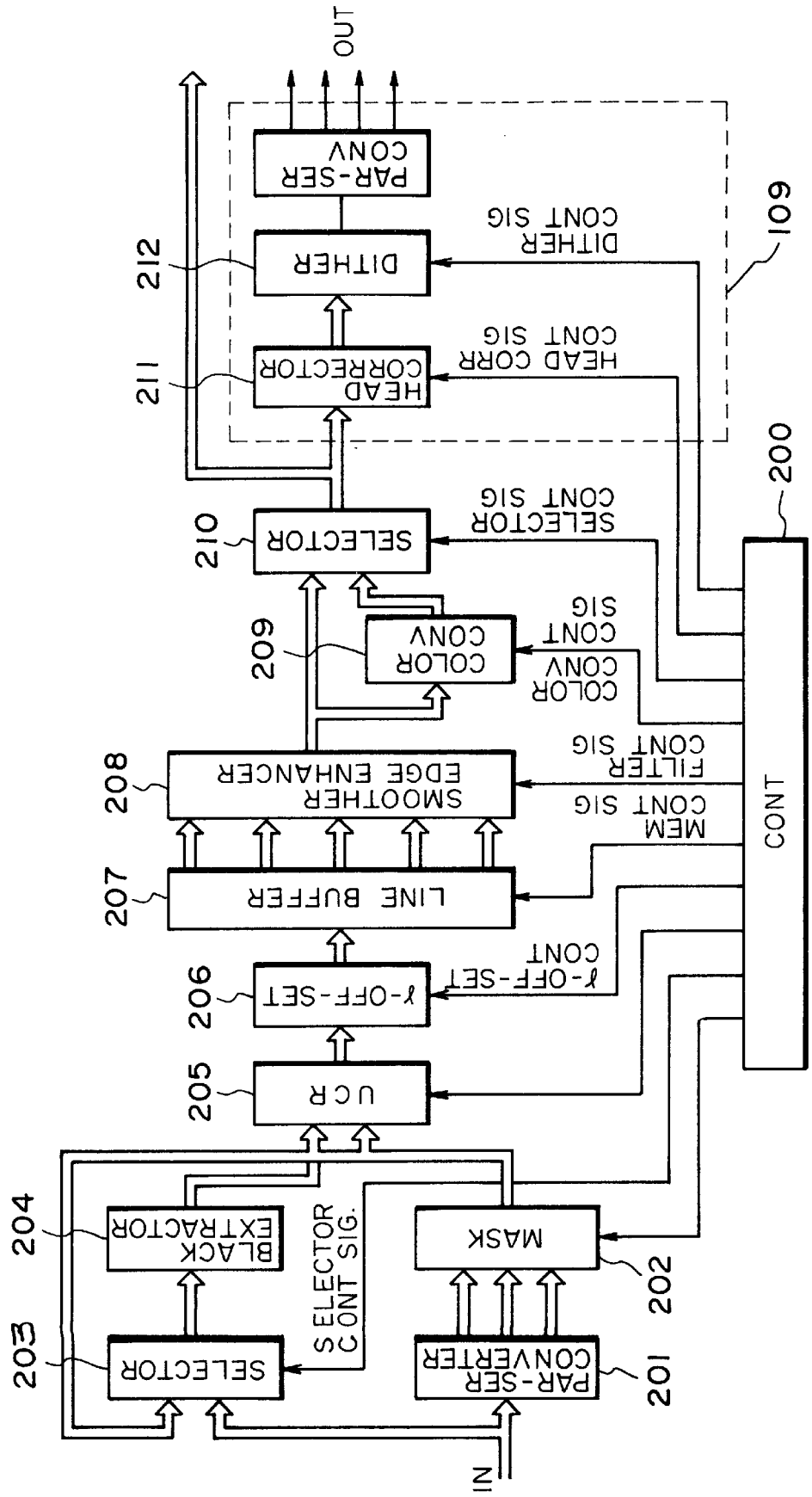
FIG. 11 is a block diagram illustrating image processing operation.

Referring to FIG. 11, a general description will be made as to the signal processing in the image processor.

In FIG. 9, the image data, which will hereinafter be called "input image data" supplied serially to the image processor 109 (in the order of red, green and blue, for example), are transmitted to the serial-parallel converter 201, and are converted to parallel signals of Y (yellow), M (magenta) and C (cyan). Thereafter, they are transmitted to the masking treatment processor 202 and the selector 203 shown in FIG. 11. The masking processor 202 is effective to correct the mixture of the output ink, and performs the following calculations:

$$\begin{pmatrix} Y' \\ M' \\ C' \end{pmatrix} = \begin{pmatrix} a11 & a12 & a13 \\ a21 & a22 & a33 \\ a31 & a32 & a33 \end{pmatrix} \begin{pmatrix} Y \\ M \\ C \end{pmatrix}$$

where Y, M and C are input data, and Y', M' and C' are output data. After the ink mixture is corrected by the masking processor 202 determined by the masking control signal from the controller 200, the above nine coefficients are supplied as serial signals to the selector 203 and to a UCR 205. To the selector 203, the input image data and the image data produced by the masking processor 202 are supplied.

Normally, the selector 203 selects the input image data by a selector controlling signal 1 transmitted from the controller 200. When the color correction by the input system is not sufficient, the image data from the masking processor 202 is selected and outputted in response to a control signal 1. The serial image data produced by the selector 203 are supplied to a black extractor 204. In order to determine a picture element providing minimum Y, M and C components as black level, the black extractor 204 detects the minimum levels of the Y, M and C components. The detected black data are supplied to the UCR 205.

In the UCR 205, the extracted black data are deducted from the Y, M and C signals. The black data are simply multiplied by a coefficient. The black data supplied to the UCR 205 are subjected to the time deviation correcting operation in connection with the image data supplied from the masking processor 202, and then is subjected to the following calculations:

$Y'=A-a_1 Bk$ $M'=M-a_2 Bk$ $C'=C-a_3 Bk$ $Bk'=a_4 Bk$ where Y, M, C and Bk represent input data to the extractor; and Y', M', C' and Bk' represent output data from the extractor. The coefficients $a_1$, $a_2$, $a_3$ and $a_4$ are determined in accordance with UCR control signals supplied from the controller 200.

The data produced by the UCR 205 are then supplied to a γ offset processor 206, which effects the tone correction in accordance with the following equations:

$Y'=b_1(Y-C_1)$ $M'=b_2(M-C_2)$ $C'=b_3(C-C_3)$ $Bk'=b_4(Bk-C_4)$ where Y, M, C and Bk represent input data to the γ offset processor; Y', M', C' and Bk' represent output data from the γ offset processor.

In the above equation, the coefficients $b_1$–$b_4$ and $C_1$–$C_4$, are determined in accordance with offset control signals supplied from the controller 200.

The signals having been subjected to the tone correction by the γ offset processor 206 are then sent to the line buffer 207 storing the image data for N lines. The line buffer 207 outputs 5 line data a 5 line parallel system to a subsequent smoothing and edge enhancing processor 208 in accordance with a memory control signal supplied from the controller 200. The 5 line signals are supplied to a spatial filter having variable filtering size in accordance with a filter control signal from the controller 200, by which they are smoothed. Thereafter, the edge enhancing treatment is effected. In the smoothing operation, as shown in FIG. 12, an average of a particular picture element and an adjacent picture element or elements is set as the density level of the particular picture element, by which the image noise is removed. The difference between the particular picture element data and the smoothed data are determined as edge signals. By adding the edge signals to the particular picture element data, the edge is enhanced. The detailed description of the smoothing edge enhancer 208 is omitted, since it does not constitute the significant part of the present invention.

The image data produced by the smoothing and edge enhancer 208 are supplied to the color converter 209 which effects the color conversion in accordance with the color conversion control signal supplied from the controller 200. The color which is to be converged and the color to which the color is converted, and the area in which the conversion signal is effective are inputted beforehand by the digitizer 114 of FIG. 9. On the basis of the data, the color converter 209 converts the image data. In this embodiment, the detailed description of the color converter 209 is omitted, since it does not constitute the significant part of the present invention. The image signal produced by the smoothing and edge enhancing processor 208 and the image signal having been subjected to the color conversion, are supplied to the selector 210, and the image data to be outputted is selected by the selector controlling signal 2. The selection is determined by the setting of the effective area inputted by the digitizer 114. The image signal selected by the selector 210 is supplied to the buffer memory 110 and the binary coding processor 108 of FIG. 9.

Here, the detailed description of the system for the input to the buffer memory 110 is omitted, since it does not constitute the significant part of the present invention.

The description will be made as to the binary coding processor 108. The image supplied to the processor 108 is in turn supplied to a head corrector 211 of FIG. 11. The head corrector 211 will be described in detail hereinafter. The image signal having been subjected to the density correction by the head corrector 211 is supplied to a dithering processor 212 in serial 8 bit system in a the order of Y, M, C and Bk.

The dithering processor 212 has a 6 bit memory area for the main-scan direction and a 6 bit memory area in the sub-scan direction for each of the color components; or a 4 bit memory area for the main-scan direction and an 8 bit memory area for the sub-scan direction. In accordance with the dithering control signal from the controller 200, the dithering matrix size and the dithering threshold level in the matrix are set. During the operation of the dithering processor circuit, the image reading interval signals for 1 line of the CCD in the mechanical main scan direction, and the image video clock signals in the sub-scan direction, are counted respectively, and the set dithering threshold level in the memory area is read out. The memory area may be serially switched among Y, M, C and Bk components, by which the dithering threshold levels are provided serially. The threshold levels are compared with the image data supplied to an unshown comparator and supplied from the selector 210.

From the comparator, the following is outputted:
image data>threshold: 1
image data≦threshold: 0

The data are then outputted by the serial-parallel converter in the form of parallel 4 bit data to the buffer memory 110 of FIG. 9 and to the binary level synthesizer 109.

Figure 14:
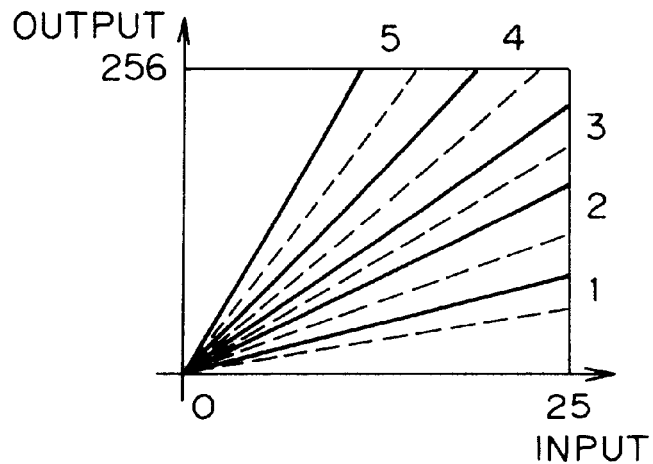
FIG. 14 is a block diagram illustrating image density non-uniformity correction for a recording head.
Figure 15:
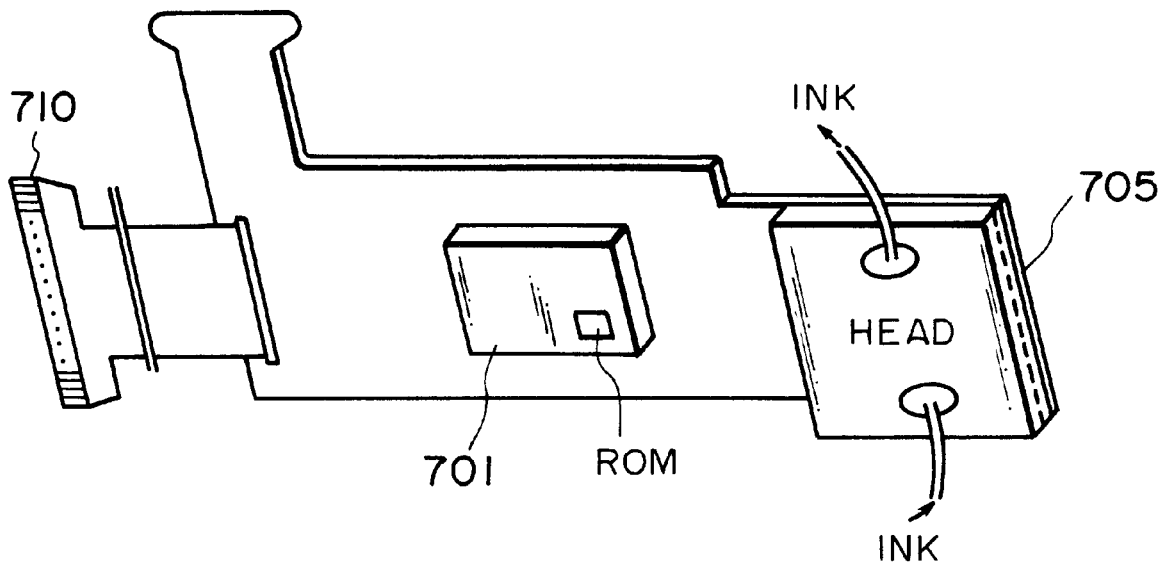
FIG. 15 is a perspective view of an outer appearance of a recording head according to an embodiment of the present invention.

Referring to FIGS. 14 and 15, the description will be made as to the head corrector 211.

FIG. 15 schematically shows a single color part of the recording heads 117–120. In the following description, the C recording head is taken. Reference numerals 705 and 701 designate the recording head and a recording head controller, respectively. A connector 710 connects the head controller 701 and the controller 309. In the head controller 701, a head driver and EEPROM are built in to be constituted as a hybrid IC.

Figure 13:
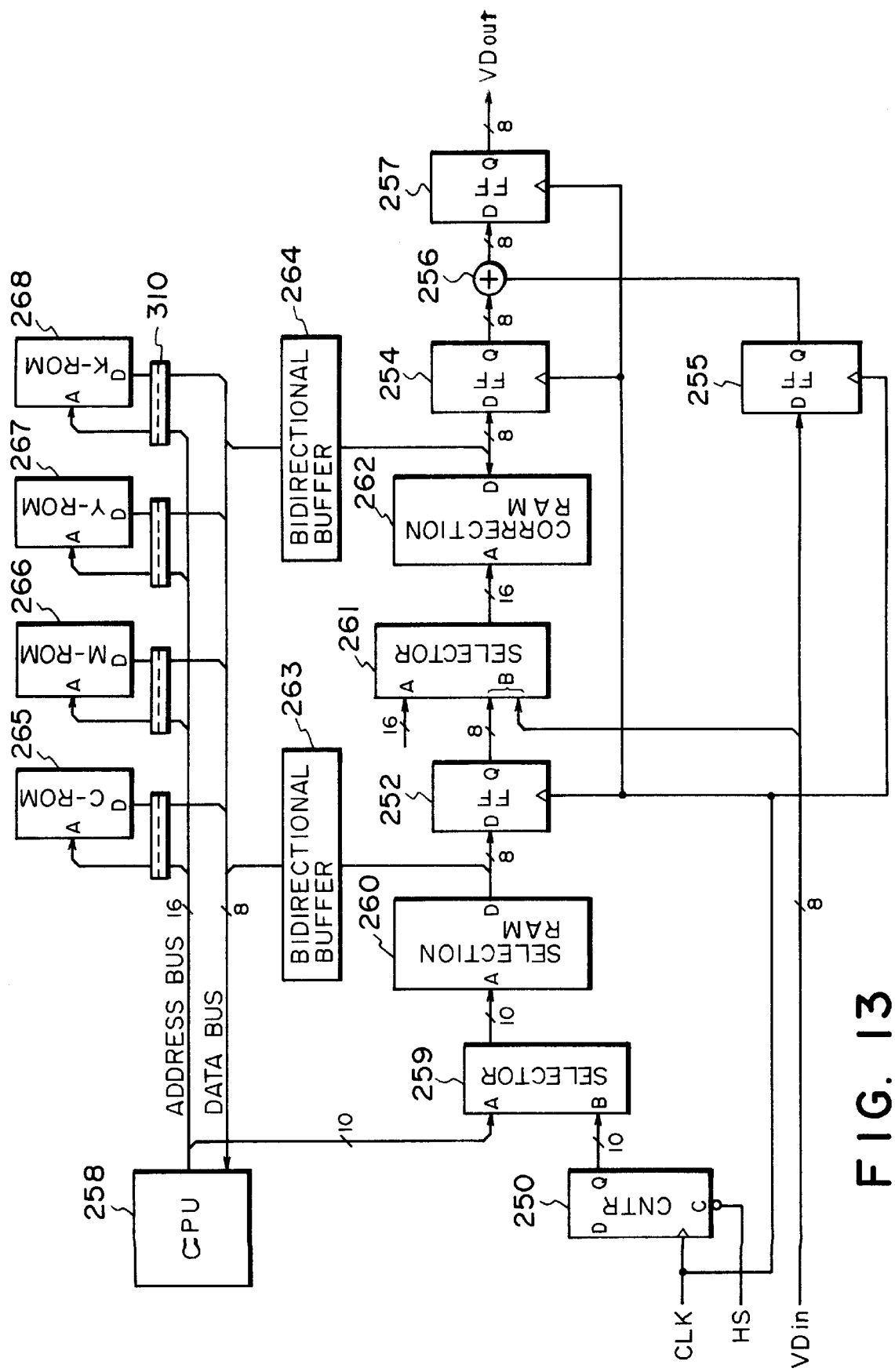
FIG. 13 is a block diagram illustrating the structure of a head corrector.

In FIG. 13, the EEPROM is designated by reference numerals 265–268. They are provided for the respective colors C, M, Y and Bk of the recording head units 171–120. Reference characters INK and the accompanying arrows IN and OUT designate an ink supply port and an ink discharge port.

Figure 17:
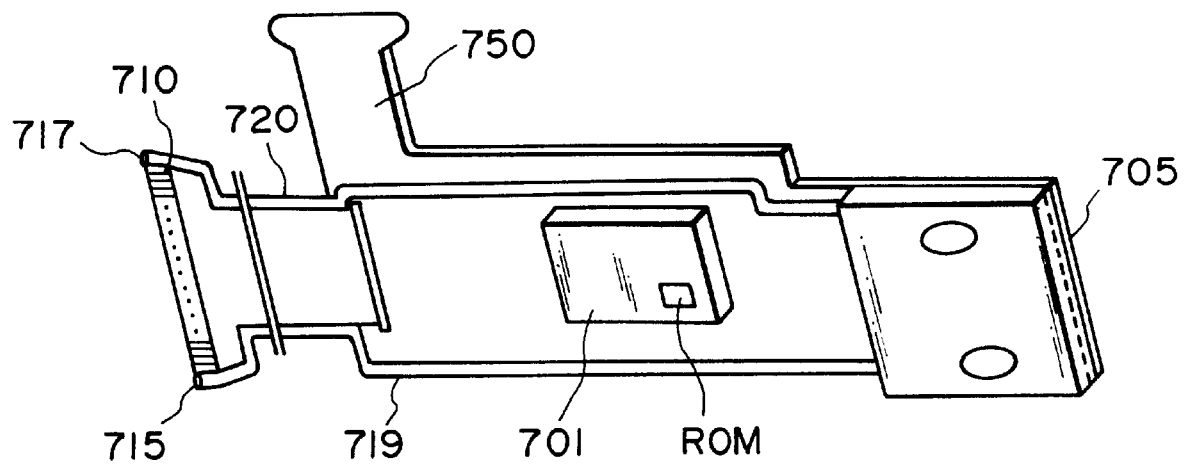
FIG. 17 shows a modification of the recording head of FIG. 15.

FIG. 17 shows a modification of the recording head of FIG. 15. In the modified embodiment, the ink supply port 715 and the ink discharge port 717 are constituted as a unit with the connector 710, and therefore, the recording head is easily mounted on or dismounted from the main assembly of the image recording apparatus.

In FIG. 13, the ROM 265–268 stores characteristics information of the density non-uniformity for the 256 nozzles of the C, M, Y and Bk recording heads, respectively. In this embodiment, each of the recording heads has 256 nozzles, and therefore, the density non-uniformity correcting data corresponding to the number of nozzles are written in the ROMs 265–268. The digital image data VDin serially contain color component image data for one picture element, for example, in the form of Y, M, C, K, Y, M, C, K. Data is taken out from the ROMs 265–268 in the order of the input image data and are stored in a selection RAM 260. A bidirectional buffer 263 permits the data taken out of the ROMs 265–268 to be written in the RAM 260.

A selector 259 selects one of lower 10 bits of the address data of the 16 bit address bus outputted from the CPU 258 and 10 bit output of the counter 250. When the data is written in the RAM 260, the selector 259 selects the output of the CPU 258; when the data is read out of the RAM 260, the output of the counter 250 is selected. In the correction RAM 262, the data from the CPU 258 are written in. A selector 261 selects either of address data of 16 bits from the CPU 258 or a 16 bit sum of 8 bit output from the flip-flop circuit 252 and 8 bit image data input VDin, and the selected one is supplied to the correction RAM 262. In the correcting RAM 262, a correcting table shown by solid or broken lines 1–5 of FIG. 14 is written by the CPU 258. In FIG. 14, five correcting tables indicated by solid lines are shown, but the number of actual correcting tables is larger. The solid line or broken line correcting tables 1–5 are selected in accordance with the data supplied to the correcting RAM 262. More particularly, when the selector 261 selects the B side, the 8 bit image data input VDin and 8 bit recording head image density non-uniformity correcting data are inputted to the RAM 262. Of these, the 8 bit correction data is used to select the solid lines or broken lines 1–5. The solid lines represent the correction data upon one-to-one image production, and the broken lines represent the data for the varied magnification image production. In accordance with the region of the nozzles used in the head, the CPU 258 writes the broken line or solid line data in the correcting RAM 262.

The table is written in the correcting RAM 262 in such a manner that a correction datum ΔA is produced in response to an input A. The correction datum ΔA is temporarily latched by the flip-flop circuit 254, and is added with an input image datum ΔA by an adder 256. Then, the flip-flop 257 produces a corrected datum A+ΔA.

The lines for the correcting tables may be rectilinear or curved.

In this embodiment, cubic equations are used as preferable examples, and the output data VDout are calculated by the following equations, since the head non-uniformity correcting amounts are within ±15%:

$$VDout = aD^3 in + bD^2 in + cDin + d$$

$$a = \begin{cases} 2.24 \times 10^{-6} \times N & (N < 0) \\ -2.04 \times 10^6 \times N & (N \geq 0) \end{cases}$$

$$b = \begin{cases} -3.33 \times 10^{-4} \times N & (N < 0) \\ 2.37 \times 10^{-4} \times N & (N \geq 0) \end{cases}$$

$$c = \begin{cases} 1 + 0.006 \times N & (N < 0) \\ 1 - 0.0005 \times N & (N \geq 0) \end{cases}$$

$$d = 0$$

where Din is input image density, Dout is output density, and N is correcting amount.

Referring to FIG. 13, operation of the apparatus according to this embodiment wherein the correction is made as shown in FIG. 13, will be described.

After the main switch is actuated, and before the copy start key is pressed, the selectors 259 and 261 select A side inputs. Then, the selecting RAM 260 receives the data from the ROMs 265–268 in the order of Y, M, C and K components of the input image data VDin, and the data are written in the RAM 260. In addition, before the copy start key is depressed, a broken line or solid line correcting table is written in the correcting RAM 262 in accordance with the set magnification.

When the copy start key is pressed, and the copying operation is started, the CPU 258 switches the selectors 259 and 261 to the b sides, that is, the image control sides. When the image signal VDin from the CCD is supplied to the head corrector 211, the address data from the counter 250 are inputted to the address of the selecting RAM 260 through the selector 259, and selection data for the respective nozzles for the respective colors are inputted to the selector 261 through the flip-flop 252. The selector 261 inputs the 8 bit input image signal VDin at lower digits of the correcting RAM 262 and 8 bit output signal of the selecting RAM 260 at the upper digits thereof. Thereafter, the correcting amount provided by the correcting RAM 262 in accordance with the above given equations is supplied to the adder 256 through the flip-flop circuit 254. The image signal VDin is also supplied to the adder 256 through the flip-flop circuit 255, and it is added with the correcting amount to execute the above given equation, and the corrected data are produced through the flip-flop circuit 257 from the head corrector 211 as data VDout. The output data is supplied to the dithering processor 212, and are binary coded. Then, they are supplied to the recording head 37 and are recorded thereby.

In the embodiment of FIG. 13, the correcting ROMS 265–268 are provided as a unit with each of Y, M, C and K recording heads. Therefore, in whichever manner, the C-recording head, M-recording head, Y-recording head and K-recording head are interchanged, the proper density correcting data can be provided. The ROMs used in this embodiment are EEPROMs, and therefore, the stored memory is retained even if the power supply thereto is shut. In addition, when the characteristics of the recording head are changed with long term use, the correcting data can be rewritten, and therefore, the service life of the recording head is elongated.

Another Embodiment (1) Referring to FIG. 16, a block diagram used with another embodiment will be described. In the embodiment of FIG. 13, a 16 bit address is given to each of EEPROMs 265–268, and the data are read out thereof. In the present embodiment of FIG. 16, the address or data or the like to the EEPROM storing the non-uniformity correcting data are serially transmitted. With the serial transmission, the reading or writing time required per one bite becomes longer. However, the reading or the writing operation of the correction data are not necessary at high speed. In addition, the amount of data transferred is 256 bites because 1 bite correction data is used per 1 nozzle of one recording head, and therefore, there is no problem.

Figure 16:
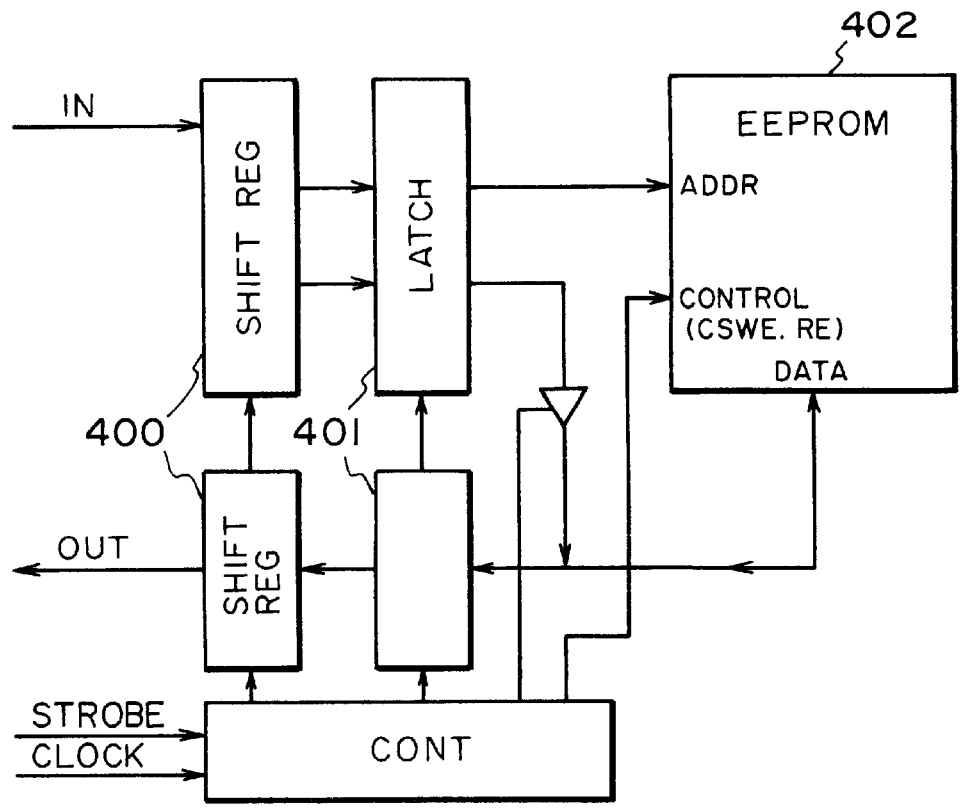
FIG. 16 is a block diagram according to a second embodiment of the present invention.

In FIG. 16, the data having been subjected to the serial-parallel conversion by the shift resistor 400 are latched by a latch 401, and are accessed by the EEPROM 402.

According to this embodiment, the number of communication lines can be reduced. This advantage is particularly significant when the structure of FIG. 3 is used wherein the communication line cable is folded back per one line printing, and therefore, the reliability is particularly enhanced.

(2) The storing means for storing the image density non-uniformity correcting data is not limited to the EEPROM, but may be another storing means such as a RAM. In such a case, a lithium battery or the like is used to supply electric power when the power supply to the apparatus is shut off.

(3) The storing means may store in addition to the image density non-uniformity correction data, other information peculiar to the head, for example, manufacturing lot number and the driving voltage level peculiar to the head (the optimum driving voltage may be different for the individual recording head), and the driving voltage is set on the basis of the stored information.

As described in the foregoing, according to the present invention, the storing means for storing correction data for the image non-uniformity peculiar to the individual recording head is integrally manufactured with the recording head. Therefore, no adjusting operation for the density non-uniformity correction is required. In addition, the possible production of the density non-uniformity due to the discrepancy between the head and the correcting ROM can be eliminated. In addition, the manufacturing and management cost for the recording head can be reduced. Furthermore, the exchange or interchange of the recording heads is easy, and the maintenance is simplified.

In the foregoing description, an ink jet recording system is taken, and therefore, the recording apparatus effects the recording operation using the multi-nozzle recording head for ejecting the ink. However, the present invention is not limited to the ink ejection type recording apparatus, and is usable with another apparatus using another recording head of a heat transfer type having a plurality of heat generating elements.

In the foregoing embodiment, when the recording condition for the recording element is corrected, the image data supplied to the recording element are corrected. The present invention is not limited to this system, but is applicable to a system wherein the electric energy supplied to the recording element is changed. In the case of an ink jet type printer wherein the ink is ejected using air pressure and electrostatic force, the recording condition for the recording element can be changed by changing one or both of the air pressure and the electrostatic force. The method of correction can be modified in various ways depending on the recording system of the image formation head.

As described in the foregoing, according to the embodiments of the present invention, the storing means for storing the correction data for correcting the non-uniformity is unified with the recording head, and therefore, the recording head exchanging manipulation is simple, and the cost is reduced with the reduction of the image non-uniformity.

Figure 18:
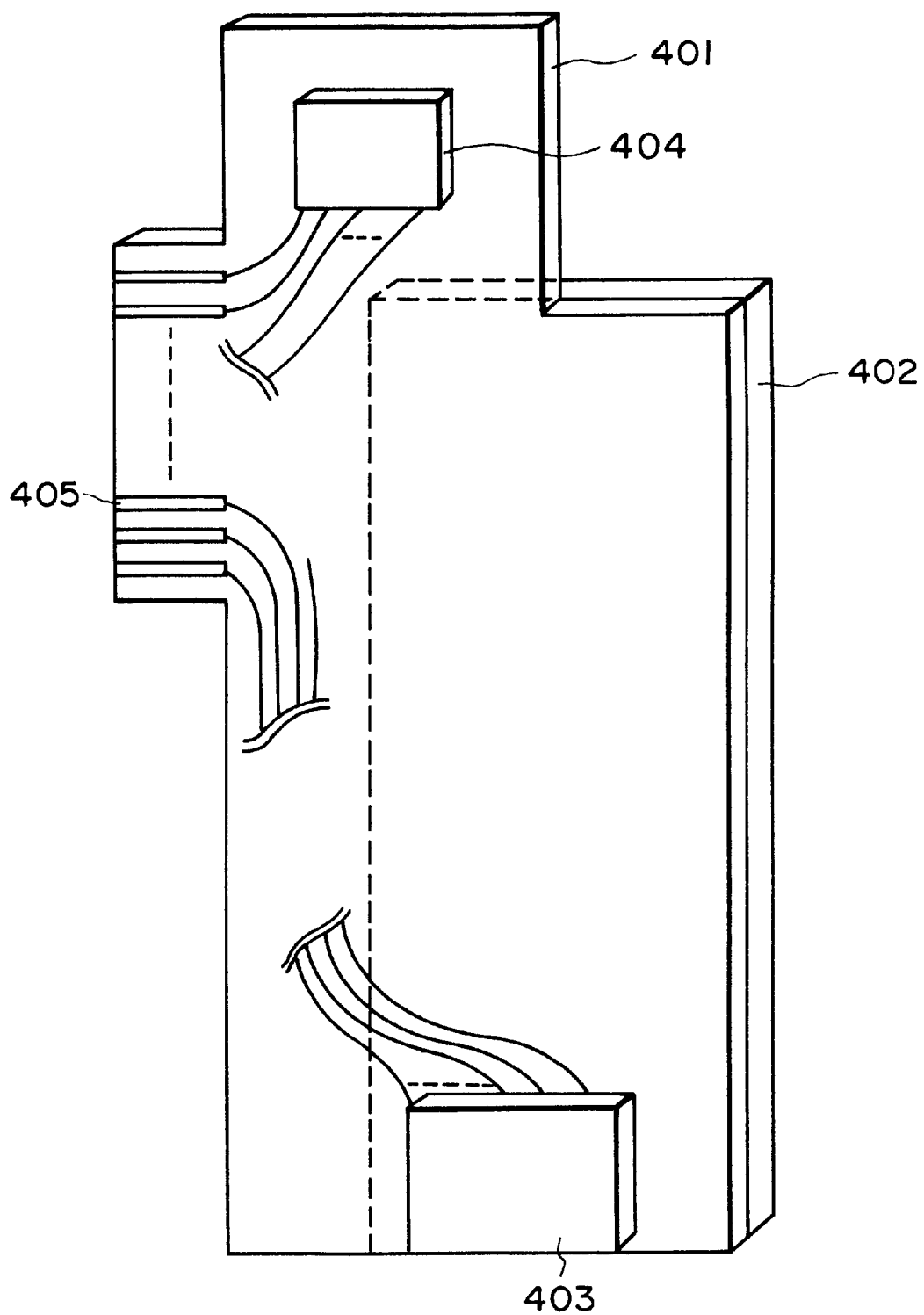
FIG. 18 is a perspective view of an outer appearance of a major portion of an ink jet recording head according to a third embodiment of the present invention.

Referring to FIG. 18, the description will be made as to the third embodiment of the present invention. In this Figure, reference numeral 401 designates a print board; 402, an aluminum heat radiating plate; 403, a heater board comprising heat generating elements and diode matrix; 404, EEPROM (voltage non-volatile memory) for storing the density non-uniformity information; and 405, electric contacts constituting a jointing portion with the main assembly of the printer. A linearly arranged array of the ejection outlets is not shown in this Figure. The print board 401 containing the heat generating elements of the ink jet recording head and a drive controller has the EEPROM 404 for storing the density non-uniformity information peculiar to the individual recording head. During the manufacturing of the recording head, the density non-uniformity of the recording head is measured. On the basis of the data obtained, the density non-uniformity data or data for correcting the density non-uniformity are stored in the EEPROM 404, during the manufacturing of the recording head, for each of the ejection outlets or for each of a plural number of ejection outlets.

By doing so, when the recording head is mounted on the main assembly of the printer, the main assembly reads out the information relating to the density non-uniformity peculiar to the recording head. On the basis of the information, the main assembly effects proper control operation for eliminating or reducing the density non-uniformity, thus maintaining good image quality.

FIG. 19 shows the major part of the circuits on the print board 401 of FIG. 18. The circuit on the heater board 403 is defined by a chain line. The circuit is in the form of N×M matrix structure constituted by a heat generating element

407 and a diode 406 for preventing short circuit, connected in series. The heat generating element 407, as shown in FIG. 20, is driven in a time series fashion, and the drive energy supply control is accomplished by controlling a pulse width (T) at the segment (seg) side.

In FIG. 19, reference numeral 404 designates an example of the EEPROM of FIG. 18, and it stores the density non-uniformity information in this embodiment. The non-uniformity information is supplied to the main assembly in a serial communication in accordance with request signal (address signal) D1 from the main assembly. FIG. 21 shows this signal transfer. In synchronism with the clock signal CK indicated by SK, 8 bit non-uniformity information D0 is outputted from the second serial outputting terminal S0.

FIG. 22 shows the writing timing of the image non-uniformity information or correcting information therefore in the EEPROM 404, during the manufacturing of the recording head. In this case, in synchronism with the serial clock signals CK, the information D1 (8 bit) is written in the EEPROM 404.

In this embodiment, during the recording head manufacturing, the information relating to the non-uniformity is written in the EEPROM 404, and the non-uniformity peculiar to the recording head is eliminated or reduced on the basis of the information.

Figure 23A:
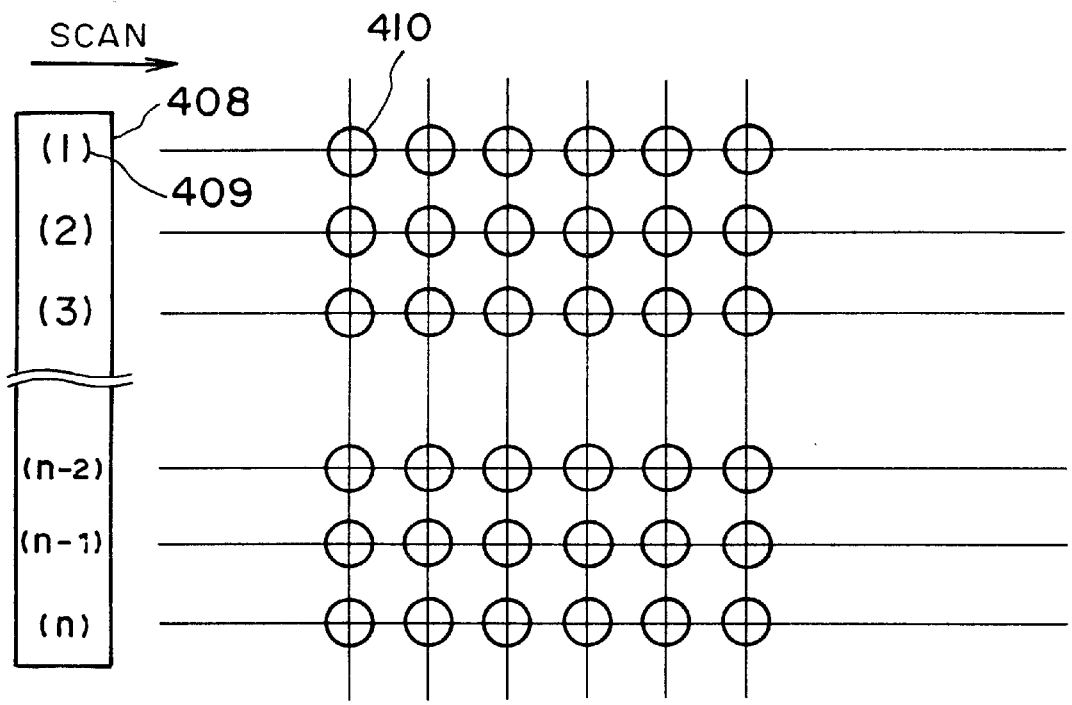

For the purpose of better understanding of the present invention, the description will be made as to the fundamental cause of the image non-uniformity production. FIG. 23A shows the recording provided by an ideal recording head in an enlarged scale. As will be understood, ink spots having uniform diameter (ink droplet diameter) are placed on a line. In this Figure, the ink is ejected through all of the ejection outlets. In the case of halftone (50% ejection outlets are actuated, for example), the densities are uniform.

Figure 23B:
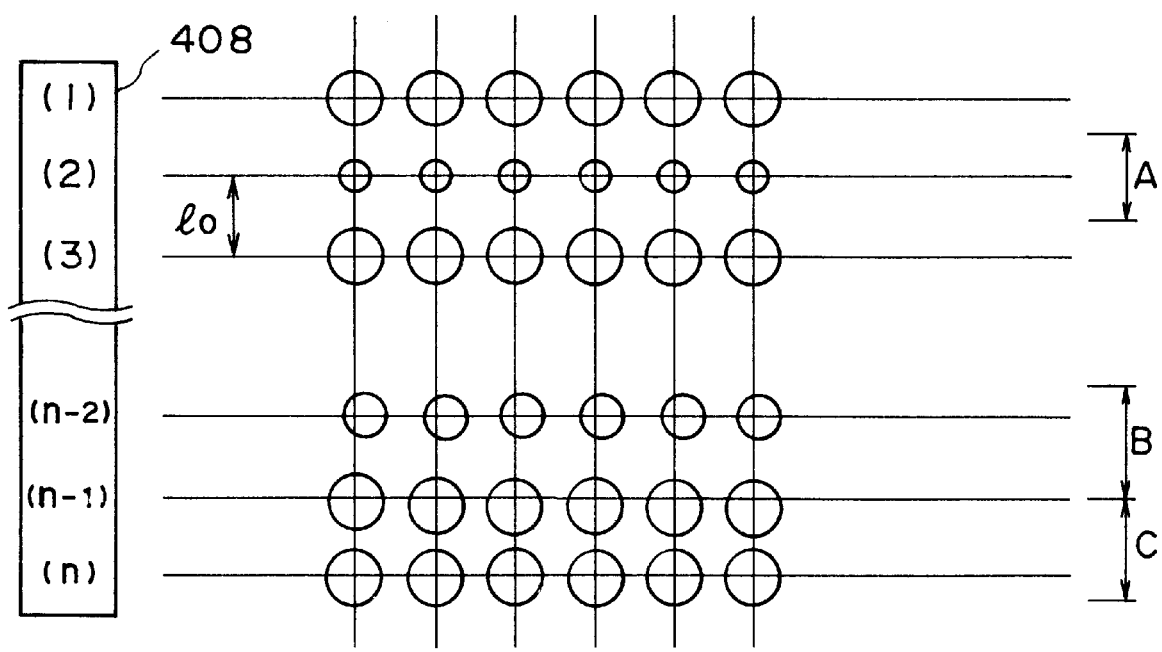

In the case of FIG. 23B, the diameter of droplets through the second and (n−2)th ejection outlets is smaller than the average. In addition, the ink spots by the (n−2)th and (n−1)th ejection outlets are placed with deviation from the centers. More particularly, the (n−2)th ink spots are deviated in an upper right direction from the center, and the (n−1)th ink spots are deviated lower left direction in a from the center. As a result, a region A in this figure appears as a thin stripe, and also a region B appears as thin stripes because the distance between the centers of the (n−1)th spots and the respective adjacent (n−2)th spots are larger than the average distance $l_0$. On the other hand, a region C appears as dark stripes because the distance between the centers of the (n−1)th spots and the respective adjacent n-th spots are smaller than the average distance $l_0$. As will be understood from the foregoing, the density non-uniformity is caused mainly by the deviation from the non-uniformity of the ink droplet diameter and the deviation from the central position.

The description will be made as to the specific example of correcting the non-uniformity of the drop diameters which is one of the causes of the density non-uniformity as described above.

Figure 24:
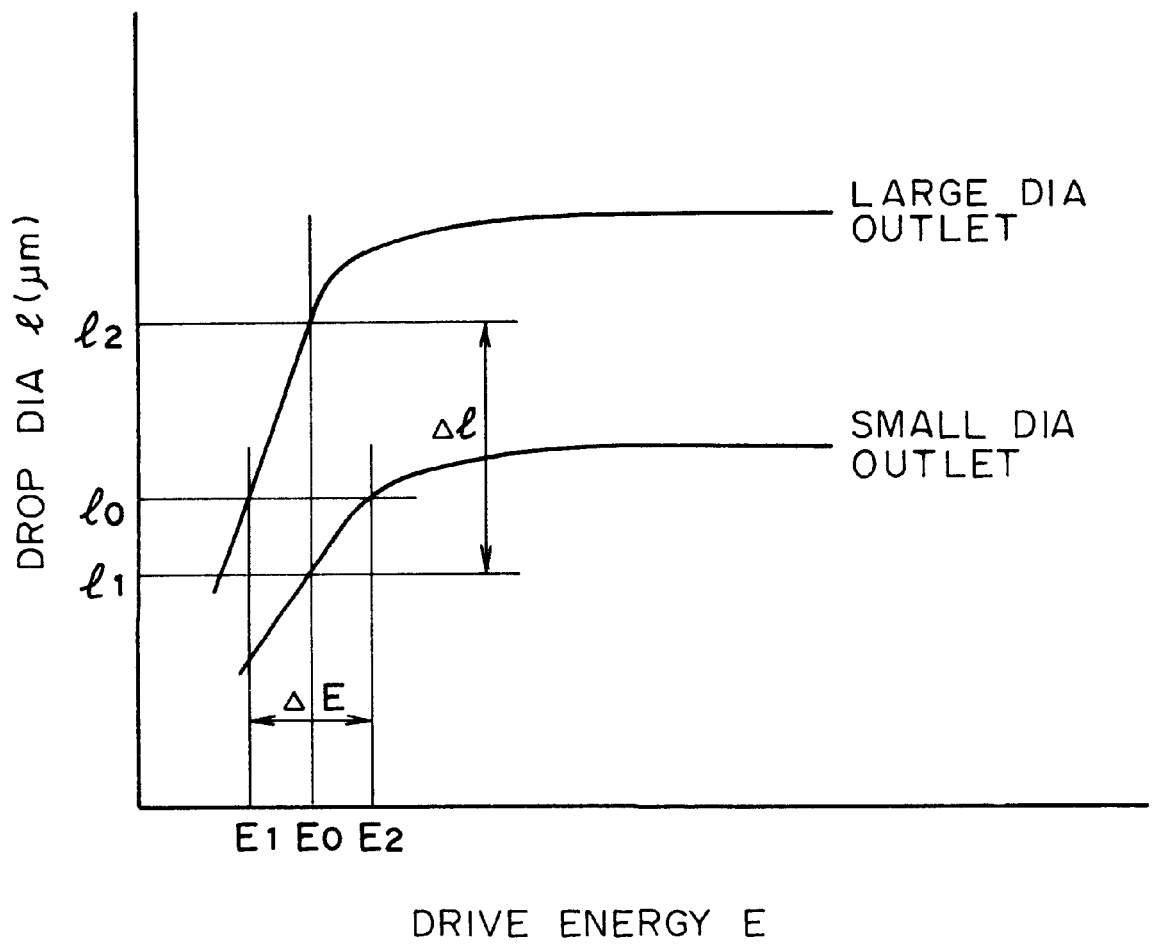
FIG. 24 shows the relation between drive energy for the ink ejection supplied to a heat generating element of the recording head of FIG. 19 and a diameter of the ink droplet ejected.

FIG. 24 shows a relation between driving energy contributable to eject the ink and applied to the heater (heat generating element) 407 for an ejection outlet and a drop diameter of the ink ejected in response to the driving energy application. As will be understood from this Figure, the drop diameter increases with the increase of the driving energy within a certain range of the driving energy, and then, it saturates. Also understood is that the drop diameters variable with the driving energy are different between the ejection outlet providing a large drop diameter and the ejection outlet providing a small droplet diameter.

From FIG. 24, in order to control so that the same drop diameter $l_0$, the driving energy E2 for a small diameter droplet providing ejection outlet is made larger than the driving energy E2 for a large diameter droplet providing ejection outlet (E2>E1). In consideration of this, the optimum driving energy is obtained on the basis of an actually provided drop diameter for each of the ejection outlets. The driving energy level thus obtained or information indicative of the driving energy level is written in the non-volatile memory (EEPROM 404 shown in FIG. 18). By doing so, the density non-uniformity attributable to the droplet diameter difference among the ejection outlets can be eliminated.

If variably controlling the driving energy for the respective ejection outlets imposes too much load to the circuit in the main assembly, the following is considered. In the case of the matrix driving as shown in FIG. 2, for example, each of the blocks are selected as a minimum unit (in FIG. 19, a group of ejection outlets connected to the common contacts COM1-COMN is the minimum unit). An average of the droplet diameters of the ejection outlets is obtained, and the driving energy obtained on the basis of the average is written in the non-volatile memory 404, similar to the above-described case. By doing so, the density non-uniformity control can be accomplished for each of the blocks, so that the control circuit is simplified.

As for the information indicative of the driving energy, pulse width, driving voltage and driving current are included.

The description will be made as to the means for eliminating the deviation which is another cause of the density non-uniformity. The deviation is caused by deviation of the ink ejection direction from the ejection outlet, resulting from the limit of manufacturing accuracy of the ejection outlet. Therefore, it is practically difficult to completely correct the deviation. Therefore, in this embodiment, density non-uniformity due to the deviation is not corrected separately from the non-uniformity due to the drop diameter variation. More particularly, the densities in a certain region are detected before the recording head is sold, and the detected level is stored in the non-volatile memory 404. On the basis of the detected level, the amount of ink ejection in the region is controlled.

Figure 25A:
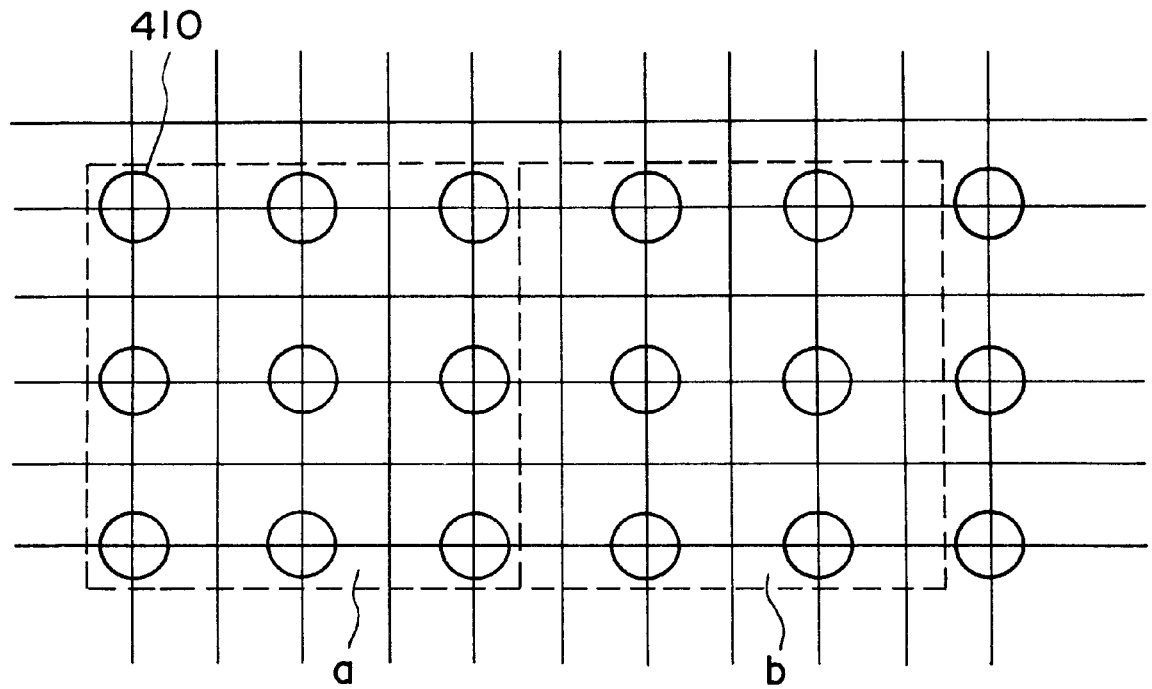
FIG. 25A illustrates the result of half-tone recording (50%) by an ideal recording head.
Figure 25B:
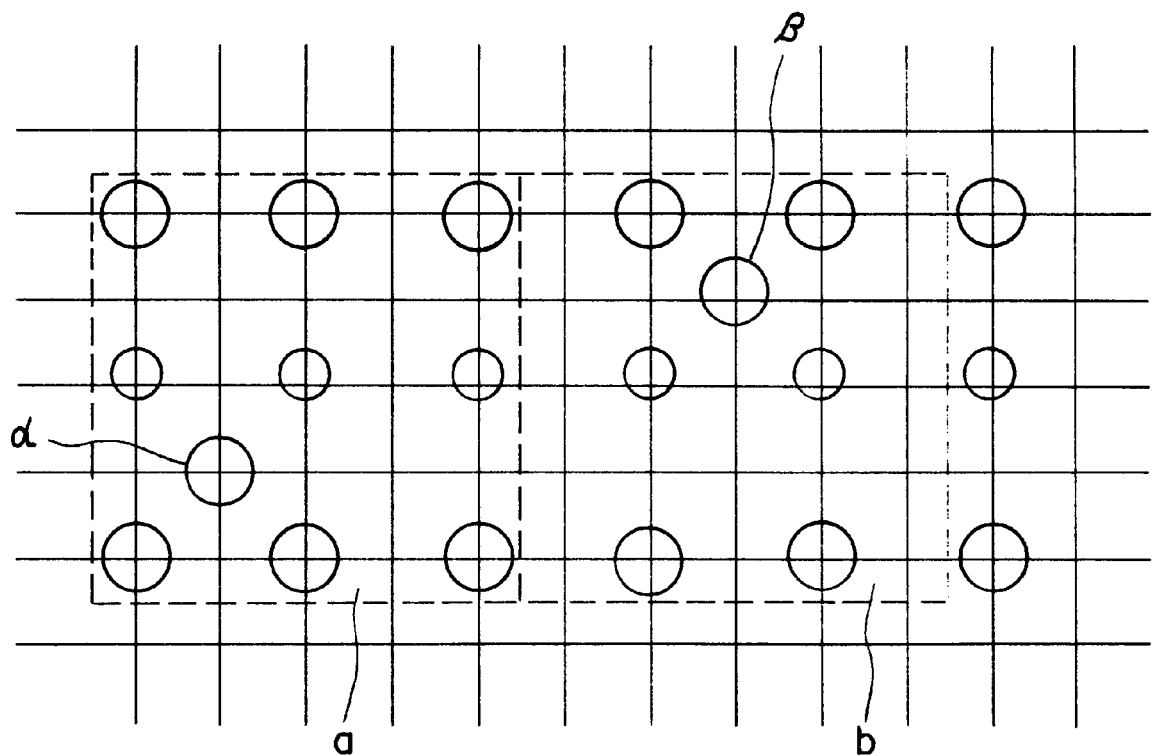
FIG. 25B shows the result of half-tone recording with an actual recording head which has been density-corrected.

Referring to FIGS. 25A and 25B, the description will be made in further detail. FIG. 25A shows the ideal halftone record (50%). FIG. 25B shows the halftone record provided by a recording head having the drop diameter variation and the position deviation. The density non-uniformity in the FIG. 25B case is suppressed in the following manner. As shown in FIG. 25B, the total dot area in the region defined by broken line a is made closer to the total dot area in the case of FIG. 25A. By doing so, the same density is sensed by human eyes. Similarly, the density non-uniformity is practically eliminated in a region b. The density correction control in this manner is accomplished in the image processing in an image reading apparatus.

Figure 26:
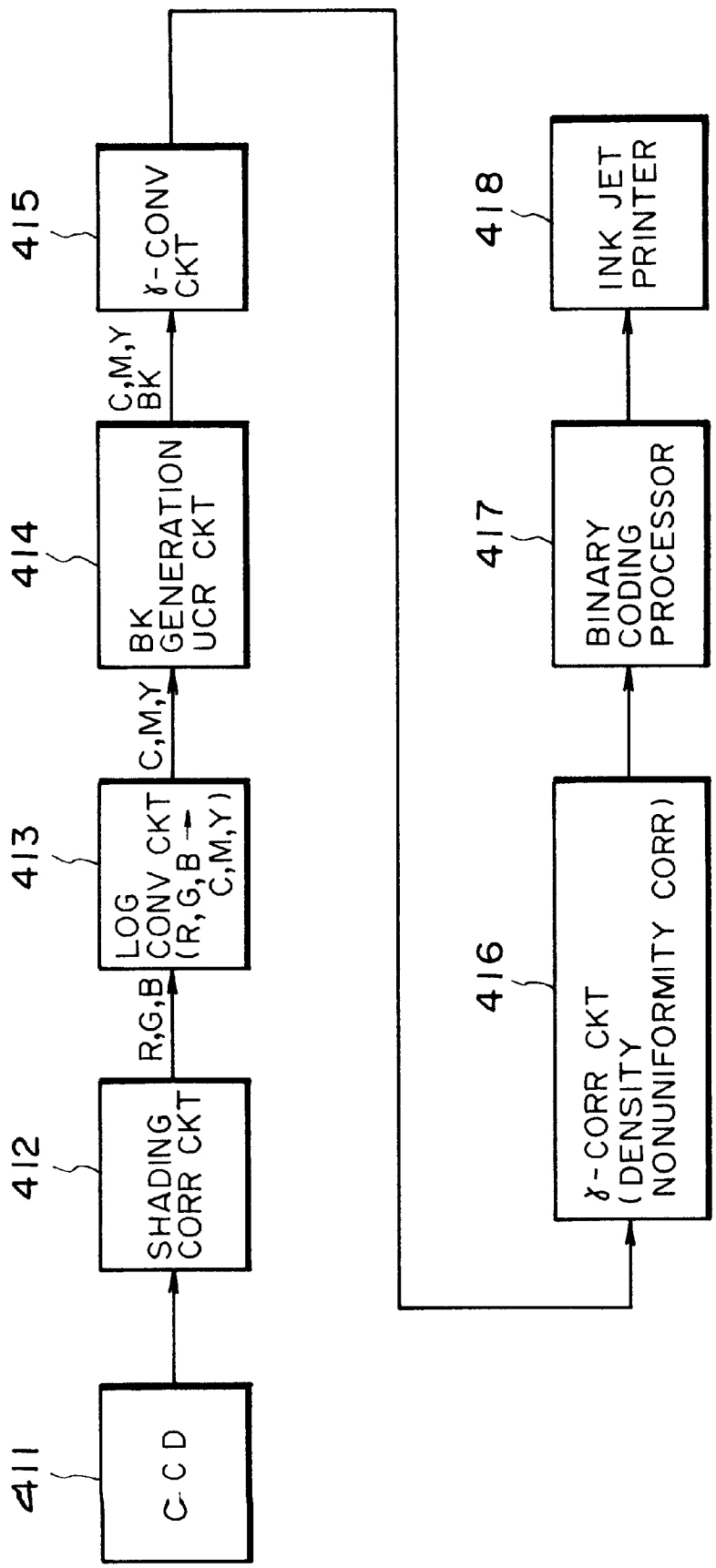
FIG. 26 is a block diagram of a circuit used in an image reading apparatus according to an embodiment of the present invention.

In FIG. 25B, for the purpose of simplified explanation, the results of the density correction control are schematically shown, wherein the dots α and β are correcting dots. Another known method (binary processing) includes a dithering method (error dispersing method and average density method). However, the method itself does not constitute the significant part of the present invention, and the detailed description thereof is omitted for simplicity. Referring to FIG. 26, the density correcting process in this embodiment can be performed in the flow of the signal processing in an image reading apparatus as shown in FIG. 26. More particularly, it is effected as a γ correcting control process.

The circuit of FIG. 26 will be described. An image signal provided by reading an image by a CCD (charge coupled device) sensor 411 which is one of solid state image pickup elements is subjected to a sensitivity correcting operation by a shaving correction circuit 412, and is converted by a LOG converting circuit 413 from three light primary color components (red, green and blue) to the primary print color components (cyan, magenta and yellow), so that C, M, Y signals are produced. The C, M, Y signals are extracted by a common component which corresponds to the black (BK) component provided by mixing the C, M, Y component by a black generating UCR circuit 414. Alternatively, a part of the common component is extracted as the black component. Then, C, M, Y, BK signals are supplied to a γ converting circuit 515.

Figure 27:
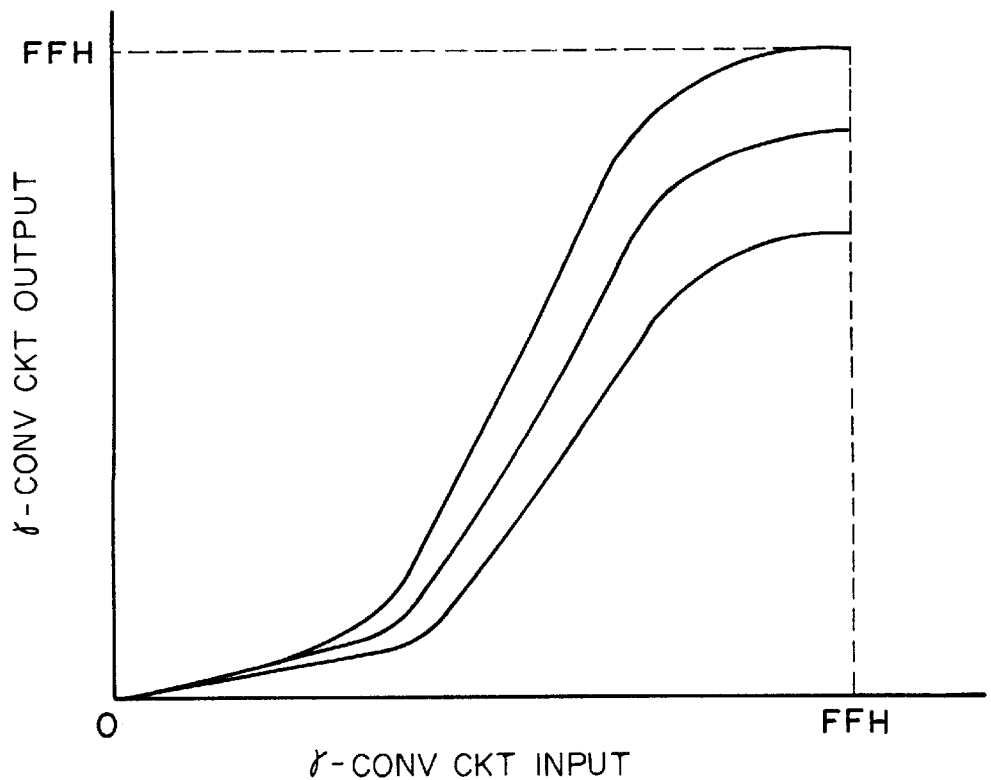
FIG. 27 illustrates a relation between an input signal of a γ-converting circuit of FIG. 26 and an output signal.

As shown in FIG. 27, for example, the γ converting circuit 415 normally includes several stage functions to produce from input data output data. A proper function is selected in accordance with the color density balance or in accordance with the taste of the operator. The function curve is determined in consideration of the characteristic of the ink material and/or the characteristics of the recording paper.

The description will be made as to the specific example of the γ correction process according to an embodiment of the present invention.

Figure 28:
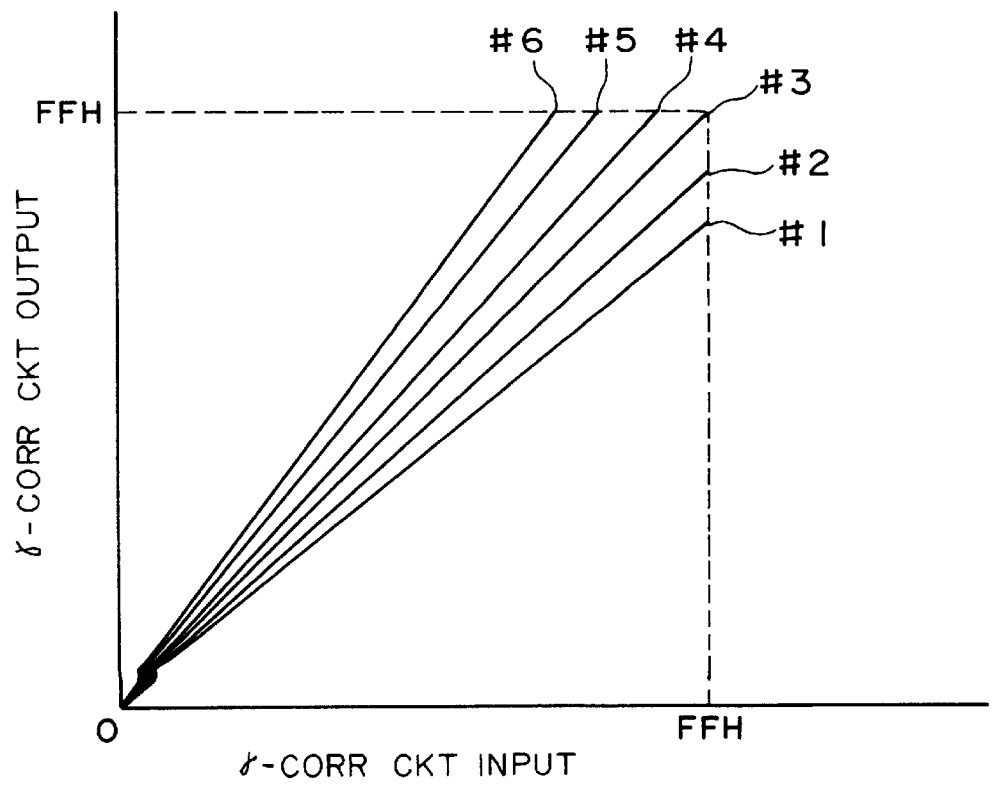
FIG. 28 shows a relation between an input signal of a γ-correcting circuit of FIG. 26 and an output signal.

The input signal for the γ correcting circuit 416 is an output signal from the γ converting circuit 416. It comprises a number of correcting functions as shown in FIG. 28. For example, the function #3 represents a straight line having an inclination of 45 degrees, that is, the input signal is outputted as it is through the function. A function #1 or #2 multiplies the input signal by a constant smaller than 1, and the result is outputted. The functions #1 and #2 are used for the high density portion of the recording head, for example, by which the input image data density can be recorded with lower density.

In the case of the functions #4–#6, the input data are multiplied by constants larger than 1, by which the input image is recorded with higher densities. Therefore, they are effective to the low density portion of the recording head.

In this manner, according to this embodiment, one of the functions is applied to each of the ejection outlets of the recording head. The number of functions is not limited to that shown in FIG. 28, and actually, a larger number of functions are prepared. The non-volatile memory 404 of FIG. 18 stores the numbering of the correcting function of FIG. 28 corresponding to each of the ejection outlets. Referring to the identification number of the correcting functions, the image signal is subjected to the γ-correcting operation by the γ correcting circuit 416, for each of the ejection outlets. As a result, the correction is transmitted to the binary coding circuit 417 of FIG. 26. The binary coding circuit 417 has a function of converting the multi-level information (8 bit in FIG. 28) of each of the picture elements finally to a two-level signal (1 or 0). In the conversion, the dither method, the error dispersing method, the average density method or the like is used. In this example, the error dispersing method is used as an example. As a result, the output shown in FIG. 25B is provided by the ink jet printer 418.

Figure 29:
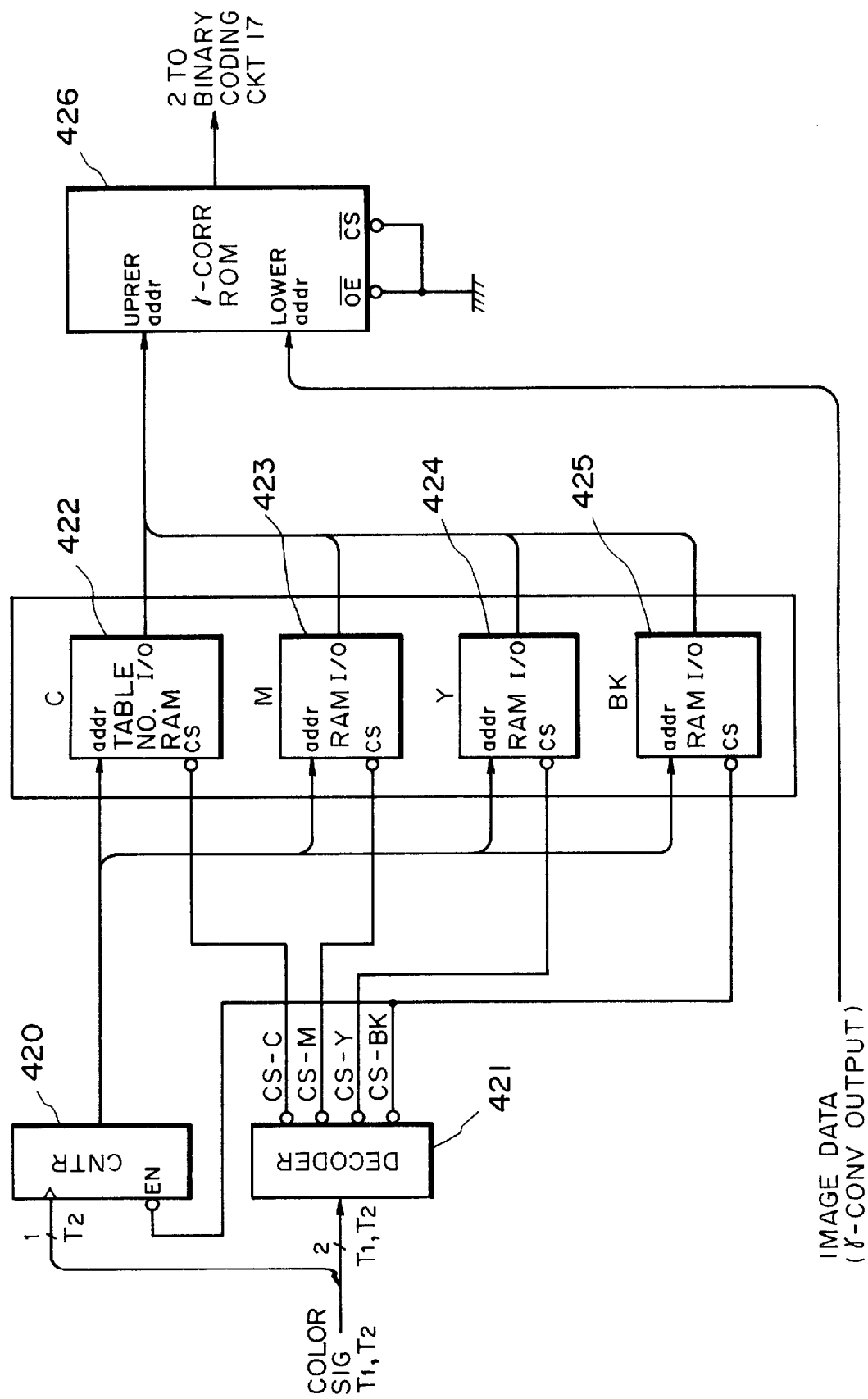
FIG. 29 is a block diagram of an example of a circuit structure of the γ-correcting circuit of FIG. 26.
Figure 30:
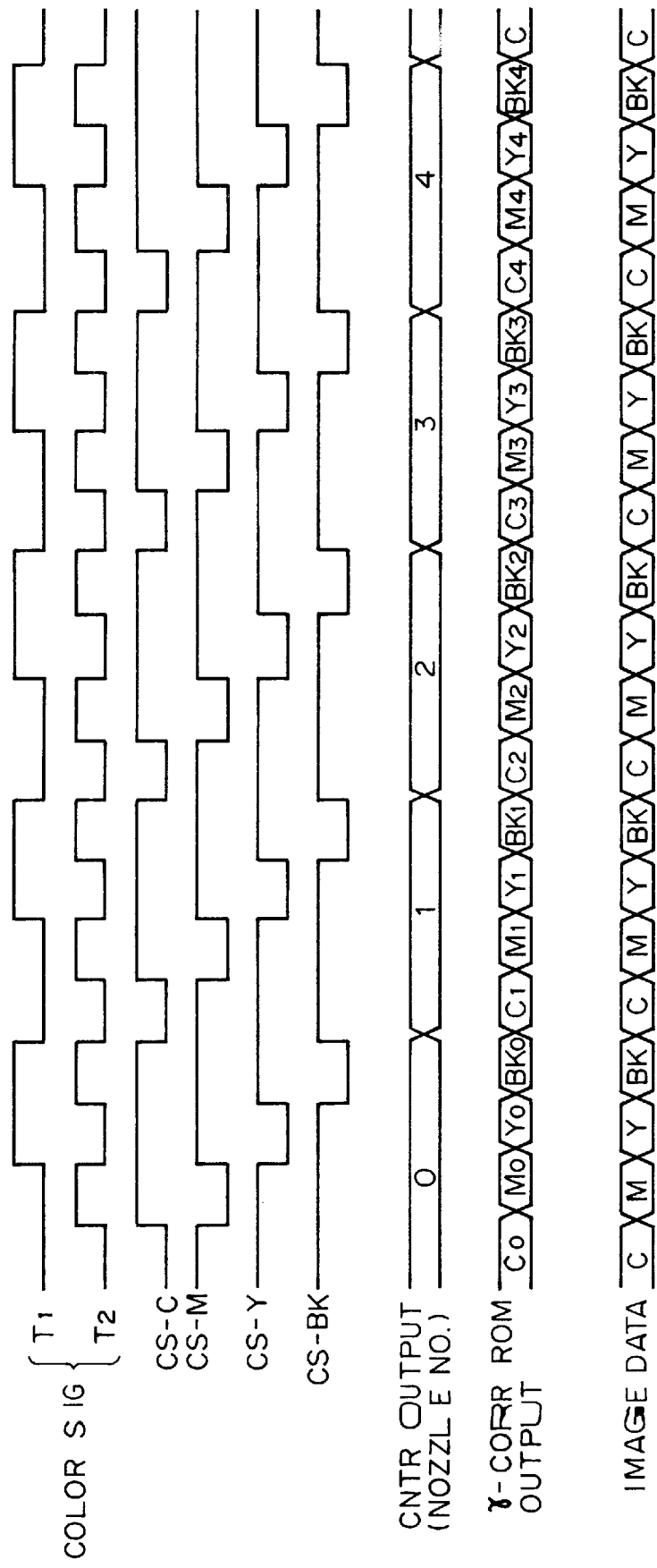
FIG. 30 is a timing chart illustrating the input and output timing of the signals relating to the circuit of FIG. 29.

FIG. 29 shows the detailed circuit structure of the γ correcting circuit 416 of FIG. 26. Reference numerals 420, 421, 422–425, and 426 designate a counter, a recorder, a random access memory (RAM) and a γ correcting read only memory (ROM), respectively. Color signals T1 and T2 supplied from the γ converting circuit 415 are in the form of 2 bit signals in any of combinations 00, 01, 10 or 11, as shown in FIG. 30. The combinations correspond to C, M, Y and BK, respectively for the purpose of color discrimination of the image data. The counter 420 which receives the lower digit signal T2 is counted up when the output of the recorder 421 represents BK (CS-BK), and the signal T2 is raised. In other words, the counter 420 starts its counting upon the initiation of the C signal. Since one combination of C, M, Y, BK signals corresponds to information of one picture element, the counter 420 is counted up for each of the picture elements. The output of the counter 420 is connected to the address input terminal of the four RAMs 422–425. Into the RAMs 422–425, the contents of the non-volatile memory in each of the recording heads has been transferred by the central processing unit CPU (not shown), and the contents are written therein. The recorder 421 sequentially accesses the RAMs 422–425 in synchronism with the color signals T1 and T2, and as a result, the data of the RAM accessed are selectively outputted and are inputted to the upper digit address of the γ correcting RAM 426.

Therefore, the output of the counter 420 corresponds to the ejection outlet number of the recording head corresponding to the image data at the time, and the RAMs 422 and 425 store the identification number (#1–#6 of FIG. 28) of the ejection outlet at the address corresponding to the ejection outlet number. Therefore, the γ correcting ROM 426 discriminates the table number with the upper address, and reads therein the image data outputted from the γ converting circuit 415 with the lower digit address. Therefore, the input image data is corrected in accordance with one of the functions selected from the γ correcting curves of FIG. 27, and the data are transferred to the binary coding circuit 417.

In the foregoing embodiment, the apparatus functions as a copying machine, wherein the image reading apparatus is connected with the ink jet recording apparatus, and the density correcting process is executed in the image reading apparatus. However, the present invention is not limited to this case, but is applicable to another case, for example, in which an ink jet recording apparatus receives R, G, B signals from color VTR apparatus or the like, or to a facsimile apparatus. In the latter case, the γ correcting circuit for correcting the above-described density non-uniformity correction is provided in a signal processor circuit in the ink jet recording apparatus.

Further Embodiment

Figure 31:
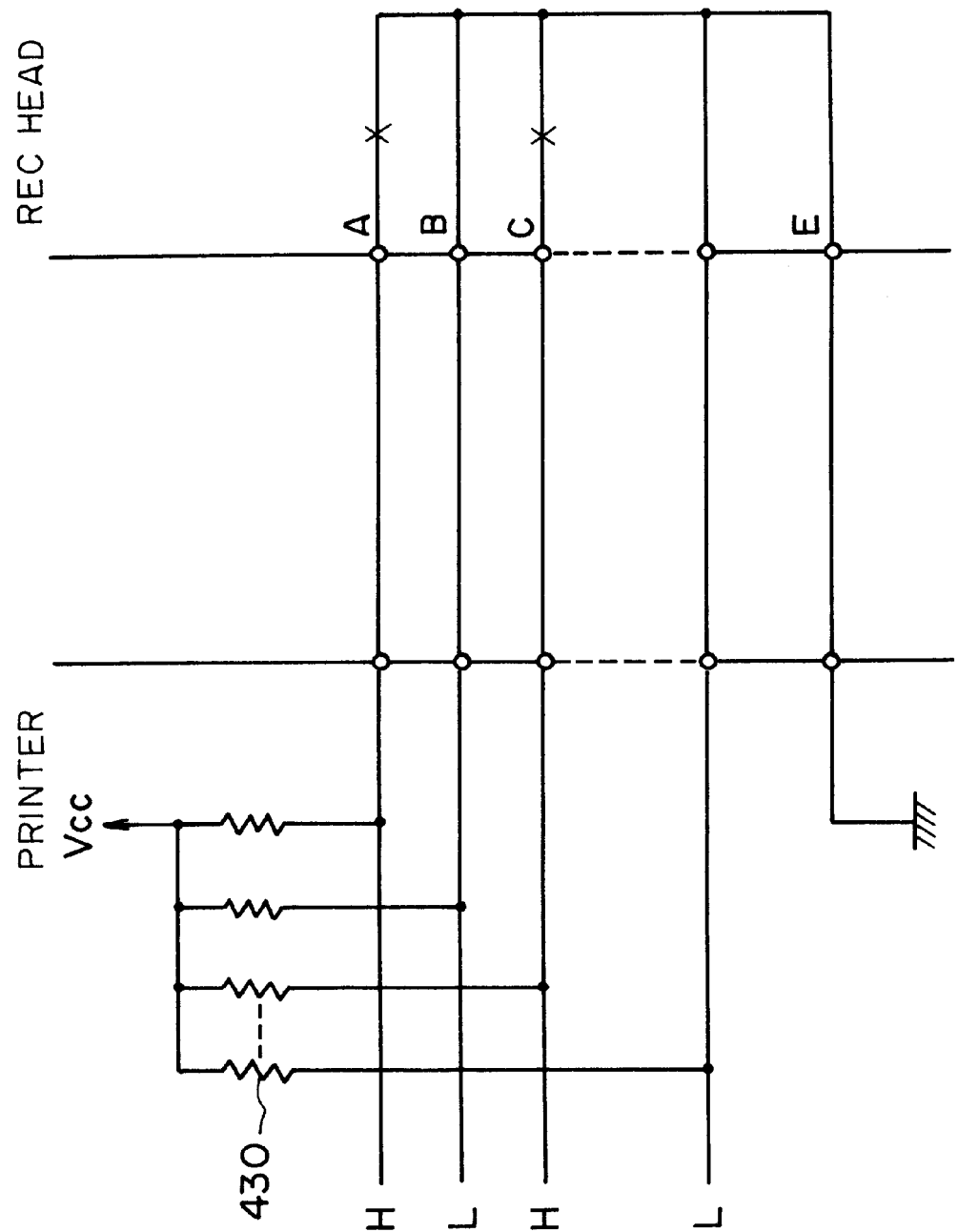
FIG. 31 is a circuit diagram, used in a further embodiment.

FIG. 31 shows a fourth embodiment, wherein corresponding to each of the blocks of the matrix structure shown in FIG. 19, the grounding patterns A, B, C, . . . connected to each of the heat generating elements of the ejection outlets are prepared in the structure shown in FIG. 31. The grounding pattern GND is provided by a laser cutting machine corresponding to the characteristics of the dot diameters of the respective ejection outlets. The cut pattern provides the binary signal (cut (X): 1, non-cut: 0) by which the binary level density correcting control is accomplished.

Figure 32:
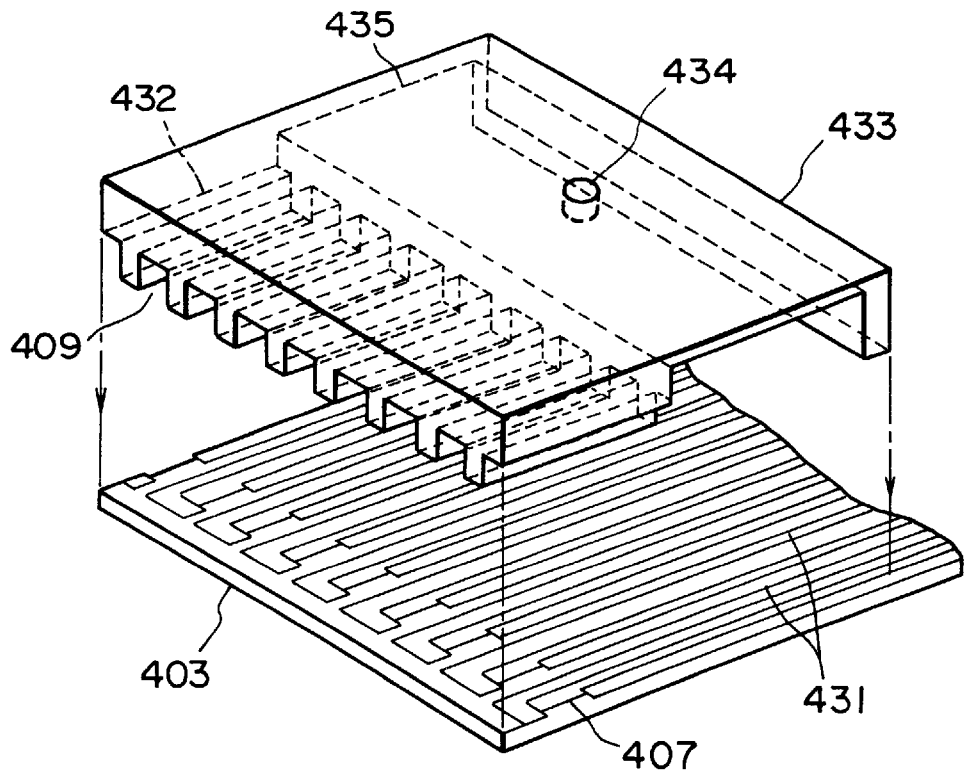
FIG. 32 is a perspective view illustrating details of the heater board of FIG. 18.

The heater board 403 shown in FIG. 18 has the structure as shown in FIG. 32. The print board 1 of FIG. 8 is provided in the ink jet recording head of an ink jet recording apparatus, shown in FIG. 33, for example.

The description will be made in further detail. The heater board 403 has electrothermal transducers formed by a film forming process. The electrothermal transducer is on a silicon substrate and has a heat generating portion (ejection heater) 407 and wiring 431 of aluminum or the like for supplying electric energy thereto. A recording head chip is constituted by bonding a top plate 433 having partition walls for defining liquid passages 432 for the recording liquid (ink) to the heater board 403.

The recording liquid is supplied to a common chamber 435 through an inlet port 434 formed in the top plate 433, and is directed to the respective liquid passages 432. When the heater 407 is energized by electric energy so as to produce heat, a bubble is formed in the ink filled in the liquid passage 432, upon which a droplet of ink is ejected through an ejection outlet 409.

Figure 33:
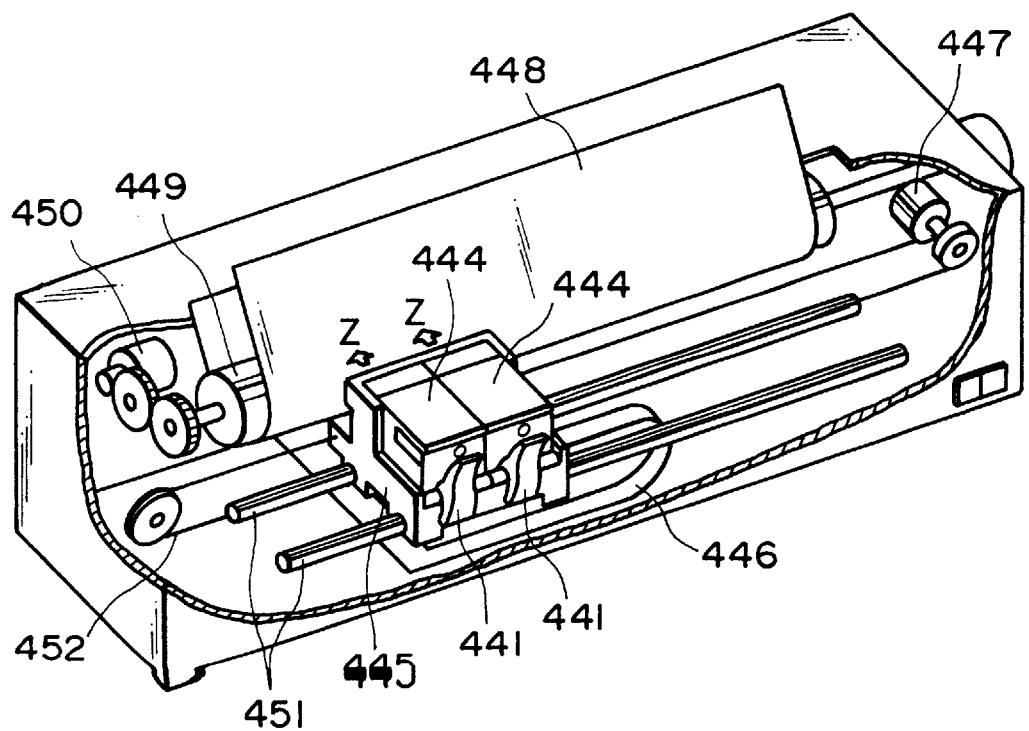
FIG. 33 is a partly broken-away perspective view illustrating the internal structure of the ink jet recording apparatus having the recording head according to the present invention (FIG. 18).

In FIG. 33, a head cartridge 444 is constituted by a recording head chip manufactured using the heater board of FIG. 32 and an ink container which is an ink supply source. The head cartridge 444 is fixed on the carriage 445 by a clamping member 441. The head cartridge 444 is reciprocally movable along the shaft 451 on the carriage 445. The ink ejected through the ejection outlet of the recording head chip reaches a recording material 448 which is disposed with a small clearance relative to the ejection outlet, and the recording surface of which is regulated on the platen 449, and therefore, the image is formed on the recording material 448.

To the ejection energy generating element of the recording head chip, ejection signals corresponding to the image data are supplied from a suitable data source through a cable 446 and contacts 5 (FIG. 18) connected thereto. The number of the head cartridges may be selected in accordance with the number of colors of the ink materials used (two are shown in the Figure).

In FIG. 33, a carriage motor 447 functions to scanningly move the carriage 445 along the shaft 451. A wire 452 transmits the driving force of the motor 447 to the carriage 445. A feed motor 450 is operatively coupled with the platen roller 449 to feed the recording material 448.

Yet Further Embodiment

Figure 34:
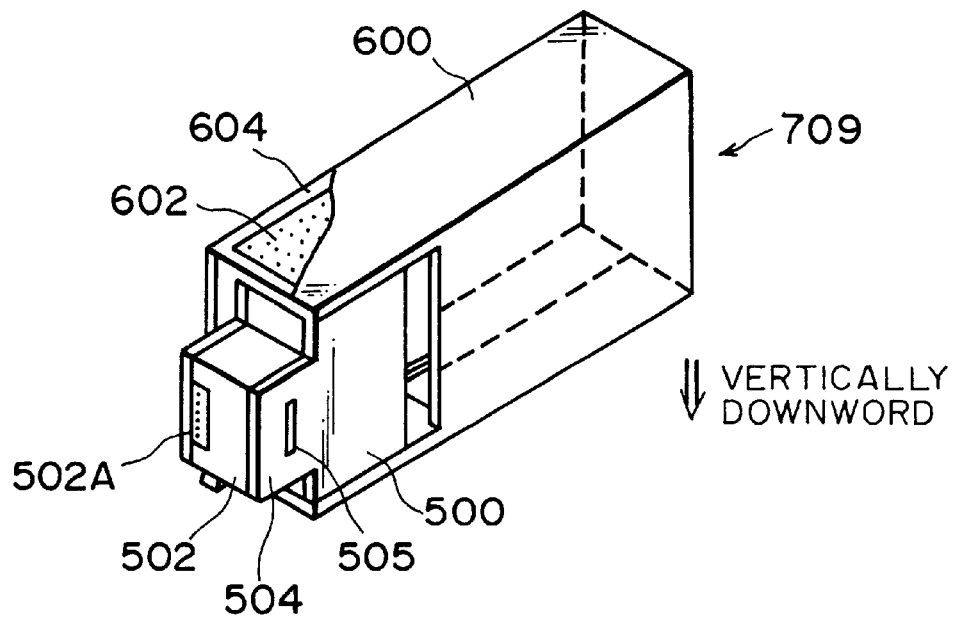
FIG. 34 is a perspective view of a cartridge 809 used in an ink jet recording apparatus according to a further embodiment of the present invention.
Figure 35:
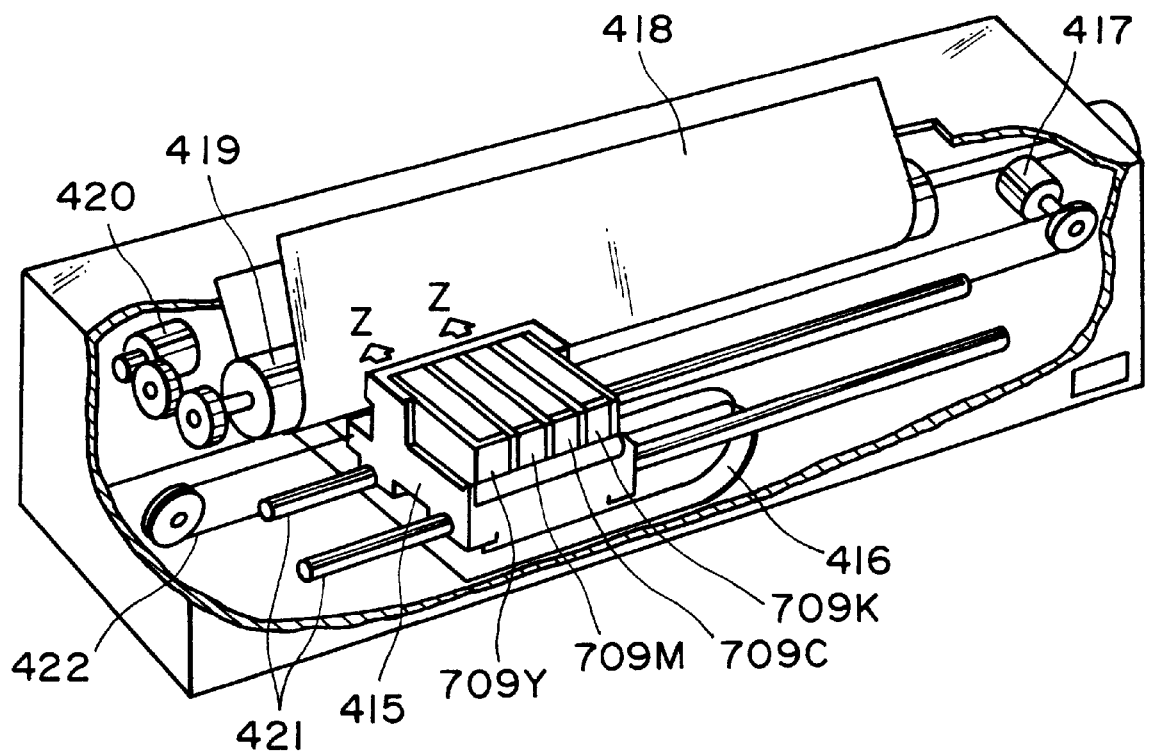
FIG. 35 is a perspective view of an ink jet recording apparatus in which the cartridge of FIG. 34 is mounted.

Referring to FIG. 34, a further embodiment will be described. FIG. 34 is a perspective view of a cartridge 709 having an integral ink container and an integral recording chip, usable with an ink jet recording apparatus of this embodiment. FIG. 35 is as perspective view of an ink jet recording apparatus usable with the cartridge 709. In this apparatus, the ink container 600 is integrally formed with the recording head 500, and the ink is immersed and retained in the ink absorbing material 602 in the cartridge 709, and is supplied to the recording head 500.

The recording head 500 comprises an ejector portion 502 and an ink supply container portion 504 or the like. The ejector portion 502 comprises ejection outlets 502A to be faced to the recording material, liquid passages extending therein, recording heaters functioning as ejection energy generating elements such as electrothermal transducers disposed in the liquid passage using thermal energy as the energy for the ejection, for example, and a common liquid chamber communicating with the liquid passages.

The supply container 504 receives ink supply from the ink container 600 and functions as a subordinate container for directing the ink to the common chamber in the ejector portion 502. The ink absorbing material 602 in the ink container 400 is made of porous material or fibers. Designated by a reference numeral 604 is a cover of the ink container 600.

In FIG. 35, references 709Y, 709M, 709C and 709K designate cartridges of FIG. 4 (the cartridge is called "cartridge 709" when all the cartridges are designated, and they are called with Y, M, C, K when the respective cartridges are designated). The cartridge 709 is fixedly mounted on the carriage 15, and the carriage is reciprocally movable along the shaft 421. The positioning of the cartridge 709 relative to the carriage 415 is accomplished by a hole formed in the recording head 500 and a projection or the like formed on the carriage 415. The electric connection therebetween is accomplished by contact pads on the wiring board (not shown) from the ejector portion 502 and connectors on the carriage 415.

The ink ejected through the ejection outlet 502A reaches the recording material 418 placed on the platen roller 419 with a small clearance from the recording head 500, so that an image is formed on the recording medium 418.

The recording head 500 is supplied with ejection signals corresponding to the image data from a data source (not shown) through a cable 416 and contacts connected thereto. A suitable number of cartridges 709 are used in accordance with the number of colors of the ink materials used (four cartridges 709 are shown in the Figure).

In FIG. 35, a carriage motor 417 functions to scanningly move the carriage 415 along the shaft 421. The wire 422 transmits the driving force from the motor 417 to the carriage 415. A feed motor 420 is connected with a platen roller 419 to feed the recording medium 418.

The cartridge 709 includes 128 ejection outlets (nozzles) 102A, for example. They are arranged vertically in the Figure with 63.5 microns pitch. However, it is very difficult to produce the ejection outlets 502A in exactly the same configurations, with the result that the quantities of ejected ink, the speeds of ejection, the directions of the ejections and the like are slightly different for the respective ejection outlets. In addition, the characteristics may change with the time of use. Therefore, if no correction is made, the density non-uniformity appears on the recorded image. The non-uniformity appears as a stripe or stripes on the recorded image, thus remarkably degrading the quality of the record.

In this embodiment, in order to solve the problem of the image density non-uniformity, the correction is made in accordance with the characteristics for each of the cartridges 709, as will be described hereinafter in detail.

Figure 36:
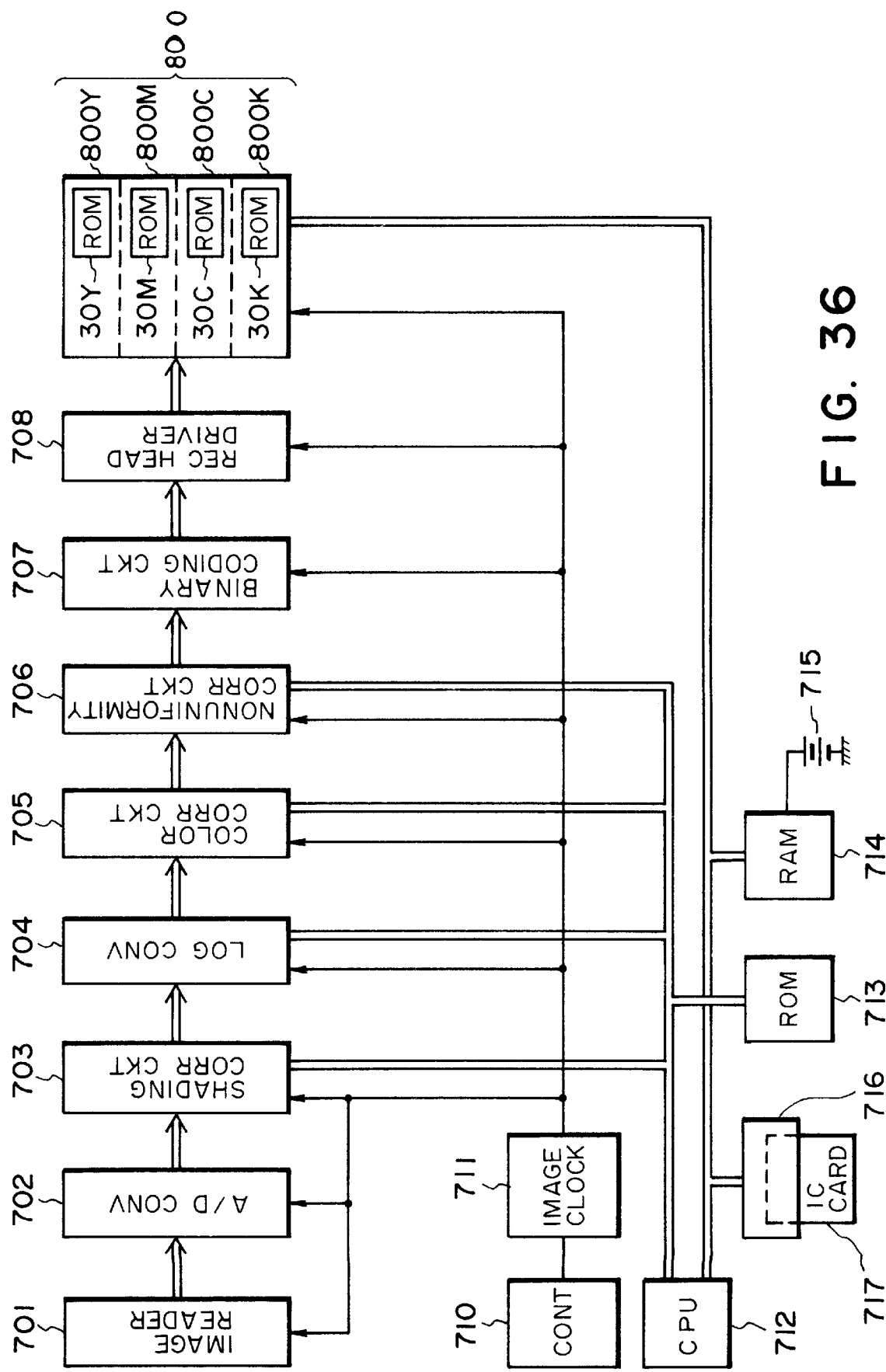
FIG. 36 is a block diagram of a copying machine using the ink jet recording apparatus of FIG. 35.

FIG. 36 is a block diagram of the control system of the copying apparatus to which the structure of FIG. 35 is incorporated. In this Figure, an image reader 701 including a photoelectric transducer element such as a CCD (charge coupled device) reads an original image and converts the image to electric signals. Then, red, green and blue component color signals are produced. The electric signals are converted to digital signals by an A/D converter 702, and the signals are subjected to the operation of a shading correcting circuit 703 so that the non-uniformity components resulting from the optical system and the sensor are removed.

A logarithmic converter 704 converts the data so as to be linear with respect to the image density, and the signals of the red, green and blue colors are converted to the cyan, magenta and yellow color signals (colors of the ink materials).

Then, a color correcting circuit 705 effects processing to a color mixture attributable to the characteristics of the reader 701 and the characteristics of the ink material and effects extraction of the black component. A density non-uniformity correcting circuit 706 corrects the density correction corresponding to the respective recording heads 800, which will be described hereinafter in detail.

The data corrected for the respective ejection outlets of the recording head 800 are subjected to the binary coding process by a binary coding circuit 707. In this embodiment, the binary coding circuit 707 uses an error dispersing method.

The binary coded data are supplied as driving signals to an ink jet type recording head 800 through a recording head driver 708, by which the ink material is ejected. The sequential control is effected by the controller 710 controlling the clockpulses produced by an image clockpulse generator 711.

The CPU 712 is connected to the shading correcting circuit 703, the logarithmic converter 704, the color correcting circuit 705 and the density non-uniformity correcting circuit 706, and sets various conditions therefor. Furthermore, the CPU 712 is connected to a ROM 713 storing an operating program or the like, and to a RAM 714 storing various conditions or the like, so as to control the execution of the program. The RAM 714 is backed up by a battery 715, so that the data are retained even if the power source is shut down. The CPU 712 is further connected with an IC card interface 715 so as to read the data stored in the IC card 717 functioning as the storing means. Each of the recording heads 800Y, 800M, 800C and 800K has a ROM 30Y, 30M, 30C or 30K storing the serial number. The serial numbers are read by the CPU 712. The CPU 712 and the density non-uniformity correcting circuit 706 constitute the control means.

The IC card 717 stores the serial number of the recording head, and the information of the characteristics of the recording head. In this embodiment, plural, 64, for example, serial numbers are prepared.

The characteristics information contain density non-uniformity correcting data for each of the ejection outlets of the recording head, correcting data for correcting a temperature detecting thermister of the recording head and the color of the ink of the recording head, for example.

Figure 37:
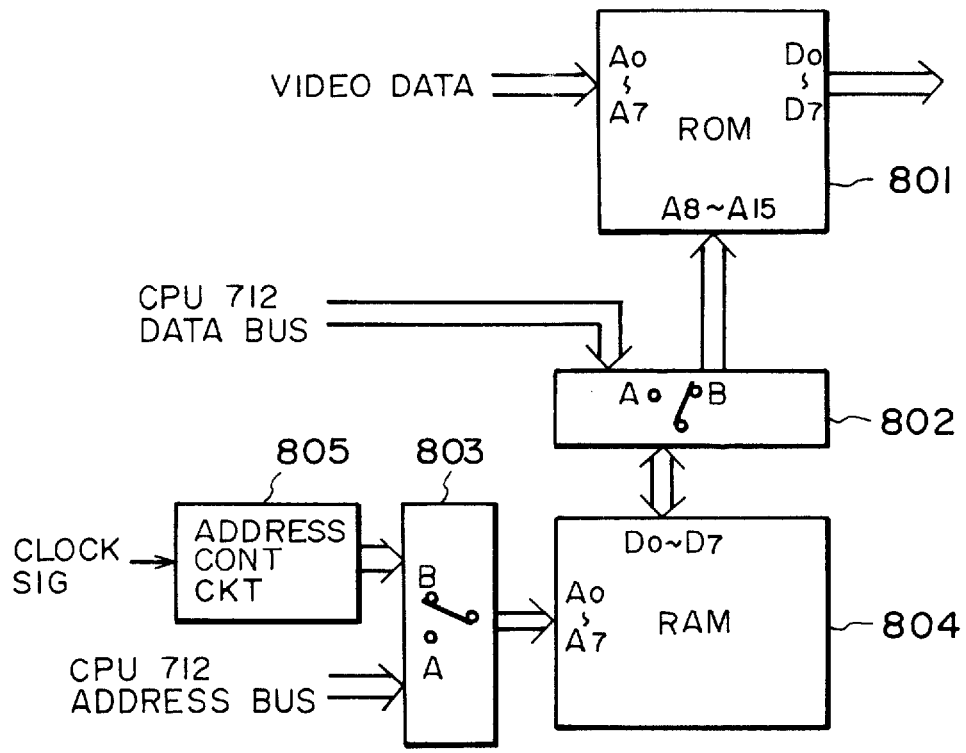
FIG. 37 is a block diagram of a density non-uniformity correcting circuit used in a copying apparatus of FIG. 36.
Figure 38:
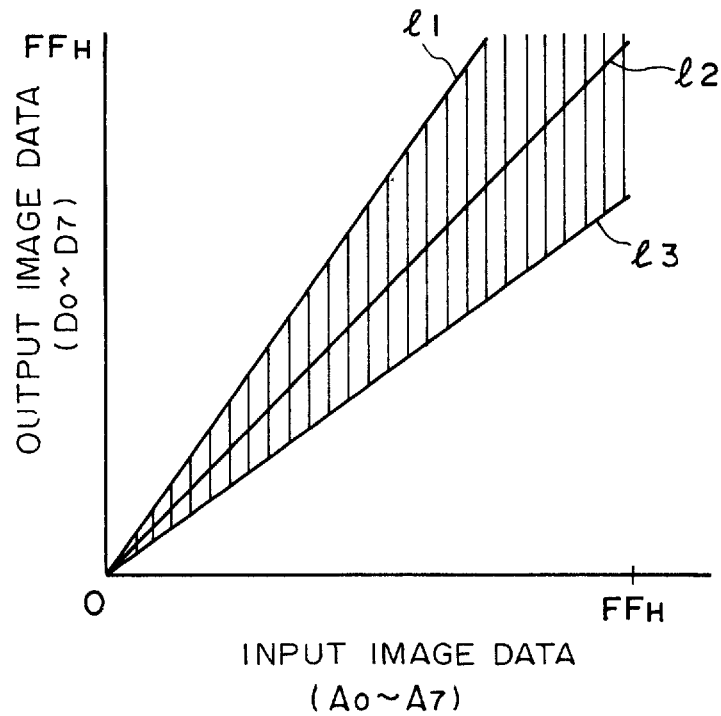
FIG. 38 is a graph illustrating the data stored in the ROM 901 in the density non-uniformity correcting circuit of FIG. 37.

FIG. 37 is a block diagram of the density non-uniformity correcting circuit 706. FIG. 38 is a graph for illustrating the data stored in the ROM 801 in the density non-uniformity correcting circuit 706. The correcting data for each of the recording heads supplied from the IC card 717 are stored in the RAM 714, and the CPU 712 transfers the correcting data to the RAM 804. More particularly, by switching selectors 802 and 803 to the A sides, the color information of the ink of the cartridge 709 (D0 and D1) and the correcting data for each of the ejection outlets (D2–D7) are transferred to the RAM 804.

Then, the CPU 712 switches the selectors 802 and 803 to B sides to read out the data from the RAM 804. The address control at this time is effected by an address control circuit 804 in accordance with the clock signals at the time of image reading. To the ROM 801, the image data are supplied for each of picture elements as data A0–A7, and on the other hand, the correcting data or the like for the ejection outlet to effect the print of the picture element as data A8–A15 (A8 and A9 are color control signals). The data A8 and A9 represent color information of the ink stored in order to correct the color when the ejection characteristics are different depending on the colors. They are not necessary when the correction depending on the ejection characteristics are not effected or when the structure of FIG. 34 is separately provided for each of the ink colors.

Referring to FIG. 38, the description will be made as of the data stored in the ROM 801. The ROM 801 stores a table of image data which are corrected within the range indicated by hatched lines in FIG. 8. Line l1 corresponds to the case of A10–A15 being zero; line l2 corresponds to the case of A10–A15 being 32; and line l3 corresponds to the case of A10–A15 being 63. Where the ejection outlet has the characteristics of a smaller ejection quantity of the ink (data A10–A15 are small), for example, an image datum larger than the input image datum is produced. On the contrary, where the ejection outlet has the characteristics of large ejection quantity of the ink (the data A10–A15 are large), an image datum smaller than the input image datum is produced. In this manner, the image density non-uniformity attributable to the variation in the characteristics of the ejection outlets is corrected to provide a uniform image.

Figure 39A:
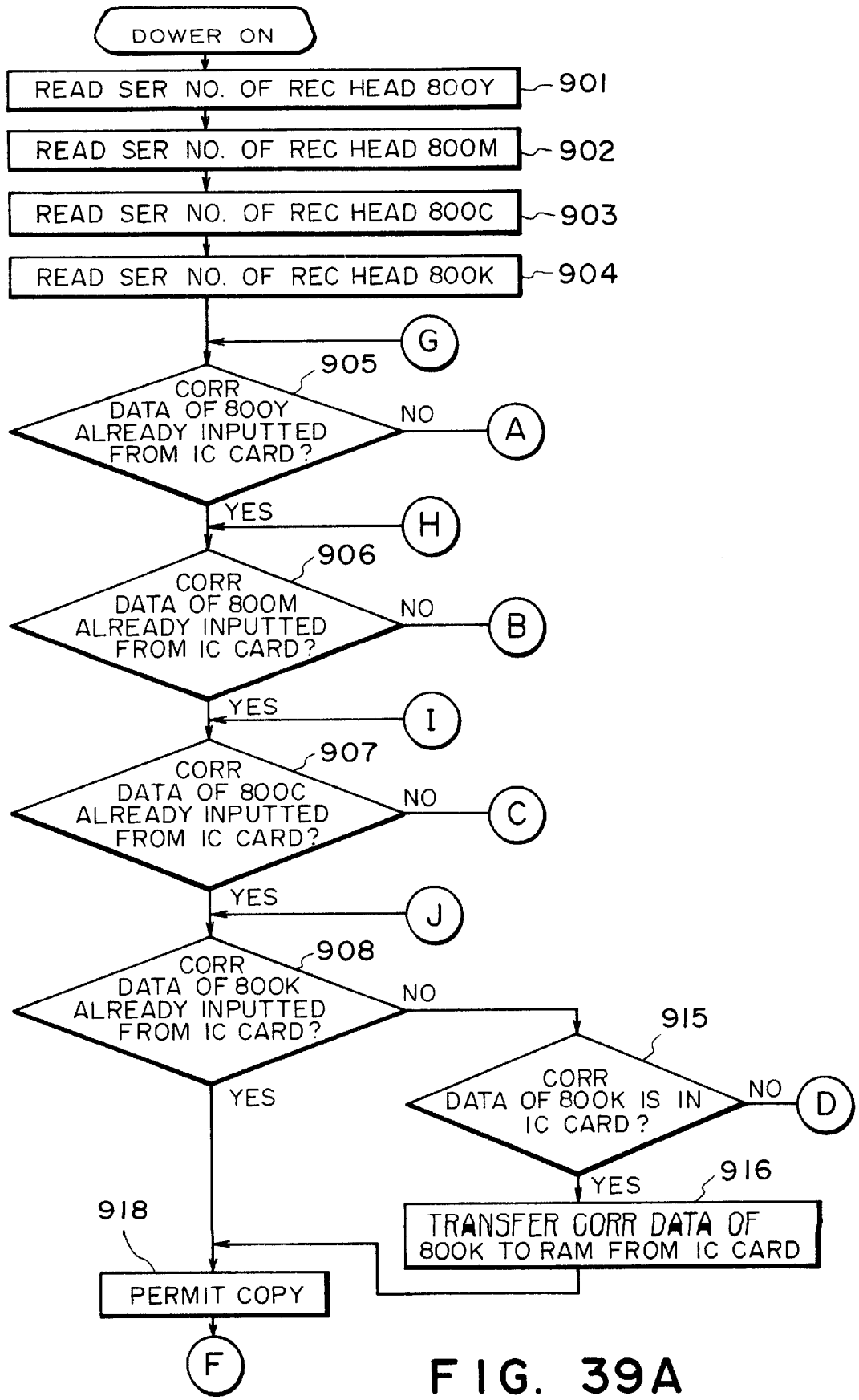
FIGS. 39A, B and C are a flow chart illustrating operation when correction data is accessed from an IC card 817.
Figures 39B, 39C:
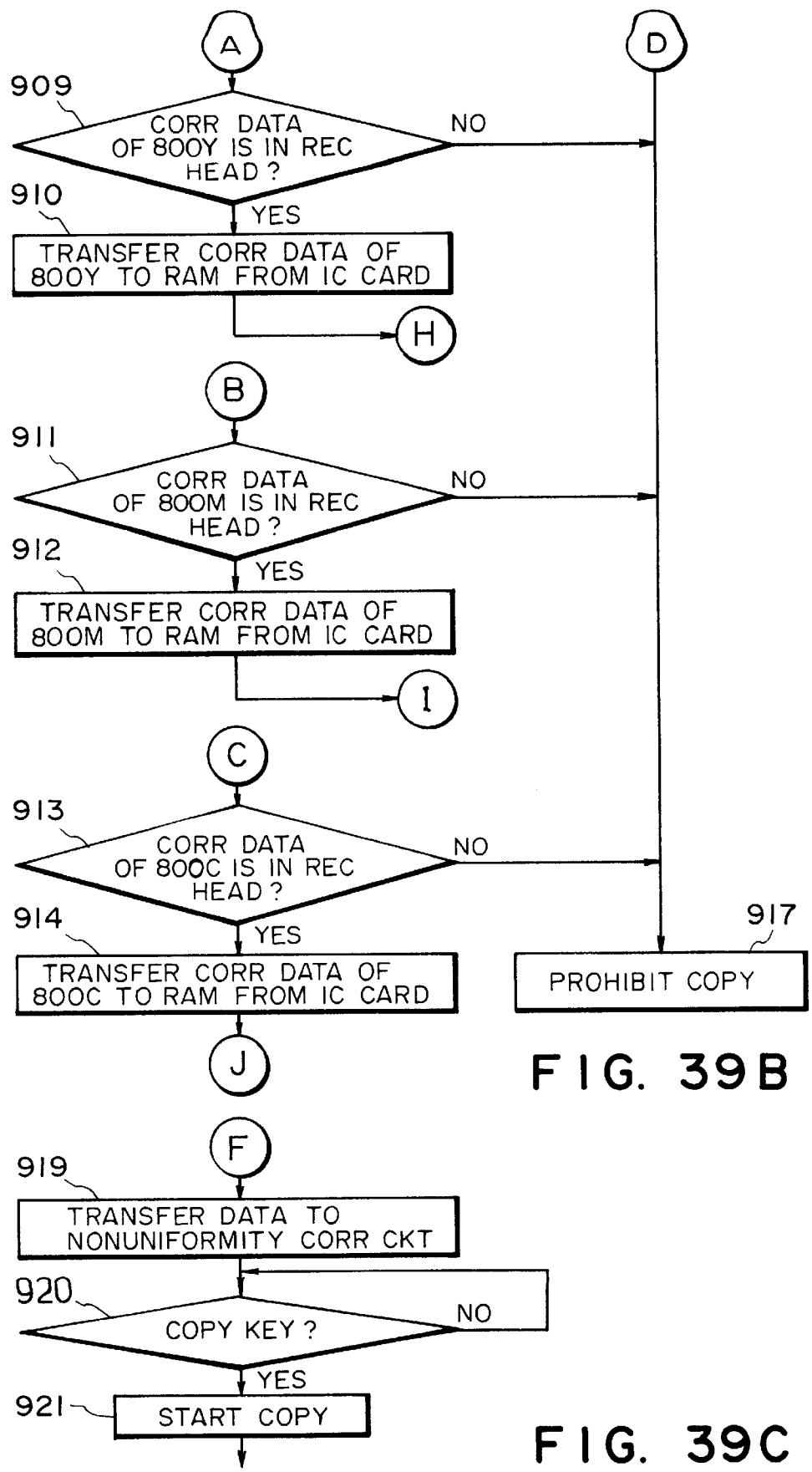

Referring to FIG. 39 (flow chart), the description will be made as to the operation of reading the correcting data of the recording head from the IC card 717.

After the main switch is actuated, the CPU 712 reads the serial numbers from the ROMS 430Y, 403M, 403C and 403K mounted on the recording head 500 in the recording heads 500 mounted on the apparatus (steps 901–904). Subsequently, the discrimination is made as to whether the correcting data for the serial numbers are already transferred from the IC card 717 to the RAM 714, and therefore, the correcting data are in the RAM 714, or not (steps 905–908). If the correcting data for all of the recording heads 800 are in the RAM 714, the copying operation is enabled (step 918), and the correcting data in the RAM 714 are transferred to the RAM 804 (steps 919 in FIG. 6C). When the copy key (not shown) is depressed, the copying operation is started (steps 920–921).

In the steps 905–908, if the correcting data for even only one serial number of the recording head 500 are not in the RAM 714, the discrimination is made as to whether the IC card 717 contains the correcting data corresponding to the mounted recording head 500 at steps 909, 911, 913 and 915. If so, the required correcting data are transferred from the IC card 717 to the RAM 714 (steps 910, 912, 914 and 916). When the correcting data for all of the mounted recording heads 500 are prepared, the copying operation is enabled (step 918). If even only one datum is missing, the copy operation is prohibited.

The IC card 717 is capable of containing correcting data for a plurality of recording heads, and the data which are no longer usable can be erased.

Therefore, when the correcting data are transferred to the main assembly of the recording apparatus, a datum or data is indicative of the face that the correcting data are already used, is written in the IC card 717. When new correcting data are to be written in the IC card 717, the used correcting data are erased, and the new data can be written in the erased area. The writing of the correcting data in the IC cartridge 717 is carried out when the cartridge is bought, or otherwise, a new IC card having the correcting data are given together with the cartridge when the cartridge is bought. When the IC card is inserted in the main assembly of the copying apparatus, the correcting data are read in the main assembly of the copying apparatus.

Such an IC card may be retracted from the main assembly once the correcting data are read by the main assembly.

As described in the foregoing, according to this embodiment, by a single IC card 717, the correcting data for a number of recording heads for different colors can be stored, and therefore, the efficiency is improved. Accordingly, the transmission of the correcting data or the like can be carried out easily and at low cost.

The memory means in this embodiment is not limited to the IC card, but the cost performance is good when the IC card is used, because it is reusable.

In addition, it is possible that the correction data for the recording head which has been obtained in a wrong way are prohibited to be inputted in the IC card, and therefore, the wrong usage can be prevented.

In the case of a disposable head which is disposed of when the ink container becomes empty, the number of correcting data transfers are increased, and therefore, the usage of the IC card is increased, and therefore, the embodiment is particularly suitable. In such a case, a number of recording heads are bought at one time, and in that case, it is convenient that the correcting data for all of the bought recording heads are stored in the IC card.

In the foregoing embodiment, the density non-uniformity is removed or suppressed by storing the table of the correcting image data in the ROM 701 and by selecting the correcting data in accordance with the recording head used. However, it is a possible alternative that the dot diameters by the ink are made uniform by changing the driving voltage, the driving currents and driving periods for the respective ejection outlets. This embodiment is not limited to the case of thermal energy used to eject the ink. When the thermal energy is used, the correction may be made by changing the temperature of the heating source for each of the ejection outlets.

As described in the foregoing, according to this embodiment, the driving conditions can be controlled in accordance with the printing head in accordance with the data stored in a detachably mountable storing means, and therefore, the structure is simplified to reduce the cost without degrading the image quality.

Yet Further Embodiment

A further embodiment will be described, wherein the data of the memory integral with the recording head is assured by read out upon the exchange or interchange of the recording head.

Figure 40:
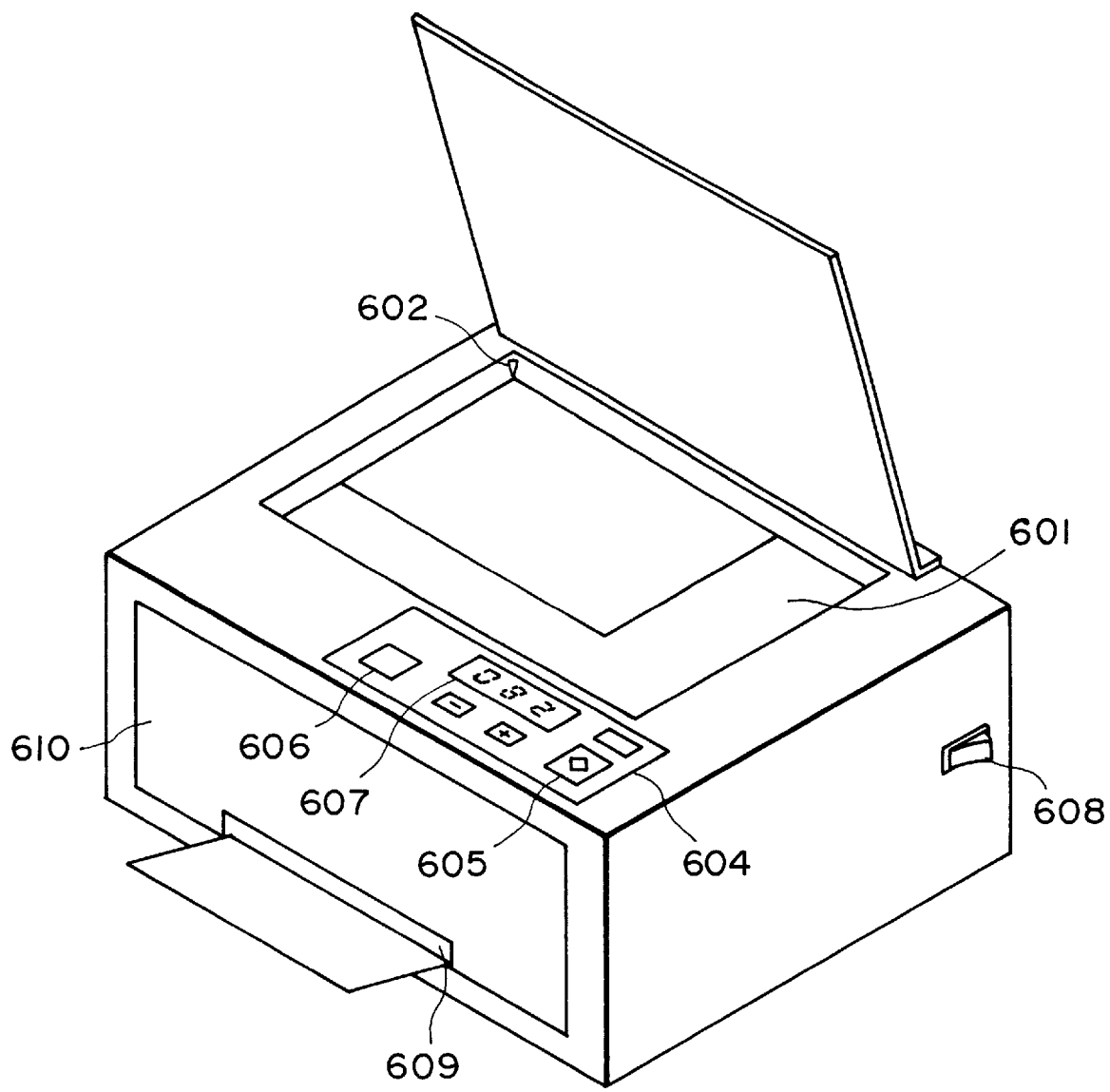
FIG. 40 is a perspective view of an outer appearance of an apparatus according to a further embodiment of the present invention.

Referring to FIG. 40, there is shown an outer appearance of the apparatus according to this embodiment. The apparatus comprises an original carriage 601 for supporting thereon an original or a recording material such as paper having a test pattern, and an index mark 602 for the positioning of the original carriage. Reference numeral 603 designates an original or a recording material having a recorded image placed on the original supporting platen 601. The apparatus further comprises an operation panel portion 604, copy keys 604 for instructing recording operation conditions, instructions keys for effecting RHS operation which will be described hereinafter, and a display 607 for displaying information relating to the RHS operation, for example. The apparatus further comprises a main switch 608, a sheet discharge output 609, and a door 610 for protecting the recording head. When the recording head is exchanged or interchanged, the door 610 is opened.

The description will be made as to the data in EPROM formed in the recording head in this embodiment.

FIG. 41 shows allocation of the data in the EEPROM in each of the recording heads. In this embodiment, the EEPROM contains the data indicative of a lot number, density non-uniformity correcting data, driving data for setting driving conditions and color of the ink of the recording head.

As show in FIG. 41, each EEPROM in this embodiment has the capacity of at least 1024 bits. As will be also understood from the Figure, in the 8 bits (0–7), the correcting data for the first nozzle is allotted to 0–6 bits, and the data allotted to the sixth and seventh bits, are the data in bit 0 and bit 1 of four bits data indicative of the characteristics region of the temperature sensor (SENS) provided in the recording head shown in FIG. 42. The data allotments and the address are as shown in the Figure.

In the Figure, references T1 and T2 designate data of optimum driving pulse waveforms for the recording head; ID, data indicative of the lot number of the recording head; COLR, the color of the ink of the recording head.

Figure 43:
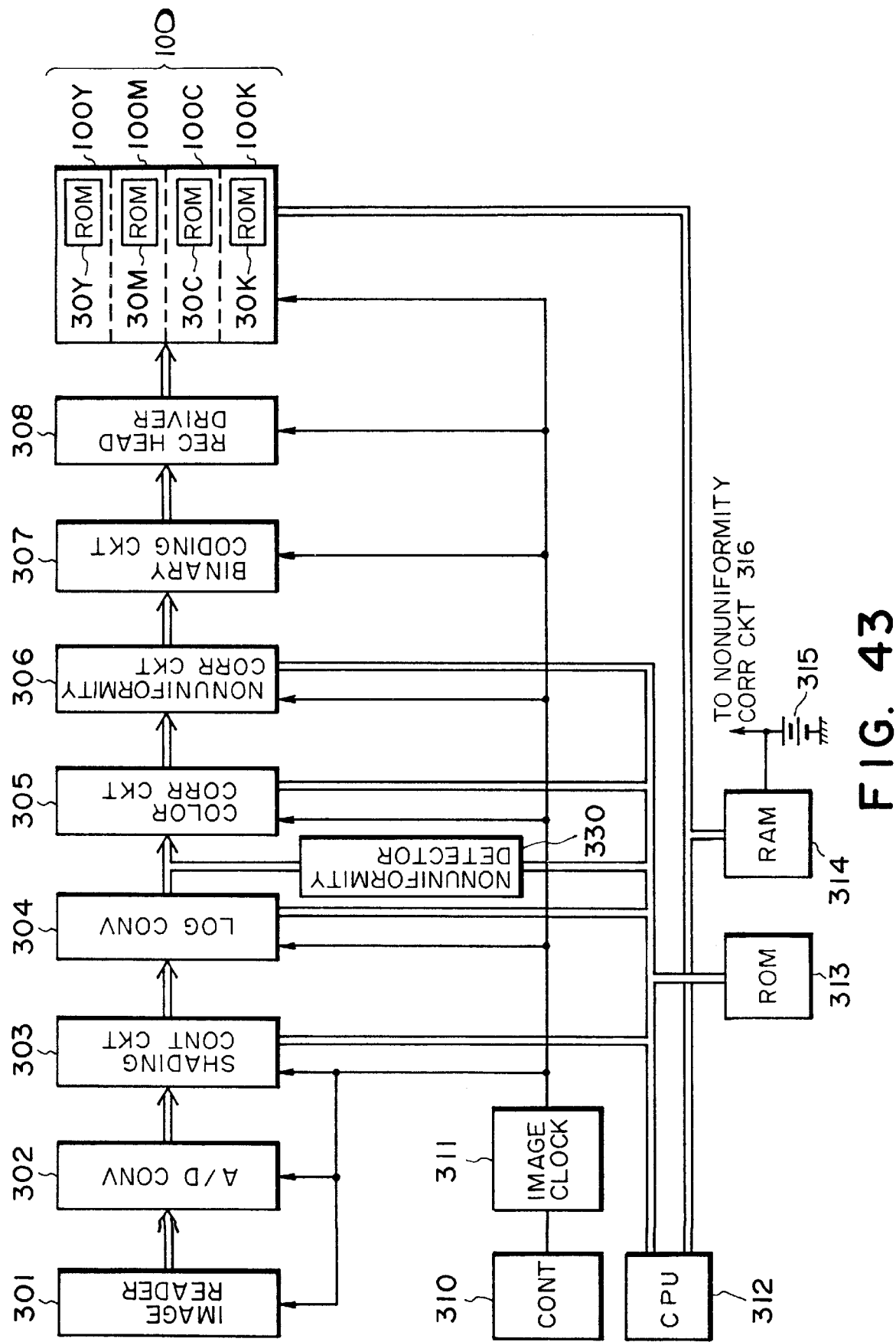
FIG. 43 is a block diagram illustrating an internal structure of the apparatus shown in FIG. 40.

Referring to FIG. 43, the general description will be made as to the block diagram for the control of the entire apparatus. In FIG. 43, the same reference numerals as in FIG. 36 are assigned to the corresponding elements. As shown in FIG. 36, a CPU 312 has two address buses and two data buses. One system is connected with the circuits 303, 304, 305 and 306, and the other system is connected to a ROM in the head and a back-up RAM. Designated by a reference numeral 314' is a back-up RAM for storing the data in the head, and 330 designates a density non-uniformity measuring device.

Figure 44:
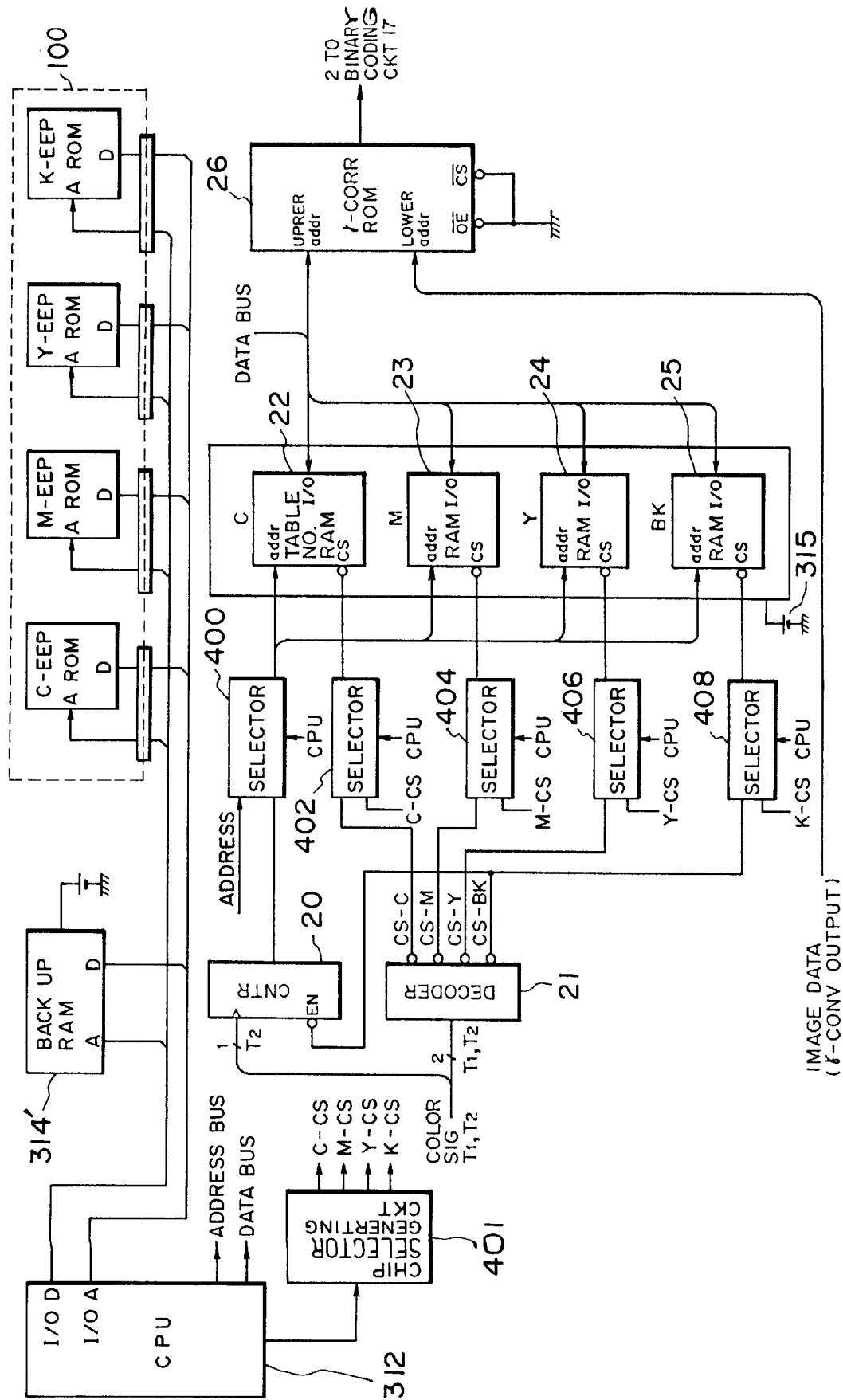
FIG. 44 illustrates a major part of FIG. 43.

Referring to FIG. 44, the major part of the circuit shown in FIG. 43 will be described in more detail. In FIG. 44, the like reference numerals are assigned as in FIG. 29, and the description thereof is omitted for simplicity. In FIG. 44, reference numeral 314 designates a back-up RAM of FIG. 43, and RAMs 22–25 are connected with data buses which in turn are connected with an I/O port. A selector 400 selects an address from the counter 20 or the address from the CPU 312', and the CPU 312' controls the selection. Selectors 402, 404, 406 and 408 select the signal from a decoder 21 or a signal from a chip selection signal generating circuit 401.

Referring to FIG. 45, the image non-uniformity measuring device will be described.

The apparatus of this embodiment includes correcting means for correcting density non-uniformity resulting from the change in the recording head with time. When such non-uniformity occurs, a test pattern shown in FIG. 20 is printed through the steps which will be described hereinafter. Then, the printed pattern is read by an image reader 301, and the non-uniformity is detected. The circuit shown in FIG. 45-2 detects the density non-uniformity resulting with time, and calculates the correcting data correspondingly, and thereafter, writes the data in the RAM 314.

Among the data having been subjected to the converter 304 of FIG. 43 for the conversion to the three primary color data, a color signal now under measurement for the purpose of density non-uniformity correction is selected, and is latched in a latching circuit 131. The latched image signal is added by an adder 132, and the result of the adding is averaged by an averaging circuit 133. The averaged data is once stored in a memory 134. The data added by the adder 132 represent density of plural dots recorded by the respective nozzles. The number of the samplings can be selectively set.

Figure 45A:
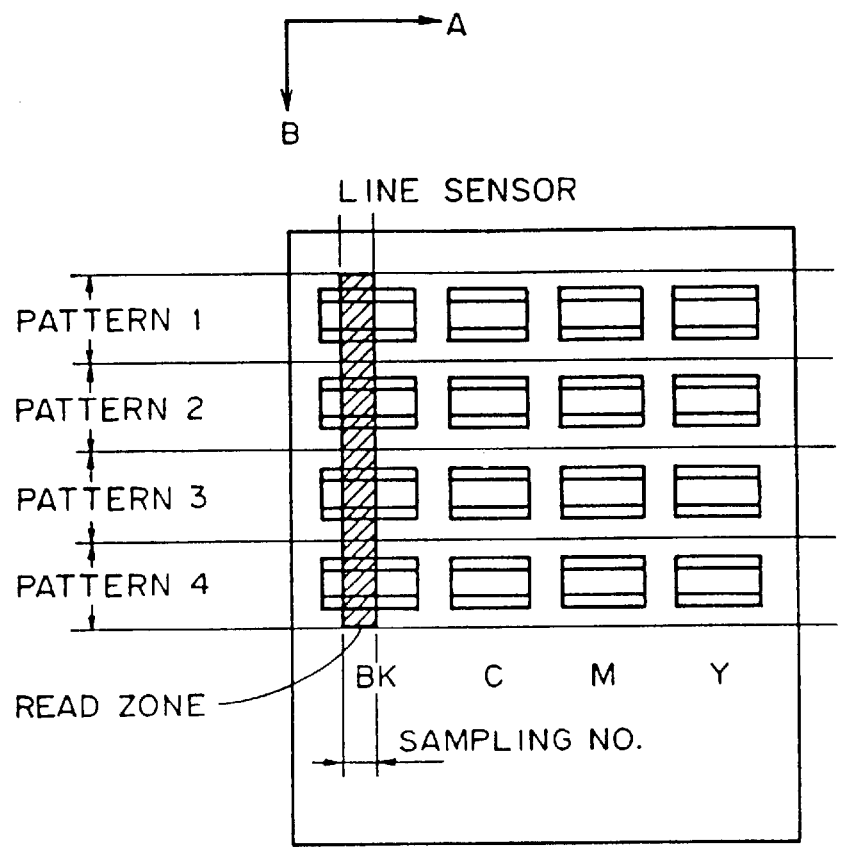
Figure 45B:
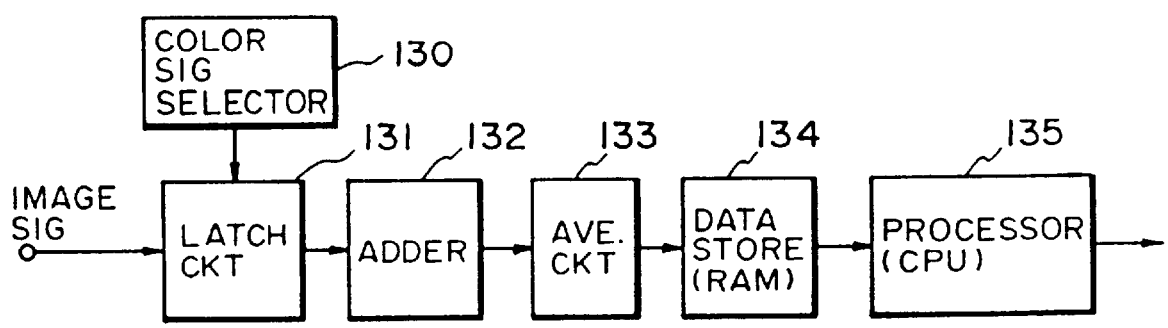

As shown in FIG. 45A, an original is set on an original supporting platen in the manner that the nozzle arrangement detection B of the standard test pattern (50% halftone) for the non-uniformity measurement is perpendicular to the direction A of the line sensor arrangement. Then, it is scanned by a line sensor. When the resolution power of the recording head 100 and the resolution power of the line sensor are the same, the density data of a number of picture elements are obtained by one sampling operation by the line sensor, the number corresponding to the number of light receiving elements of the line sensor. When the resolution power of the line sensor (CCD) is higher than that of the recording head, the density of the recorded one picture element is calculated on the basis of the data provided by plural light receiving elements.

The average density data of the nozzles are processed by the CPU 135, and the correcting tables of FIG. 28 are given to the respective nozzles. The number of correcting tables are now stored in the correcting RAM 314'.

Figure 46:
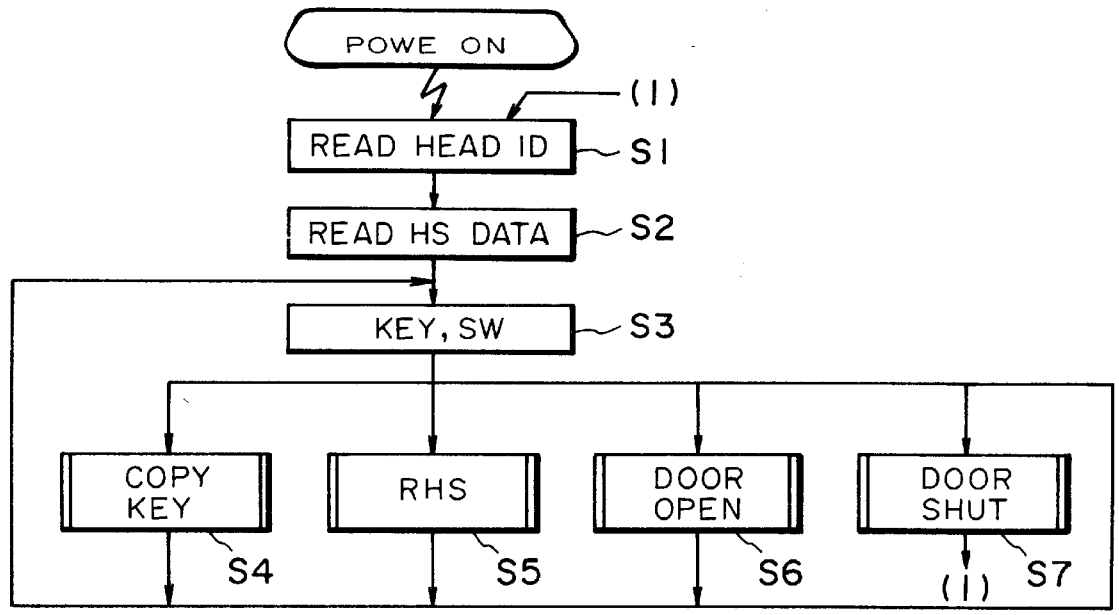
FIG. 46 is a flow chart illustrating operation of the apparatus of FIG. 40.
Figure 47:
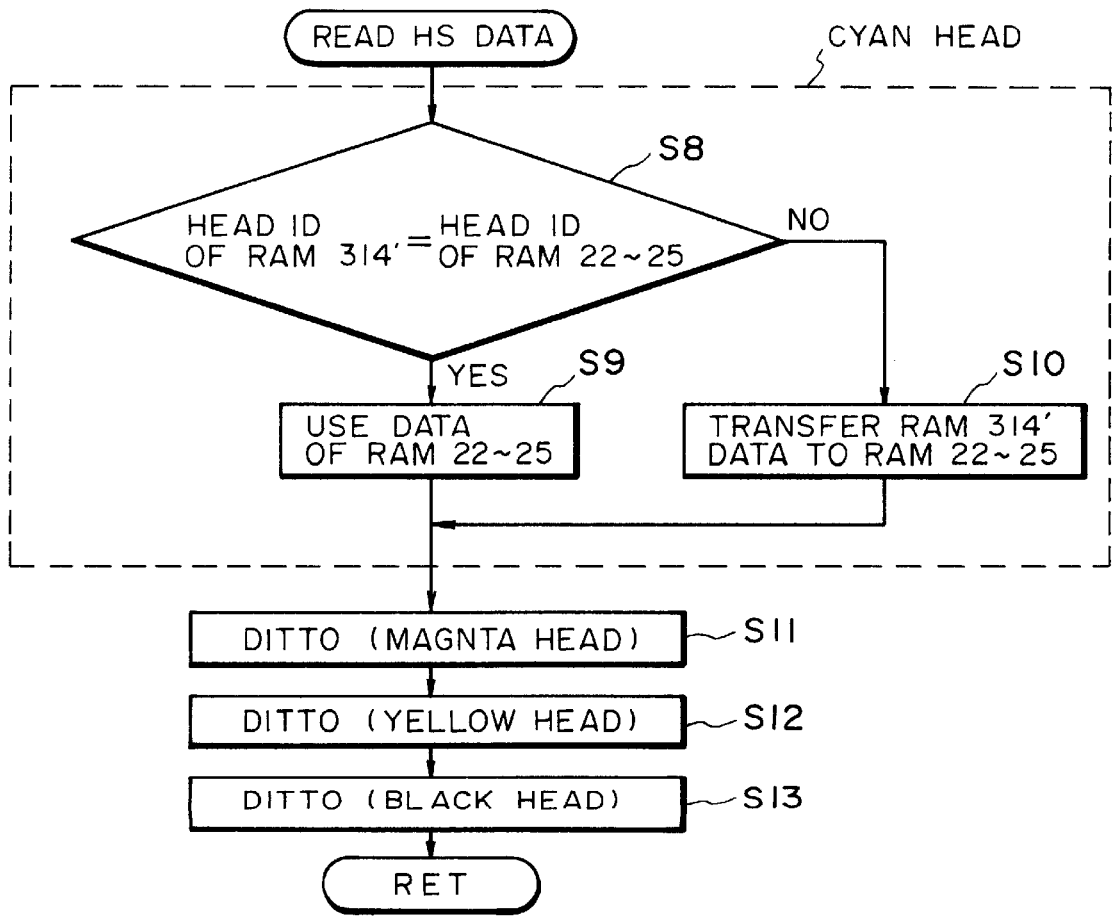
FIG. 47 is a flow chart showing the operation in step S2 in FIG. 46.

Referring to FIG. 46, the description will be made as to the operation of the apparatus according to this embodiment. At step S1, the main switch 608 in FIG. 40 is actuated. The non-uniformity correcting data (HS data) in the non-volatile memory in the recording head mounted on the main assembly of the recording apparatus are copied, together with the identification number (ID) into the RAM 314' of the printer shown in FIG. 43. This operation is carried out always when there is a possibility that the recording head might have been interchanged or exchanged by the operator, for example, immediately after the main switch is actuated, or immediately after the recording head changing door (610 in FIG. 40) is opened or closed. The RAMs 422–425 store the HS data provided by a final RHS operation, and the storage is backed up by a battery 315. The RAM 314' and the RAMs 22–25 store the respective identification number ID and the γ correcting data for the respective cyan, magenta, yellow and black recording heads. Thereafter, at step S2, the data is transferred from RAM 314' to RAMs 22–25. At this time, in order to use the latest HS data of the mounted head, the following discrimination is made. At step S8 of FIG. 47, the comparison is made between the identification number ID of each of the recording heads copied upon the main switch actuates and the head identification number ID stored in the RAMS 22–25. If they are the same, it means that the head has been subjected to the RHS operation, and that the results of the operation are stored in the RAMS 22–25. Therefore, the HS data in the RAMs 22–25 are used in the recording (S9). The data in the EEPROM in the head is not rewritten, and therefore, the HS data provided by the RHS operation are assuredly later than the initial HS data of the recording head. As a result of the comparison between the identification number ID of the recording head and the identification number stored in the RAMS 22–25, if they are not the same, the data in the RAM 314' are for another head, and therefore, the data are not usable with the currently mounted recording head. Therefore, data in the RAM 314' is transferred to the RAMS 22–25 (step S10). As shown in FIG. 47, the steps S8, S11, S12 and S13 are executed for each of the colors. At step S1, it is a possible alternative that the HS data is not all copied, but only the ID data are copied. In this case, if the ID data are not the same as the ID data in the RAMs 22–25, only then the data in the EEPROM in the head are copied together with the HS data.

Figure 48:
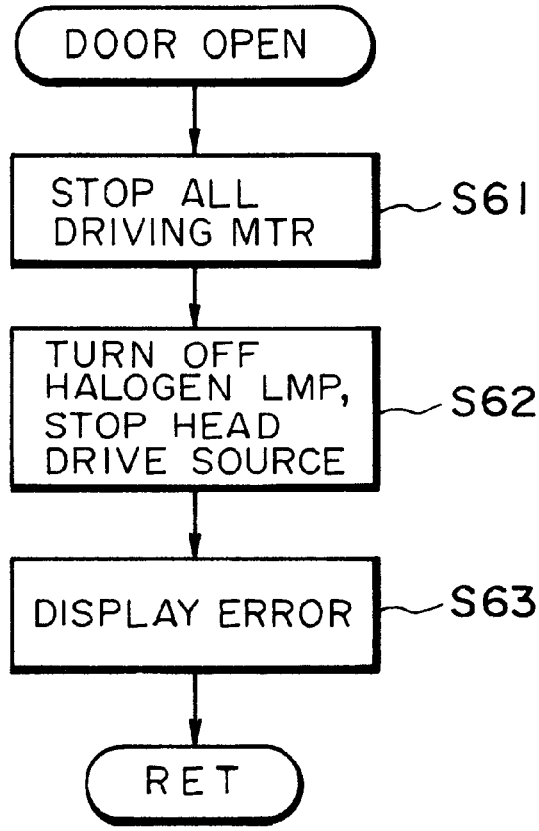
FIG. 48 is a flow chart illustrating an operation in step S6 of FIG. 46.
Figure 49:
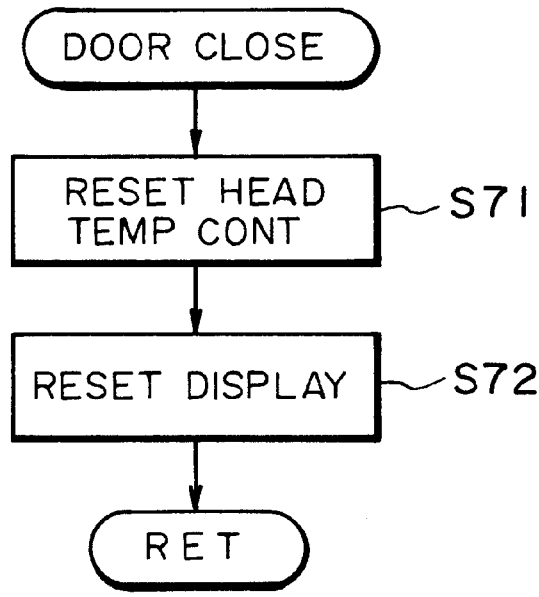
FIG. 49 is a flow chart illustrating an operation in step S7 of FIG. 46.

After the HS data corresponding to the recording head are transferred to the RAMs 22–25, the discrimination is made as to inputs from keys such as a copy key (605 in FIG. 40) of the operation panel (604 of FIG. 40) and door switch of the head changing door. The copying operation at step S4 of FIG. 46 is the same as described hereinbefore, and therefore, the description is omitted for simplicity. Step S6 contains the processing when the head changing door is opened. The process is shown in FIG. 48, which will be described hereinafter. When the door is opened, the door switch is rendered off. Upon the deactuation of the switch is detected at step S3, the step S6 is executed. As shown in FIG. 48, all of the driving motors are stopped (step S61), and the lamps are turned off, the head driving source is cut-off (step S62), and an error is displayed. This is effected for the purpose of an operator's safety from the current and the mechanical movement of the recording head accessible by the operator's hand. After the door open process is executed, the execution of step S6 is repeated until the door closure, that is, the closure of the door switch is detected. Therefore, the key input is prohibited, and the error display on the display LED panel is retained to notify the door opening to the operator, until that time. When the door is closed, the door shutting process is executed at step S7. The process will be described in conjunction with FIG. 49. When the door closure is detected, the temperature control of the recording head is resumed (step S71) to be prepared for the printing instruction, and the display is stopped. The display returns to the usual state (number of copies or the like) (step S72). Then, the sequential flow returns to step S1, where the identification data of the head is read, by which the discrimination is possible as to whether the recording head has been changed or not. In the apparatus of this embodiment, the keys on the operation panel are usable for the purposes other than those described above, however, they are not directly connected with the present invention, therefore, the description thereof and indication in FIG. 46 thereof are omitted for simplicity.

The RHS (reader head shading) operation at step S5 of FIG. 46 is a correcting process operation for the image density non-uniformity using the reader of the apparatus. In this operation, the density non-uniformity is detected from a printed pattern by a reader of the apparatus, and the HS data is renewed so as to re-correct the density non-uniformity correcting data from the data of the reader.

Figure 50:
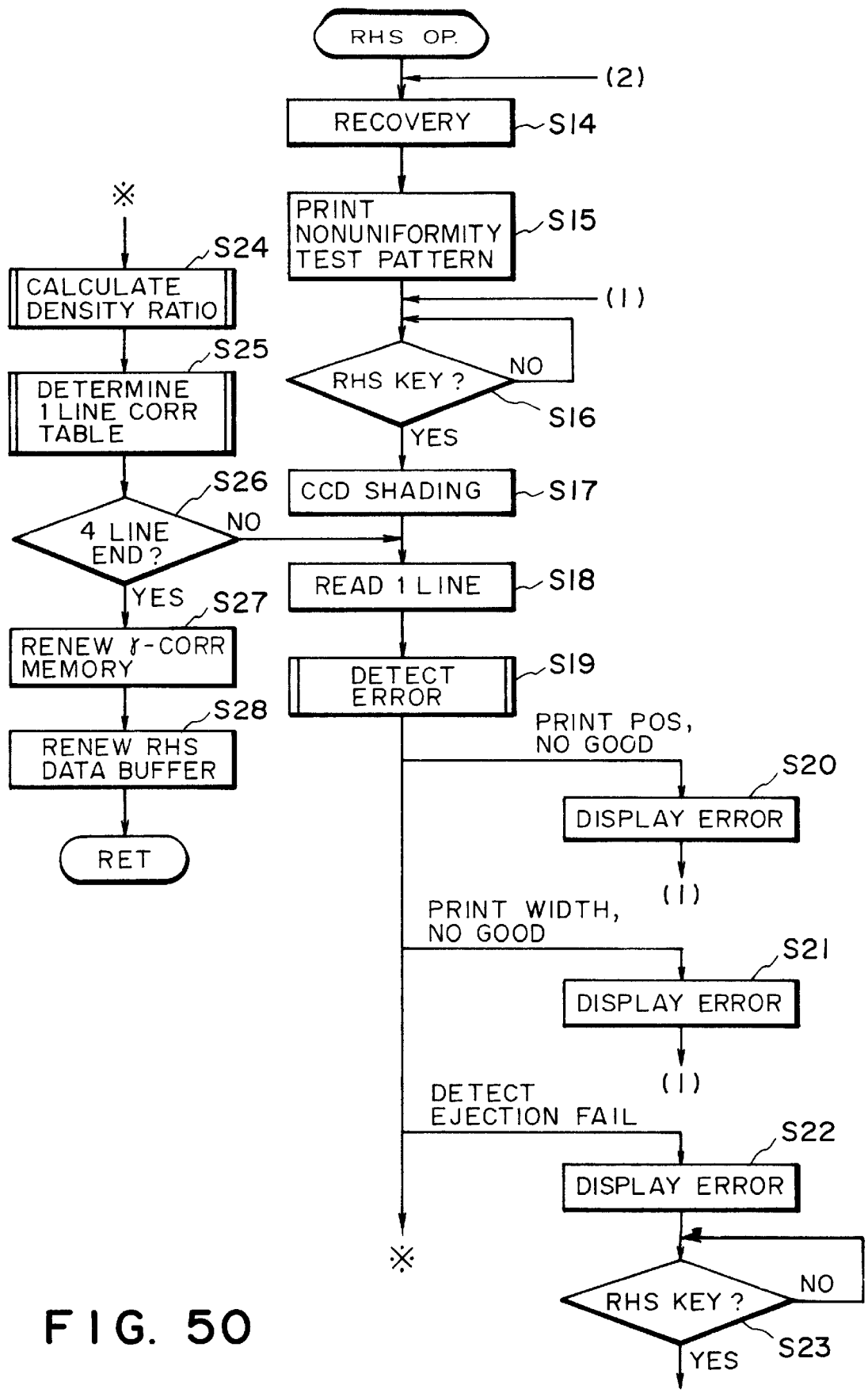
FIG. 50 is a flow chart illustrating an operation in step S5 of FIG. 46.

Referring to FIG. 50, the description will be made as to the flow chart for the RHS operation. The operation is divided into the printing of a test pattern and the reading of the pattern by the reader and HS data calculation therefrom.

Upon depression of the RHS the key on the operation panel, a test pattern is printed by the recording head. This is indicated in FIG. 50 as step S14 (head recovery operation) and step S15. In the step S14, the solidified ink of the recording head is removed; the bubbles in the ink are removed by sucking the ink through the ejection outlets; and the head heater is cooled. These operations are performed in series. By doing so, the test pattern for the RHS operation is printed with the best condition.

Figure 51A:
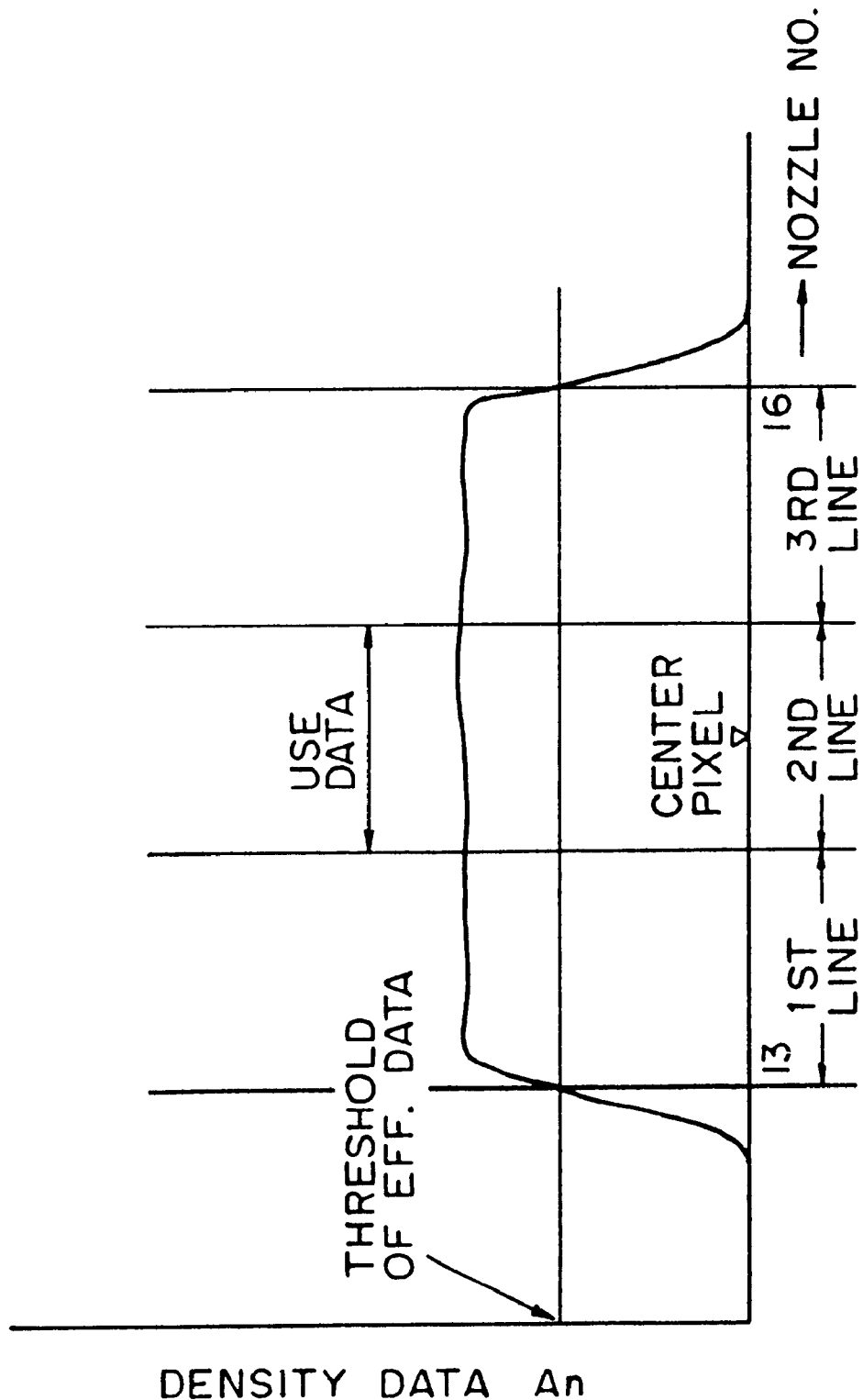
FIG. 51A shows data provided when a print sample is read.
Figures 2, 51B:
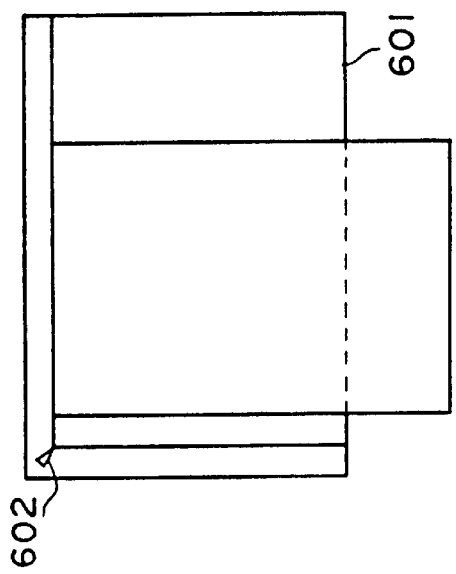
FIG. 51B illustrates the case wherein the print sample is placed on an original supporting platen of FIG. 40.
Figures 3, 51B:
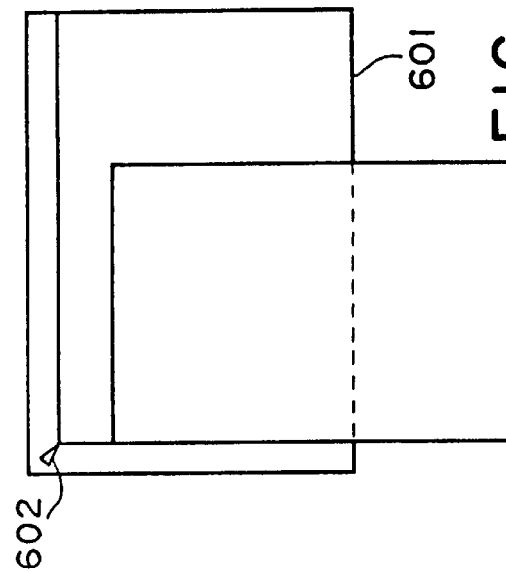
Figures 1, 51B:
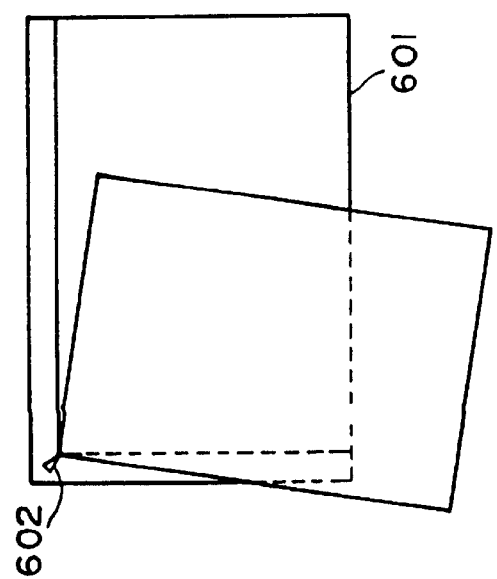
Figures 4, 51B:
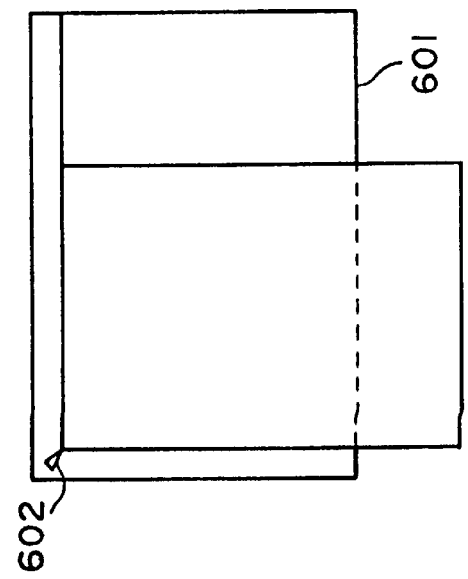

At step S15, the test pattern for the non-uniformity detection shown in FIG. 45 is printed. The test pattern comprises 16 blocks including 50% halftone blocks for the respective colors arranged in the vertical direction. The pattern is printed at a predetermined position on the recording sheet. The position is so determined that the error detection is conveniently performed upon pattern reading which will be described hereinafter. Each of the blocks includes 3 line prints, on the first and third lines, only 16 nozzles from 128 nozzles are actuated, and on the second line, all of the 128 nozzles are actuated, so that the print width corresponds to 160 nozzles. The reason why each of the blocks has a 160 nozzle width is that, as shown in FIG. 51B, when a recording head having 128 nozzles is used, and when the pattern recorded thereby is read by a CCD line sensor or the like, the density data An is not sharp by the influence of the white background of the recording sheet. Then, if each of the blocks is recorded with all of 128 nozzles only, the reliability of the density data at the end portion of the nozzle is liable to be decreased.

Therefore, in this embodiment, the printing is effected with a 160 nozzle width, and the density data exceeding a predetermined threshold are treated as effective data. The center of the effective data are deemed as the center of the nozzle, and the datum at the position away from the center by (nozzle number)/2 (64 in this case) is made to correspond to the first nozzle and 128th nozzle.

After the completion of the test pattern print, the depression of the RHS key is awaited at step S16 of FIG. 50. The operator places the recorded sheet having the test pattern printed on the original supporting platen 401 of FIG. 40 face down thereon. In this case, the four blocks having the same color are arranged in the main scanning direction of the CCD sensor. Thereafter, the RHSC is depressed, and the operation proceeds to step S17 of FIG. 50.

The HS data calculation is made in the steps S17–S28. In the step S17, the shading operation for the CCD sensor is effected, and then the non-uniformity is detected at step S18. Here, one line scan means the scanning by the CCD sensor of all of the four blocks in a certain color by one scan. Therefore, in the one line scan in step S18, the four blocks of black patterns are stored in the memory 134 of FIG. 45B. The density data thus read for the four blocks are allotted to the areas in the memory, because the test pattern is printed at the predetermined position of the recording sheet.

At step S19, the error detection is effected to the read data stored in the memory. The RHS operation requires the operator's manipulation of the test sample print on the reader, and therefore, the erroneous operation of the user is desirably to be taken into consideration. Therefore, the series of operations is severely checked. In addition, even if the manipulation by the operator is corrected, if the improper data is read by the reader, the process operation should be stopped, since otherwise, the non-uniformity may be increased. Therefore, in the RHS operation in this embodiment, the following error detection is effected.

First, the possible error is that the operator places the test print at in incorrect position relative to the reading region of the reader. For example, the test print of FIG. 45 is supposed to be placed on the reader as shown in FIG. 51A, and the data of FIG. 51B are supposed to be obtained. If, however, it is deviated in the main scan direction of the reader, as shown in FIG. 51 (*e*), the data is incomplete by one block or the like, as shown in FIG. 52 (*e*) or (*f*). If it is deviated in the sub-scan direction of the reader, as shown in FIG. 52 (*g*), zero is read in, and therefore, the low density data are read in, as shown in FIG. 52 (*h*). In the worst case, different color data are read. In addition, if the test print is placed inclined as shown in FIG. 51B (*b*), adjacent nozzle data are read together. In any of the above cases, the correct correction is not expected, and therefore, the error is detected to reject the read data. FIG. 51B is a top plan view of the original supporting platen 601 of FIG. 40. FIG. 52 shows the relation between the test prints (a), (b), (e) and (g) placed on the original supporting platen 601 and the image data (b), (d), (f) and (h) from the respective test prints placed.

In order to effect the above rejection, in this embodiment, the error is detected if as a result of one scan of the reader, the print region having a level beyond a predetermined threshold is not at a proper position (address). The print region means a region where the level beyond a predetermined level in each of the colors continues. Therefore, if the white background is read, data is zero, and it is not discriminated as the print region. As for another error detecting method, where the print region has a width beyond a predetermined level, it is detected that the test print is placed obliquely (FIGS. 52 (*c*) and (*d*)).

Through the above-described method, the writing of the erroneous data of RHS by erroneous placing of the test print is prevented. The error detection described above corresponds to the erroneous placing of the test print by the operator. The above system covers the case wherein the operator places the test print upside-down.

These errors can be corrected by placing correctly the test print and depressing the RHS key again.

Figure 53A:
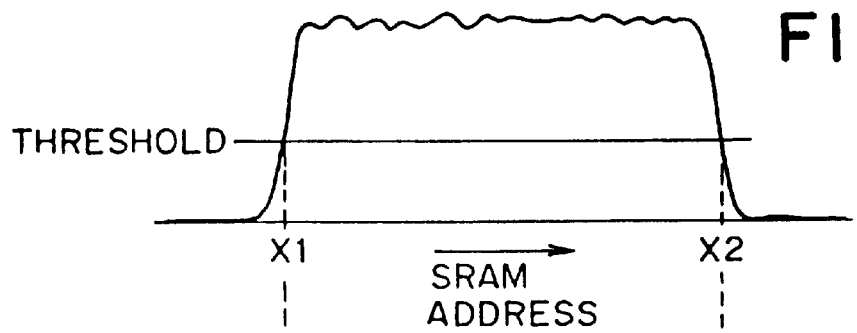
FIG. 53 shows the data similar to those of FIG. 51A.
Figure 53B:
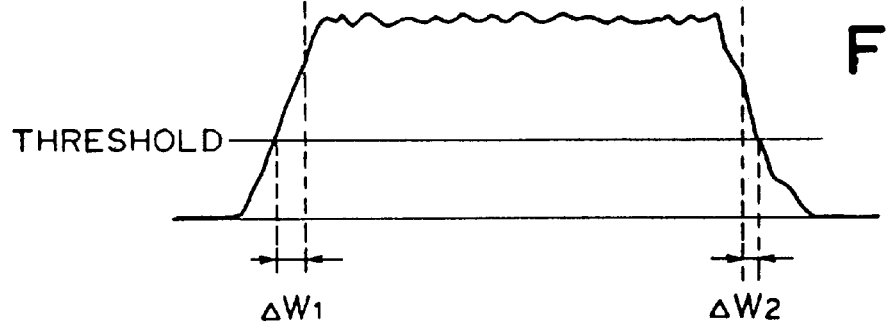
Figure 53C:
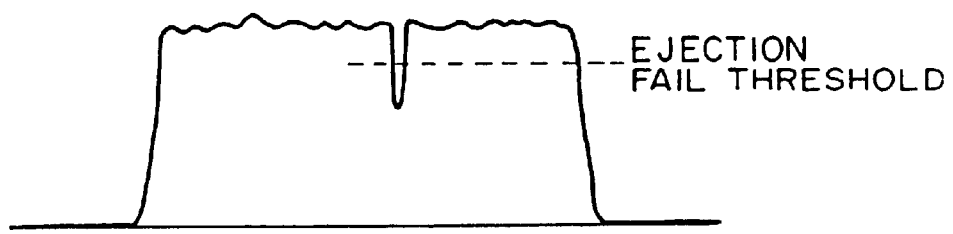

However, if the recording head is not stable, one or more nozzles may incidentally not eject the droplet. In this case, the test print should be deemed as improper. Generally, only one nozzle fails to eject any droplet, as shown in FIG. 53 (*c*), the density does not decrease to the level of the white background. In this embodiment, another threshold is prepared, and when the data in the print region is lower than the threshold, the ejection failure is discriminated. In this case, if the ejection failure is detected in all of four blocks of the print pattern of FIG. 45, the complete ejection failure is detected. If the ejection failure is detected only in one region, but the ejection failure is not detected in the other region, the calculation may be performed using the three regions. Otherwise, the RHS operation may be repeated from the printing of the test pattern. In addition, even when the ejection failure is detected in all of four regions, the calculation process may be performed if the ejection failure can be covered by the adjacent nozzles. Or, the RAM for that color only may be rewritten without rewriting the data for that color. As a further alternative, the threshold for the ejection failure is not prepared particularly, and the threshold for discriminating the print region is slightly placed at a higher level, so that they are simultaneously detected. In any case, the detection of the ejection failure is desirable in the RHS operation. FIG. 53 shows the image data when the test print is read.

In this embodiment, the above-described error detection is effected to prevent erroneous data from being written in the RAM 313, so that the proper data is always stored in the RAM 313.

Where no error is detected at step S19, the density ratio is calculated at step S24. In this embodiment, the calculation is generally divided into the density ratio calculation and calculation for selection of a one line correcting table. In the density ratio calculation, the ratio of the print density of each of the nozzles to the average density is calculated. In the selection of the correcting table, the determination is made as to which table from the 64 correcting tables prepared beforehand is to be selected for each of the nozzles having the density ratio calculated at step S24 (step S25). As described hereinbefore, each of the tables provides a modified output signal in response to a print input signal. More particularly, in the case of the low density nozzle, a table for converting the input signal to a higher output signal at all times is selected. On the contrary, in the case of a higher density nozzle, the table providing a lower output signal than the input signal is selected.

Figure 54:
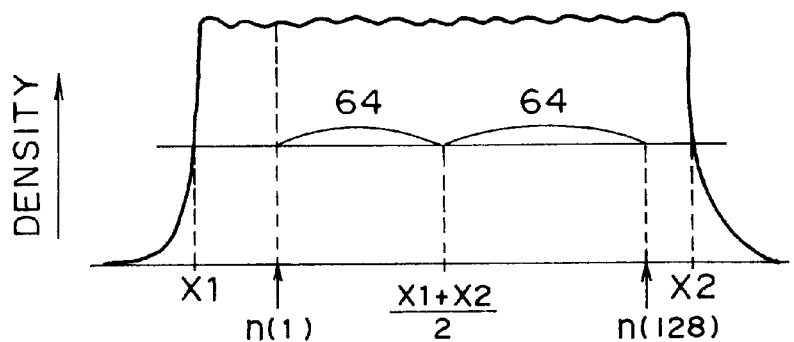
FIGS. 54 and 55 illustrate operations in the flow chart of FIG. 50.
Figure 55:
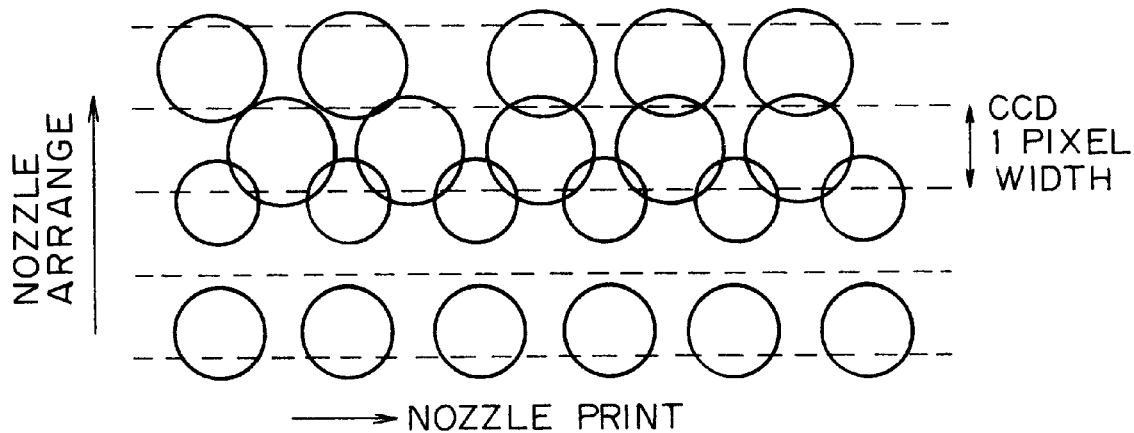

Referring to FIG. 54, the operation will be sequentially described from the point where the data of FIG. 53 (*a*), is actually inputted. At first, an average of the rising positions X1 and X2 at the opposite ends is taken to obtain the central level of the print region. This is discriminated as the center of the line of the nozzles, that is, the center between the 64th nozzle and 65th nozzle. Therefore, the data at the position away from the center by 64 picture elements are a datum of the the first nozzle and a datum of the 128th nozzle. The data are density data. Then, the print density N(i) of each nozzles including the connecting portions at the opposite ends are provided. However, it is risky that the density data obtained from the width corresponding to only one picture element are taken as the density data of the nozzles, because the density datum of one picture element is influenced by the densities of the adjacent dots, and because any of the nozzles are more or less deviated toward left or right. In addition, the density non-uniformity sensed by human eyes is influenced by the peripheral conditions containing the noted picture element. Therefore, in this embodiment, before determining the density of each of the nozzles, an average of the densities of three picture elements including the noted picture element and the adjacent picture element at the opposite sides, and the average is taken as a nozzle density ave(i).

In addition, an average AVE of the densities ave(1)–ave (128) is taken as an average density of all of the nozzles. Then, a ratio of the average density of each of the nozzles to the total average density is determined. Here, it should be noted that the ratio d(i) obtained is a reciprocal of the nozzle density to the total average density. That is, d(i) is AVE/ave (i). The correction is such that the low density nozzle is corrected toward the high density, and that the high density nozzle is corrected to the low density. Therefore, for the convenience of the subsequent calculation process, the reciprocal is obtained. After 128 density ratios d(i) are obtained, the density ratio calculation is completed, and the data are supplied for the process of obtaining a one line correcting table.

Here, the current density ratio d(i) thus obtained is multiplied by the previous density ratio d(i), that is D(i)=d(i)× D(i). By doing so, all of the past density ratios d(i) are contained by the multiplication. Since the density non-uniformity gradually changes, the inclusion of the first data makes sense. Then, the table is determined, by T(i)=D(i)−1×100+32, where T(i) is the table number. As described hereinbefore, 64 correcting tables are prepared. The inclinations of the correcting tables are gradually changing with the center of the table No. 32 which has the inclination 1, that is, the input level is equal to the output level at all times. The table No. 32 corresponds to the nozzle providing the total average density of 128 nozzles. The other curves are different inclinations with increments of 1% with the center of the no. 32 table at the density 50% (80H) equal to the test print. Therefore, T(i) obtained by the above equation provides the signal conversion in which the density ratio is the same at 80H input. In this manner, 128 T(i) are obtained. This is the end of the one line correcting table determination process.

Thus, the non-uniformity reading and HS data calculation (T correcting table number determination) on the basis of the read data are completed for one line, that is, for color. At step S26 of FIG. 50, the discrimination is made as to whether the similar processing are completed for four color heads, that is, four lines. If so, the RAM 314' is renewed at step S27. Before the RHS processing, the latest HS data (T correcting table number) is stored, which is replaced by the calculated HS data.

Subsequently, at step S28, the contents of RAMs 22–25 are replaced with the latest HS data.

As will be understood from the foregoing, according to this embodiment, when a new or another head replaces the currently mounted head, the data (γ correction data) of EEPROM are written in the RAM 314'. Subsequently, against the change with time, the data in the RAM 314' are renewed in accordance with the above operation. In order to maintain the renewed data even upon the power shut off, the RAM is backed up by a battery.

As described in the foregoing, according to the present invention, the recording head is provided with characteristics and control information peculiar to the recording head, and the control information is checked upon actuation of the main switch or when the door is opened. Therefore, the main assembly of the recording apparatus can become aware of the interchange or exchange of the recording head, and therefore, each of the recording head can be controlled with the optimum ambient condition, driving conditions and image processing conditions.

By detecting the cover of the main assembly which is opened upon exchange or interchange of the recording head, it is possible that the control information for the recording head is confirmed, and therefore, the timing for various processing operations can be properly controlled.

Furthermore, according to this embodiment, the recording apparatus itself comprises the means for detecting and correcting the change of the characteristics of the recording head with time (density non-uniformity change of the recording head in this embodiment), and therefore, upon the change of the recording head, the record control is effected with the data stored in the memory in the head, but the data can be renewed on the basis of the change with time, and therefore, a high quality image can be assured throughout the service life of the recording head.

In this embodiment, the ID data of the recording head is a lot number, but this is not limiting, and the recording heads number peculiar to each of the recording head is usable.

The present invention is particularly suitably usable in a bubble jet recording head and recording apparatus developed by Canon Kabushiki Kaisha, Japan. This is because, the high density of the picture elements, and the high resolution of the recording are possible.

The typical structure and the operational principles are preferably those disclosed in U.S. Pat. Nos. 4,723,129 and 4,740,796. The principle is applicable to a so-called on-demand type recording system and a continuous type recording system. Particularly however, it is suitable for the on-demand type because the principle is such that at least one driving signal is applied to an electrothermal transducer disposed on a liquid (ink) retaining sheet or liquid passage, the driving signal being enough to provide such a quick temperature rise beyond a departure from the nucleation boiling point, by which the thermal energy is provided by the electrothermal transducer to produce film boiling on the heating portion of the recording head, whereby a bubble can be formed in the liquid (ink) corresponding to each of the driving signals. By the development and collapse of the the bubble, the liquid (ink) is ejected through an ejection outlet to produce at least one droplet. The driving signal is preferably in the form of a pulse, because the development and collapse of the bubble can be effected instantaneously, and therefore, the liquid (ink) is ejected with quick response. The driving signal in the form of the pulse is preferably such as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600 wherein the heating portion is disposed at a bent portion in addition to the structure of the combination of the ejection outlet, liquid passage and the electrothermal transducer as disclosed in the above-mentioned patents. In addition, the present invention is applicable to the structure disclosed in Japanese Laid-Open Patent Application Publication No. 123670/1984 wherein a common slit is used as the ejection outlet for plural electrothermal transducers, and to the structure disclosed in Japanese Laid-Open Patent Application No. 138461/1984 wherein an opening for absorbing pressure wave of the thermal energy is formed corresponding to the ejecting portion. This is because, the present invention is effective to perform the recording operation with certainty and at high efficiency irrespective of the type of the recording head.

The present invention is effectively applicable to a so-called full-line type recording head having a length corresponding to the maximum recording width. Such a recording head may comprise a single recording head or plural recording heads combined to cover the entire width.

In addition, the present invention is applicable to a serial type recording head wherein the recording head is fixed on the main assembly, to a replaceable chip type recording head which is connected electrically with the main apparatus and can be supplied with the ink by being mounted in the main assembly, or to a cartridge type recording head having an integral ink container.

The provision of the recovery means and the auxiliary means for the preliminary operation are preferable, because they can further stabilize the effect of the present invention.

As for such means, there are capping means for the recording head, cleaning means therefor, pressing or sucking means, preliminary heating means by the ejection electrothermal transducer or by a combination of the ejection electrothermal transducer and additional heating element and means for preliminary ejection not for the recording operation, which can stabilize the recording operation.

As regards the kinds of the recording head mountable, it may be a single head corresponding to a single color ink, or may be plural heads corresponding to the plurality of ink materials having different recording colors or densities. The present invention is effectively applicable to an apparatus having at least one of a monochromatic mode mainly with black and a multi-color with different color ink materials and a full-color mode by the mixture of the colors which may be an integrally formed recording unit or a combination of plural recording heads.

Furthermore, in the foregoing embodiment, the ink has been liquid. It may be, however, an ink material solidified at the room temperature or below and liquefied at the room temperature. Since in the ink jet recording system, the ink is controlled within the temperature not less than 30° C. and not more than 70° C. to stabilize the viscosity of the ink to provide the stabilized ejection, in usual recording apparatus of this type, the ink is such that it is liquid within the temperature range when the recording signal is applied. In addition, the temperature rise due to the thermal energy is positively prevented by consuming it for the state change of the ink from the solid state to the liquid state, or the ink material solidified when it is left is used to prevent the evaporation of the ink. In either of the cases, the application of the recording signal producing thermal energy, the ink may be liquefied, and the liquefied ink may be ejected. The ink may start to be solidified at the time when it reaches the recording material. The present invention is applicable to such an ink material as is liquefied by the application of the thermal energy. Such an ink material may be retained as a liquid or solid material on through holes or recesses formed in a porous sheet as disclosed in Japanese Laid-Open Patent Application No. 56847/1979 and Japanese Laid-Open Patent Application No. 71260/1985. The sheet is faced to the electrothermal transducers. The most effective one for the ink materials described above is the film boiling system.

The ink jet recording apparatus may be used as an output terminal of an information processing apparatus such as a computer or the like, a copying apparatus combined with an image reader or the like, or a facsimile machine having information sending and receiving functions.

As described in the foregoing, according to the present invention, a non-volatile memory element is provided in an ink jet recording head, and the memory element stores a characteristic or a correction data peculiar to each of the recording heads, and therefore, the density non-uniformity can be prevented to improve the quality of the print and the image. Since the manufactured recording head can be inspected on the basis of the quality after the correction, and therefore, the yield can be improved. Accordingly, the manufacturing cost can be reduced.

If the present invention is used with a maintenance free apparatus such as a disposable recording head, the cumbersome adjusting mechanism and adjusting operation are eliminated, and therefore, the load of the operator is reduced.

While the invention has been described with reference to the structures disclosed herein, it is not confined to the details set forth and this application is intended to cover such modifications or changes as may come within the purposes of the improvements or the scope of the following claims.

What is claimed is:

1. An image recording apparatus, comprising:

a recording unit having a plurality of image recording elements and memory means for storing identification datum indicative of identification of said recording unit, and correction datum, corresponding to each of said plurality of recording elements, for correcting image density non-uniformity of said plural recording elements;

reading means for reading the identification datum and the correction datum from said memory means;

means for storing current identification datum and current correction datum previously read by said reading means;

means for, when the identification datum stored in said memory means of said recording unit and the current identification datum stored in said storing means are different from each other, replacing in said storing means the current identification datum and the current correction datum with the identification datum and the correction datum stored in said memory means;

means for forming an image, based on correcting conditions for the non-uniformity of plural recording elements in accordance with the correction datum stored in said storing means;

means for detecting the non-uniformity of the image formed by said image forming means; and means for altering the correcting conditions in accordance with a change of the non-uniformity of said recording elements detected by said detecting means.

2. An apparatus according to claim 1, wherein said recording unit is detachably mountable on a main assembly of said image recording apparatus.

3. An apparatus according to claim 1, wherein said recording elements eject ink for recording.

4. An apparatus according to claim 1, wherein said memory means includes a ROM.

5. An apparatus according to claim 1, wherein said recording unit ejects ink using thermal energy.

6. An apparatus according to claim 5, wherein said recording unit ejects ink by film boiling provided by thermal energy.

7. An apparatus according to claim 1, further comprising means for generating image data to be recorded.

8. An apparatus according to claim 7, wherein said image data generating means includes an image scanner.

9. An image recording apparatus usable with a recording unit which is detachably mountable thereto, said unit including a memory for storing identification datum indicative of identification of said recording unit and correction datum and a plurality of image recording elements, the correction datum corresponding to each of the plurality of recording elements, said apparatus comprising:

mounting means for mounting said unit;

means for reading the identification datum and the correction datum from the memory of said unit mounted thereon, the correction datum for correcting image density non-uniformity of the plurality of image recording elements;

means for storing current identification datum and current correction datum previously read by said reading means;

means for, when the identification datum stored in said memory of said recording unit and the current identification datum stored in said storing means are different from each other, replacing in said storing means the current identification datum and the current correction datum with the identification datum and the correction datum stored in said memory;

means for forming an image, based on correcting conditions for the non-uniformity of plural recording elements in accordance with the correction datum stored in said storing means;

means for detecting the non-uniformity of the image formed by said image forming means; and means for altering the correcting conditions in accordance with a change of the non-uniformity of the recording elements detected by said detecting means.

10. An apparatus according to claim 9, wherein said recording elements eject ink for recording.

11. An apparatus according to claim 9, wherein said memory means includes ROM.

12. An apparatus according to claim 9, wherein said recording unit ejects ink using thermal energy.

13. An apparatus according to claim 12, wherein said recording unit ejects ink by film boiling provided by thermal energy.

14. An apparatus according to claim 9, further comprising means for generating image data to be recorded.

15. An apparatus according to claim 14, wherein said image data generating means includes an image scanner.

* * * * *

UNITED STATES PATENT AND TRADEMARK OFFICE
CERTIFICATE OF CORRECTION

PATENT NO. : 5,956,052
DATED : September 21, 1999
INVENTOR(S) : YUTAKA UDAGAWA, ET AL.

Page 1 of 3

It is certified that error appears in the above-identified patent and that said Letters Patent is hereby corrected as shown below:

On the title page: Item
[56] References Cited:
 FOREIGN PATENT DOCUMENTS, "363276563" should read --63-276563--.

COLUMN 3:
 Line 60, "B and C" should read --39B and 39C--.

COLUMN 4:
 Line 5, "FIG. 45-1" should read --FIG. 45A--.
 Line 7, "FIG. 45-2" should read --FIG. 45B--.

COLUMN 13:
 Line 4, "serial" should read --a serial--.
 Line 41, "IN" should be deleted.
 Line 42, "and OUT" should be deleted.

COLUMN 17:
 Line 41, "lower" should read --in a lower--.

COLUMN 18:
 Line 17, "are" should read --is--.

UNITED STATES PATENT AND TRADEMARK OFFICE
CERTIFICATE OF CORRECTION

PATENT NO. : 5,956,052
DATED : September 21, 1999
INVENTOR(S) : YUTAKA UDAGAWA, ET AL.

It is certified that error appears in the above-identified patent and that said Letters Patent is hereby corrected as shown below:

COLUMN 23:
Line 21, "contain" should read --contains--.

COLUMN 25:
Line 49, "show" should read --shown--.

COLUMN 26:
Line 26, "FIG. 45-2" should read --FIG. 45B--.

COLUMN 27:
Line 46, "is" should read --being--.
Line 49, "cut-off" should read --cut off--.
Line 53, "open" should read --opening--.

COLUMN 28:
Line 44, "128" should read --the 128--.

COLUMN 29:
Line 17, "in" should read --an--.

COLUMN 30:
Line 44, "nozzles" should read --nozzle--.

UNITED STATES PATENT AND TRADEMARK OFFICE
CERTIFICATE OF CORRECTION

PATENT NO. : 5,956,052
DATED : September 21, 1999
INVENTOR(S) : YUTAKA UDAGAWA, ET AL.

It is certified that error appears in the above-identified patent and that said Letters Patent is hereby corrected as shown below:

COLUMN 31:
Line 20, "no." should read --No.--.

COLUMN 32:
Line 5, "head" should read --heads--.
Line 25, "the the" should read --the--.

COLUMN 36:
Line 4, "means" should be deleted.

Signed and Sealed this

Fifteenth Day of August, 2000

Attest:

Q. TODD DICKINSON

Attesting Officer        Director of Patents and Trademarks